United States Patent
Bhalla et al.

(10) Patent No.: US 11,299,437 B2
(45) Date of Patent: *Apr. 12, 2022

(54) NUTRITIONAL COMPOSITIONS FOR PLANTS AND SOILS

(71) Applicant: ENVIROKURE, INCORPORATED, Philadelphia, PA (US)

(72) Inventors: Sushil K. Bhalla, Schwenksville, PA (US); Devon K. Hooper, Leesburg, NJ (US); Michael A. Laughlin, Philadelphia, PA (US); Jonathan Casassa, Marlton, NJ (US)

(73) Assignee: Envirokure, Inc., Philadelphia, PA (US)

( * ) Notice: Subject to any disclaimer, the term of this patent is extended or adjusted under 35 U.S.C. 154(b) by 305 days.

This patent is subject to a terminal disclaimer.

(21) Appl. No.: 16/063,962

(22) PCT Filed: Dec. 19, 2016

(86) PCT No.: PCT/US2016/067614
§ 371 (c)(1),
(2) Date: Jun. 19, 2018

(87) PCT Pub. No.: WO2017/112605
PCT Pub. Date: Jun. 29, 2017

(65) Prior Publication Data
US 2019/0194081 A1 Jun. 27, 2019

Related U.S. Application Data

(60) Provisional application No. 62/270,009, filed on Dec. 20, 2015.

(51) Int. Cl.
*C05F 17/10* (2020.01)
*C05F 3/00* (2006.01)
(Continued)

(52) U.S. Cl.
CPC ............... *C05F 3/00* (2013.01); *A01N 63/10* (2020.01); *C05F 17/10* (2020.01); *C05F 17/15* (2020.01);
(Continued)

(58) Field of Classification Search
CPC ........ A01N 63/10; A01N 63/20; A01N 63/30; C05F 3/00; C05F 11/08; C05F 11/09;
(Continued)

(56) References Cited

U.S. PATENT DOCUMENTS

| | | |
|---|---|---|
| 3,718,451 A | 2/1973 | Baumann |
| 3,865,568 A | 2/1975 | Kratzer |

(Continued)

FOREIGN PATENT DOCUMENTS

| | | |
|---|---|---|
| WO | WO 99/46209 A1 | 9/1999 |
| WO | WO 2013/028776 A1 | 8/2012 |

OTHER PUBLICATIONS

Sonia Nofziger-Dasgupta, "Innovative Aerobic Technology for Organic Fertilizer", accessed from https://web.archive.org/web/20150924040419/ https://www.chesapeakebay.net/channel_files/22245/5-envirokure_dec_15_presentation_2.pdf (Year: 2015).*

(Continued)

*Primary Examiner* — Wayne A Langel
(74) *Attorney, Agent, or Firm* — Potter Anderson & Corroon LLP

(57) ABSTRACT

The current application relates to a liquid fertilizer composition for application to plants and soils, comprising an autothermal thermophilic aerobic bioreaction product from a liquid fraction of poultry manure and further to a method of improving health and productivity of a plant or crop using said composition and to a method of conditioning soil using said composition.

19 Claims, 8 Drawing Sheets

(51) Int. Cl.
*C05F 17/40* (2020.01)
*C05G 5/23* (2020.01)
*A01N 63/10* (2020.01)

(52) U.S. Cl.
CPC .............. *C05F 17/40* (2020.01); *C05G 5/23* (2020.02); *Y02A 40/20* (2018.01); *Y02P 20/145* (2015.11); *Y02W 30/40* (2015.05)

(58) Field of Classification Search
CPC .......... C05F 17/10; C05F 17/15; C05F 17/40; C05G 3/60; C05G 3/80
See application file for complete search history.

(56) References Cited

U.S. PATENT DOCUMENTS

| | | |
|---|---|---|
| 3,939,280 A | 2/1976 | Karnemaat |
| 3,966,450 A | 6/1976 | O'Neill et al. |
| 4,160,656 A | 7/1979 | Junkermann |
| 4,311,511 A | 1/1982 | Graefe |
| 4,459,149 A | 7/1984 | Moran et al. |
| 5,174,805 A | 12/1992 | Masuda |
| 5,354,349 A | 10/1994 | Inoue |
| 5,393,317 A | 2/1995 | Robinson |
| 5,401,291 A | 3/1995 | Inoue |
| 5,501,718 A | 3/1996 | Bandurski |
| 5,730,772 A | 3/1998 | Staples |
| 6,364,926 B1 | 4/2002 | Gryzik et al. |
| 6,764,661 B1 | 7/2004 | Girard |
| 7,647,311 B2 | 1/2010 | Tenorio et al. |
| 7,662,205 B2 | 2/2010 | Burnham |
| 8,409,620 B2 | 4/2013 | Livingston |
| 8,673,046 B1 | 3/2014 | Szogi et al. |
| 9,688,584 B2* | 6/2017 | Bhalla .................... C05B 17/00 |
| 9,994,493 B2* | 6/2018 | Bhalla .................... A01C 3/00 |
| 10,343,953 B2* | 7/2019 | Bhalla .................... C05B 17/00 |
| 10,618,851 B2* | 4/2020 | Bhalla .................... C05F 17/80 |
| 2002/0108904 A1 | 8/2002 | Blackburn |
| 2002/0182710 A1 | 12/2002 | Horn et al. |
| 2003/0041638 A1 | 3/2003 | Lamour et al. |
| 2004/0031302 A1 | 2/2004 | Eswaran et al. |
| 2004/0040516 A1 | 3/2004 | Jensen |
| 2004/0065127 A1 | 4/2004 | Connell |
| 2004/0182780 A1 | 9/2004 | Lee |
| 2004/0265266 A1 | 12/2004 | Champ et al. |
| 2005/0193790 A1* | 9/2005 | Hartman .................. A01G 1/00 71/1 |
| 2006/0254331 A1 | 11/2006 | Burnham |
| 2007/0039362 A1 | 2/2007 | Macura |
| 2009/0188290 A1 | 7/2009 | Marler |
| 2009/0193863 A1 | 8/2009 | Szogi et al. |
| 2010/0288003 A1 | 11/2010 | Burnham et al. |
| 2010/0303551 A1 | 12/2010 | Chang |
| 2011/0079060 A1 | 4/2011 | Hackett et al. |
| 2011/0247378 A1 | 10/2011 | Begley et al. |
| 2011/0303157 A1 | 12/2011 | Laubenstein |
| 2012/0122196 A1 | 5/2012 | Johnson |
| 2012/0269905 A1 | 10/2012 | Mokhov et al. |
| 2013/0019645 A1 | 1/2013 | Crabtree et al. |
| 2013/0186155 A1 | 7/2013 | Blaine |
| 2014/0196512 A1 | 7/2014 | Shaimukhambetova |
| 2014/0338411 A1 | 11/2014 | Nunn |
| 2015/0259259 A1 | 9/2015 | Bhalla et al. |
| 2016/0318819 A1 | 11/2016 | Josse et al. |

OTHER PUBLICATIONS

Antoun, H. "Plant-Growth-Promoting Rhizobacteria", 2013, Brenner's Encyclopedia of Genetics, 2nd Ed, accessed from www.sciencedirect.com (Year: 2013).*

Merwad et al., "Effect of Some Soil Amendments and Foliar Spray of Salicylic and Ascorbic Acids on Sorghum Under Saline Calcareous Soil Conditions", Jan. 2015, International Journal of Soil Science, vol. 10, Issue 1, pp. 28-36. (Year: 2015).*

Bolan et al., "The Management of Phosphorus in Poultry Litter", 2010, 19th Congress of Soil Science, Soil Solutions for a Changing World. (Year: 2010).*

Calvo et al., "Agricultural uses of plant biostimulants," Plant Soil 383:3-41 (2014).

Du Jardin, "Plant biostimulants: Definition, concept, main categories and regulation," Scientia Horticulturae 196:3-14 (2015).

Khorassani et al., "Citramalic acid and salicylic acid in sugar beet root exudates solubilize soil phosphorus," BMC Plant Biol. 11:121 (2011).

Legault et al., "Aerobic Digestion of Poultry Manure to Produce Biologically Active Greenhouse Nutrient Solutions," Alberta Agriculture and Rural Development.

Mochalov et al., "The Use of Stimulators Made of Aqueous Extract from Bark and Chicken Manure Compost and Heteroauxin when Pricking Out Containerized Pine Seedlings," Lesnoy Zhurnal, 2015(5):67-76 (2015). See pp. 74-75 for English Abstract.

Nishizawa et al., "Galactinol and Raffinose Constitute a Novel Function to Protect Plants from Oxidative Damage," Plant Physiol. 147(3):1251-1263 (2008).

Nofziger-Dasupta, "Innovative Aerobic Technology for Organic Fertilizer," Envirokure, Inc. (Dec. 17, 2014).

Vallad & Goodman, "Systemic Acquired Resistance and Induced Systemic Resistance in Conventional Agriculture," Crop Sci. 44:1920-1934 (2004).

Vranova et al., "Non-protein amino acids: plant, soil and ecosystem interactions," Plant Soil 342:31-48 (2011).

Zhao, "Auxin biosynthesis and its role in plant development," Ann. Rev. Plant Biol. 61:49-64 (2010).

International Search Report and Written Opinion for International Patent Application No. PCT/US2016/067614, dated Feb. 28, 2017.

International Preliminary Report on Patentability for International Patent Application No. PCT/US2016/067614, dated Jun. 26, 2018.

* cited by examiner

United States Patent

NUTRITIONAL COMPOSITIONS FOR PLANTS AND SOILS

CROSS REFERENCE TO RELATED APPLICATIONS

This is a U.S. national filing, pursuant to 35 U.S.C. § 371, of International Application No. PCT/US2016/067614, filed Dec. 19, 2016, which claims benefit of U.S. Provisional Application No. 62/270,009, filed Dec. 20, 2015, the entire contents of each of which are incorporated by reference herein.

FIELD OF THE INVENTION

The present invention relates generally to fertilizers and compositions useful for promoting plant growth and healthy soil structure. In particular, liquid and solid compositions produced by aqueous bioprocessing of poultry manure are disclosed.

BACKGROUND OF THE INVENTION

Various publications, including patents, published applications and scholarly articles, are cited throughout the specification. Each of these publications is incorporated by reference herein, in its entirety.

Two main categories of crop input products are used in agriculture: fertilizers and pesticides. A fertilizer is typically described as any organic or inorganic material of natural or synthetic origin that is added to supply one or more nutrients essential to the growth of plants. Fertilizers provide, in varying proportions, the macronutrients, secondary nutrients and micronutrients required or beneficial for plant growth.

The Food and Agriculture Organization (FAO) has defined pesticide as any substance or mixture of substances intended for preventing, destroying, or controlling any pest, including vectors of human or animal disease, unwanted species of plant or animals, causing harm during or otherwise interfering with the production, processing, storage, transport, or marketing of food, agricultural commodities, wood and wood products or animal feedstuffs, or substances that can be administered to animals for the control of insects, arachnids, or other pests in or on their bodies. The term includes substances intended for use as a plant growth regulator, defoliant, desiccant, or agent for thinning fruit or preventing the premature fall of fruit, as well as substances applied to crops either before or after harvest to protect the commodity from deterioration during storage and transport.

During the last century, there has been extensive use of synthetic fertilizers and pesticides in agriculture. It is now well recognized that the use of synthetic fertilizers adversely impacts the physical qualities of soil and its ability for sustainable growth. In addition, the adverse impacts of these chemicals on environment and humans are being recognized (see, e.g., Weisenberger, D. D., 1993, "Human Health Effects of Agrichemical Use," Hum Pathol. 24(6): 571-576).

The recognition of the often detrimental effect of synthetic fertilizers and pesticides on plants, soil ecology and human health has provided impetus for resurgent interest in organic crop production, including the use of fertilizers and pesticides of natural and/or biological origin. Indeed, crops that can be described or advertised as "organic" must be produced in accordance with standards set forth by federal and state law. In the United States, the National Organic Program (NOP) is a regulatory program housed within the United States Department of Agriculture (USDA) Agricultural Marketing Service. The NOP is responsible for developing national standards for organically-produced agricultural products. These standards assure consumers that products with the USDA organic seal meet consistent, uniform standards. To comply with NOP rules, growers must use only approved materials and handling processes in their production programs. The NOP accredits various organizations that test and approve products for use in compliance with NOP rules. One example is the Organic Materials Review Institute (OMRI), an international nonprofit organization that determines which input products are allowed for use in organic production and processing. OMRI Listed® products are allowed for use in certified organic operations under the USDA National Organic Program. Another example is the Washington State Department of Agriculture (WSDA) Organic Program. As a certification agent of the USDA NOP, the WSDA Organic Program's role is to uphold the integrity of NOP organic standards by inspecting and certifying organic operations.

The term "organic fertilizer" typically refers to a soil amendment from natural sources that guarantee, at least the minimum percentage of nitrogen, phosphate and potash. Examples include plant and animal byproducts, rock powder, sea weed, inoculants and conditioners. If such fertilizers meet criteria for use in organic programs, such as the NOP, they also can be referred to as registered, approved or listed for use in such programs.

"Biofertilizer" is another term used in the industry. It refers to a substance that contains living microorganisms which, when applied to seed, plant surfaces, or soil, colonize the rhizosphere or the interior of the plant and promote growth by increasing the supply or availability of primary nutrients to the host plant. Biofertilizers add nutrients through the natural processes of nitrogen fixation, solubilizing phosphorus, and stimulating plant growth through the synthesis of growth-promoting substances. Biofertilizers can be expected to reduce the use of chemical fertilizers and pesticides. The microorganisms in biofertilizers restore the soil's natural nutrient cycle and build soil organic matter. Through the use of bio-fertilizers, healthy plants can be grown, while enhancing the sustainability and the health of the soil.

Plant "biostimulants" are diverse substances and microorganisms used to enhance plant growth. In North America, the Biostimulant Coalition defined biostimulants as "substances, including micro-organisms, that are applied to plant, seed, soil or other growing media that may enhance the plant's ability to assimilate applied nutrients, or provide benefits to plant development" (Biostimulant 2013, see URL biostimulantcoalition.org). "They are derived from natural or biological sources and can i) enhance plant growth and development when applied in small quantities; ii) help improve the efficiency of plant nutrients, as measured by either improved nutrient uptake or reduced nutrient losses to the environment, or both; or [iii)] act as soil amendments to help improve soil structure, function, or performance and thus enhance plant response" (Biostimulant 2013). Biostimulants were defined and described by du Jardin (2015, supra) as including several categories, namely: humic substances, protein hydrolysates and other nitrogen-containing compounds, seaweed extracts and botanicals, chitosan and other biopolymers, certain inorganic compounds, and beneficial bacteria and fungi.

It will be understood that biofertilizers and biostimulants, as well as biopesticides and other biocontrol agents, can be "organic" within the meaning set forth above.

With regard to microorganisms, a preferred scientific term for beneficial bacteria is "Plant Growth Promoting Bacteria (PGPB)". Therefore, they are extremely advantageous in enriching soil fertility and fulfilling plant nutrient requirements by supplying the organic nutrients through microorganisms and their byproducts. Hence, bio-fertilizers do not contain any chemicals which are harmful to living soil.

PGPBs can influence the plant in a direct or indirect way. For instance, they can increase plant growth directly by supplying nutrients and hormones to the plant. Examples of bacteria which have been found to enhance plant growth, include thermophilic members of genera such as *Bacillus, Ureibacillus, Geobacillus, Brevibacillus* and *Paenibacillus*, all known to be prevalent in poultry manure compost.

PGPBs are also able to control the number of pathogenic bacteria through microbial antagonism, which is achieved by competing with the pathogens for nutrients, producing antibiotics, and the production of anti-fungal metabolites. Besides antagonism, certain bacteria-plant interactions can induce mechanisms in which the plant can better defend itself against pathogenic bacteria, fungi and viruses. One mechanism is known as induced systemic resistance (ISR), while another is known as systemic acquired resistance (SAR) (see, e.g., Vallad, G. E. & R. M. Goodman, 2004, Crop Sci. 44:1920-1934). The inducing bacteria triggers a reaction in the roots that creates a signal that spreads throughout the plant, resulting in the activation of defense mechanisms, such as reinforcement of plant cell wall, production of antimicrobial phytoalexins and the synthesis of pathogen related proteins. Some of the components or metabolites of bacteria that can activate ISR or SAR include lipopolysaccharides (LPS), flagella, salicylic acid, and siderophores.

Animal manure, particularly nutrient- and microbe-rich poultry manure, has been a subject of extensive research regarding its suitability as a bio-organic fertilizer. It is well established through academic research and on-farm trials that poultry manure can cost-effectively and safely provide all the macro and micro nutrients required for plant growth, as well as certain plant growth promoting bacteria, if the harmful plant and human pathogens can be destroyed. However, significant concerns from the use of raw manure include increased potential for nutrient run off and leaching of high soil P, as well as transmittal of human pathogens to food. As composting has been shown to reduce total volume of runoff and soil erosion and to reduce the potential for pathogen contamination, many states now require poultry manure to be composted prior to field application, leading to advances in composting processes.

Composting can be described as the biological decomposition and stabilization of organic material. The process produces heat via microbial activity, and produces a final product that is stable, substantially free of pathogens and weed seeds. As the product stabilizes, odors are reduced and pathogens eliminated, assuming the process is carried to completion. Most composting is carried out in the solid phase.

Benefits of composting include: (1) enriching soil with PGPB, (2) reduction of microbial and other pathogens and killing of weed seeds; (3) conditioning the soil, thereby improving availability of nutrients to plants; (4) potentially reducing run-off and soil erosion; (5) stabilizing of volatile nitrogen into large protein particles, reducing losses; and (6) increasing water retention of soil. However, the process is time consuming and labor intensive. Additionally, because nutrients are applied in bulk prior to planting, there is a significant potential for nutrients to be lost. There is also a significant potential for inconsistent decomposition and incomplete pathogen destruction. Furthermore, the unavailability of set application rates can lead to uneven nutrient distribution in field application. Lastly, solid compost cannot be used in hydroponics and drip irrigation.

With regard to this last drawback, organic growers have utilized compost leachate ("compost tea") as a liquid fertilizer. The leachate is produced by soaking well-composted material in water and then separating the solid from the liquid leachate. While such liquid material can be utilized in drip irrigation or foliar application, its production remains time consuming and labor intensive, and the liquid product suffers from the same drawbacks as solid compost in that it may still contain pathogenic organisms and its nutrient content is inconsistent.

Other organic fertilizers include fish-based and plant protein based fertilizers. Fish emulsion fertilizers are typically produced from whole salt-water fish and carcass products, including bones, scales and skin. The fish are ground into a slurry, then heat processed to remove oils and fish meal. The liquid that remains after processing is referred to as the "fish emulsion." The product is acidified for stabilization and to prevent microbial growth. Fish hydrolysate fertilizers are typically produced from freshwater fish by a cold enzymatic digestion process. While fish fertilizers can provide organic nutritional supplementation to plants and soil microorganisms, they are difficult to use, in part due to their high acidity and oil-based composition in some instances, which can clog agricultural equipment. Plant protein-based fertilizers are typically produced by hydrolysis of protein-rich plant materials, such as soybean, and are an attractive alternative for growers and gardeners producing strictly vegan products, for instance. However, due to their sourcing, these products can be expensive. Furthermore, none of the above-described fertilizers is naturally biologic: beneficial microorganisms must be added to them.

Thus, there remains a need in the art for biologically-derived products, particularly products that can be used in organic programs, which can provide superior plant nutrition and soil conditioning, while at the same time being safe, easy to use and cost-effective. Such products would provide highly advantageous alternatives to synthetic products currently in use, and would satisfy growers' requirements for standardization and reliability.

SUMMARY OF THE INVENTION

One aspect of the invention features a liquid composition for application to plants and soils, comprising an autothermal thermophilic aerobic bioreaction product from a liquid fraction of poultry manure. In particular embodiments, the poultry manure is from chickens, such as from chickens raised for meat or egg-laying chickens.

In an embodiment, the composition endogenously comprises at least one biostimulant. More particularly it comprises several biostimulants, e.g., 2, 3, 5, 10, 15, and/or 20 or more biostimulants. The biostimulants can include one or more amino acids, bacteria, fungi and combinations thereof.

In an embodiment, the composition endogenously comprises at least one living species of plant growth promoting bacteria or fungi. More particularly it comprises several such species of bacteria or fungi, e.g., 2, 3, 5, 10, 15, and/or 20 or more species.

In an embodiment, the composition endogenously comprises at least one non-living substance that promotes plant growth and is not a macronutrient or a micronutrient. More particularly, it comprises several such substances, e.g., 2, 3, 5, 10, 15, and/or 20 or more such substances. In certain embodiments, the substance that promotes plant growth is selected from citramalic acid, salicylic acid, pantothenic acid, indole-3-acetic acid, 5-hydroxy-indole-3-acetic acid, galactinol, and any combination thereof.

In an embodiment, the composition endogenously comprises at least one biocontrol agent selected from a living organism, a non-living substance, or a combination thereof, that promotes a plant pathogen resistance response. More particularly, it comprises several such biocontrol agents, e.g., 2, 3, 5, 10, 15, and/or 20 or more such agents. In certain embodiments, the non-living substance is selected from salicylic acid, phenolic compounds, and any combination thereof.

In any embodiment of the composition set forth above, the liquid fraction of poultry manure comprises a liquid fraction of a poultry manure slurry comprising between about 80% and 90% moisture and a pH between about 4 and about 7. In certain embodiments, the poultry manure slurry is heated to between about 60° C. and about 75° C. for between about 1 hour and about 4 hours.

In any embodiment of the composition set forth above, the autothermal thermophilic aerobic bioreaction of which the composition is a product comprises maintaining the liquid fraction at a temperature of about 45° C. to about 80° C. under aerobic conditions for a pre-determined time. In particular embodiments, the pre-determined time is between about 1 day and about 18 days.

In any embodiment of the composition set forth above, the composition endogenously comprises all macronutrients and micronutrients required for plant growth. The composition endogenously comprises less than about 0.5 wt % phosphorus.

Any embodiment of the composition can comprise at least one additive. In certain embodiments, the additive is selected from a macronutrient, a micronutrient, a biostimulant, a biocontrol agent, and any combination thereof.

The compositions described above can be formulated in a variety of ways, such as for application to soil or a medium in which a plant is growing or will be grown. Alternatively, they can be formulated for application to a seed or plant part.

Any of compositions described above can be produced or formulated in a manner suitable for use in an organic program.

Another aspect of the invention features a method of improving health or productivity of a selected plant or crop. The method comprises: (a) selecting a plant or crop for which improved health or productivity is sought; (b) treating the plant or crop with a composition comprising an autothermal thermophilic aerobic bioreaction product from a liquid fraction of poultry manure; (c) measuring at least one parameter of health or productivity in the treated plant or crop, and (d) comparing the at least one measured parameter of health or productivity in the treated plant or crop with an equivalent measurement in an equivalent plant or crop not treated with the composition; wherein an improvement in the at least one measured parameter in the treated, as compared with the untreated, plant or crop is indicative of improving the health or productivity of the selected plant or crop.

In various embodiments, the plant or crop is selected from angiosperms, gymnosperms, ferns, mosses, fungi, algae and cyanobacteria. In certain embodiments, the plant or crop is grown or cultivated in a medium selected from, soil, soil-less solid, hydroponic or aeroponic. In certain embodiments, the treating comprises applying the composition to one or more of: seeds of the plant, a medium in which the plant or crop is growing or will be planted, portions of the plant or crop, and any combination thereof. In particular, the composition is applied in a manner selected from one or a combination of: to the medium pre-planting or pre-inoculation, or pre-emergence; to the medium as a side dressing; in the course of irrigation; and as a direct application to the plant or crop.

In certain embodiments, the at least one parameter of health or productivity in the plant or crop is selected from one or more of: germination rate, germination percentage, robustness of germination, root biomass, root structure, root development, total biomass, stem size, leaf size, flower size, crop yield, structural strength/integrity, photosynthetic capacity, time to crop maturity, yield quality, resistance or tolerance to stress, resistance or tolerance to pests or pathogens, and any combination thereof. Yield quality can include one or more of dry matter content, starch content, sugar content, protein content, appearance, Brix value, and any combination thereof.

In certain embodiments, the at least one measured parameter in the treated plant or crop is compared with an equivalent parameter in an equivalent untreated crop: (a) grown in substantially the same location during the same growing season; or (b) grown in the substantially same location during a different growing season; or (c) grown in a different location during the same growing season; or d) grown in a different location during a different growing season.

In any embodiment of the above-described method, the plant or crop is grown in accordance with an organic program and the composition is approved for use in the program. In particular, the organic program is a United States Department of Agriculture (USDA) National Organic Program or equivalent thereof, such as an equivalent program in a state, or in another country.

Another aspect of the invention features a method of conditioning a selected soil. The method comprises: (a) selecting a soil for which conditioning is sought; (b) treating the soil with a composition comprising an autothermal thermophilic aerobic bioreaction product from a liquid fraction of poultry manure; (c) measuring at least one parameter of conditioning in the treated soil, and (d) comparing the at least one measured parameter of conditioning in the treated soil with an equivalent measurement in an equivalent soil not treated with the composition, or before treatment with the composition; wherein an improvement in the at least one measured parameter in the treated, as compared with the untreated soil, or with the soil prior to treatment, is indicative of conditioning the selected soil.

In one embodiment, the selected soil is one in which plants or crops are or will be planted. In certain embodiments, the selected soil comprises at least one feature selected from compaction, nutrient deficiency, microbial deficiency, organic matter deficiency, and any combination thereof.

In certain embodiments, the at least one parameter of conditioning the soil is selected from one or more of: soil organic matter, microbial diversity, nutrient profile, bulk density, porosity, water permeation, and any combination thereof.

In certain embodiments, the at least one measured parameter in the treated soil is compared with an equivalent parameter prior to treatment of the same soil, or at various time points during a treatment regimen. In other embodiments, the at least one measured parameter in the treated soil is compared with an equivalent parameter in an equivalent untreated soil in substantially the same location or in a different location.

Other features and advantages of the invention will be apparent by references to the drawings, detailed description and examples that follow.

DETAILED DESCRIPTION OF THE INVENTION

Figure 1:
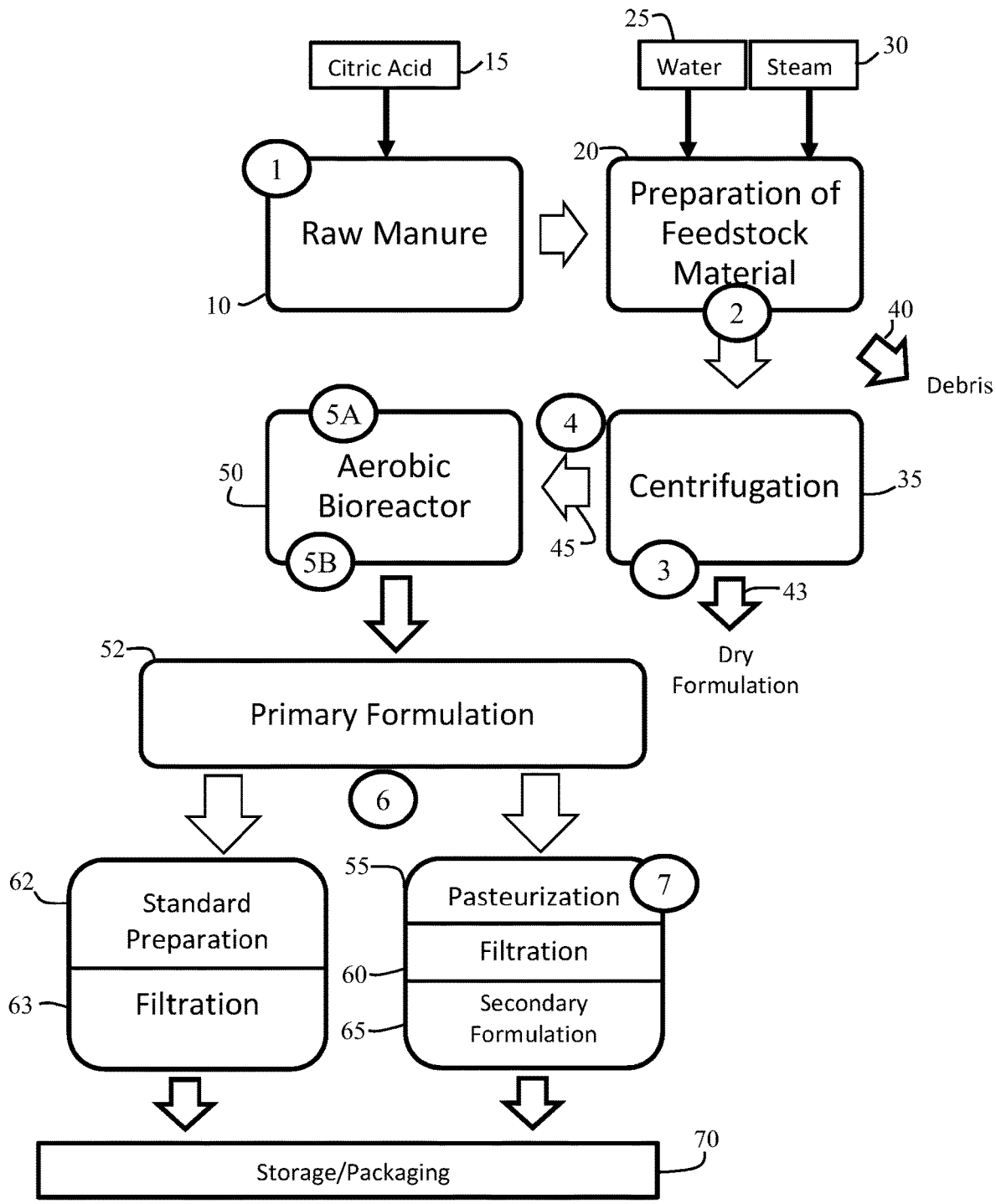
FIG. 1 is a block-diagram of an exemplary embodiment of nutritional composition production process where the circled numbers (1-7) indicate samples taken from various stages of the process and collected for analysis. Sample 1 refers to raw manure (e.g., raw chicken manure), sample 2 refers to the slurry taken after the preparation of feedstock material, sample 3 refers to the solid taken after separation by centrifugation, sample 4 refers to the liquid stream taken after separation by centrifugation, sample 5A refers to the sample taken after 24 hours in the bioreactor and prior to primary formulation, sample 5B refers to the sample taken after 72 hours in the bioreactor and prior to primary formulation, sample 6 refers to the formulated sample that has not been subjected to heat pasteurization, and sample 7 refers to the sample taken after the heat pasteurization step, but prior to the filtration step.

One aspect of the present invention features nutritional compositions for plants and soils. These compositions include both liquid and solid products produced from animal manure and related waste products as a starting material. In particular embodiments the starting material comprises poultry manure.

Avian manure tends to be very high in nitrogen, phosphorous, and other nutrients, as well as a robust microbial community, that plants require for growth and is therefore suitable for use in embodiments of the present invention. Shown in the table below is a comparison of typical nutrient and microbial content contained in manure from several different poultry species.

TABLE 1A

Poultry manure nutrients analysis (source: Biol. & Agric. Eng. Dept. NC State University, January 1994; Agronomic Division, NC Dept of Agriculture & Consumer Services)

| Parameter | Unit (mean) | Chicken Layer | Chicken Broiler | Chicken Breeder | Turkey | Duck | Range |
|---|---|---|---|---|---|---|---|
| Total Solids | % wet basis | 25 | 79 | 69 | 73 | 37 | 25-79 |
| Volatile Solids | % dry basis | 74 | 80 | 43 | 73 | 66 | 43-80 |
| TKN | lb/ton | 27 | 71 | 37 | 55 | 17 | 17-71 |
| $NH_3N$ | % TKN | 25 | 17 | 21 | 22 | 22 | 17-27 |
| $P_2O_5$ | lb/ton | 21 | 69 | 58 | 63 | 21 | 21-69 |
| $K_2O$ | lb/ton | 12 | 47 | 35 | 40 | 13 | 12-47 |
| Ca | lb/ton | 41 | 43 | 83 | 38 | 22 | 22-83 |
| Mg | lb/ton | 4.3 | 8.8 | 8.2 | 7.4 | 3.3 | 3.3-14 |
| S | lb/ton | 4.3 | 12 | 7.8 | 8.5 | 3 | 3-12 |
| Na | lb/ton | 3.7 | 13 | 8.3 | 7.6 | 3 | 3-13 |
| Fe | lb/ton | 2 | 1.2 | 1.2 | 1.4 | 1.3 | 1.2-2 |
| Mn | lb/ton | 0.16 | 0.79 | 0.69 | 0.8 | 0.37 | 0.16-.8 |
| B | lb/ton | 0.055 | 0.057 | 0.034 | 0.052 | 0.021 | 0.021-0.057 |
| Mo | lb/ton | 0.0092 | 0.00086 | 0.00056 | 0.00093 | 0.0004 | 0.0004-0.0092 |
| Zn | lb/ton | 0.14 | 0.71 | 0.62 | 0.66 | 0.32 | 0.14-0.71 |
| Cu | lb/ton | 0.026 | 0.53 | 0.23 | 0.6 | 0.044 | 0.026-0.6 |
| Crude Protein | % dry basis | 32 | 26 | | 18 | | 18-32 |
| Total Bacteria | col/100 gm | 7.32E+11 | 1.06E+11 | | 5.63E+11 | | |
| Aerobic Bacteria | col/100 gm | 6.46E+10 | 1.58E+09 | | | | |

TKN, Total Kjeldahl Nitrogen (organic nitrogen, ammonia, and ammonium)

Thus, manure from domestic fowl, or poultry birds, may be especially suitable for use in the present manufacturing methods as they tend to be kept on farms and the like, making for abundant and convenient sourcing. In particular embodiments, the poultry manure is selected from chickens (including Cornish hens), turkeys, ducks, geese, and guinea fowl.

In preferred embodiments, the raw manure used in the present manufacturing process comprises chicken manure. Chicken farms and other poultry farms may raise poultry as floor-raised birds (e.g., turkeys, broilers, broiler breeder pullets) where manure is comprised of the animal feces or droppings as well as bedding, feathers and the like. Alternatively, poultry farms may raise poultry as caged egg layers that are elevated from the ground and where manure consists mainly of fecal droppings (feces and uric acid) that have dropped through the cage. In particular aspects, the chicken manure is selected from the group consisting of egg layer chickens, broiler chickens, and breeder chickens. In a more particular embodiment, the manure comprises egg layer manure.

A typical composition of chicken manure is shown in the table below (analysis in wt % or ppm). The moisture content can vary from 45% to 70% moisture. In addition to macro and micro nutrients the manure contains a diverse population of microorganism which have a potential of being PGPB and also pathogenic characteristics. The manufacturing process is designed to reduce or eliminate the pathogenic organisms and cultivate beneficial organisms, including PGPB.

TABLE 1B

Raw Chicken Manure Nutrients Analysis

| Nutrient | Average | Range |
|---|---|---|
| Ammonium Nitrogen | 0.88% | 0.29-1.59 |
| Organic Nitrogen | 1.89% | 0.66-2.96 |

TABLE 1B-continued

Raw Chicken Manure Nutrients Analysis

| Nutrient | Average | Range |
|---|---|---|
| TKN | 2.78% | 1.88-3.66 |
| $P_2O_5$ | 2.03% | 1.33-2.93 |
| K | 1.40% | 0.89-3.01 |
| Sulfur | 0.39% | 0.13-0.88 |
| Calcium | 3.56% | 1.98-5.95 |
| Magnesium | 0.36% | 0.22-0.60 |
| Sodium | 0.33% | 0.10-0.88 |
| Copper | 90 ppm | >20 ppm-309 ppm |
| Iron | 490 ppm | 314 ppm-911 ppm |
| Manganese | 219 ppm | 100 pm-493 ppm |
| Zinc | 288 ppm | 97 ppm-553 ppm |
| Moisture | 51.93% | 31%-71% |
| Total Solids | 49.04% | 69%-29% |
| pH | 7.60 | 5.5-8.3 |
| Total Carbon | 17.07% | 9.10%-29.20% |
| Organic Matter | 22.32% | 15%-30% |
| Ash | 19.00% | 15-25% |
| Chloride | 0.39% | 0.19%-0.80% |

In certain embodiments, the selected poultry manure comprises between about 17 lb/ton and about 71 lb/ton (i.e., between about 0.85% and about 3.55% by weight) total kjeldahl nitrogen (TKN), which is the total amount of organic nitrogen, ammonia, and ammonium. In particular aspects, the manure comprises about 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, or 71 lb/ton TKN.

The compositions of the invention are produced from the animal waste by a process that combines physical (e.g., mechanical, thermal), chemical and biological manipulations that reduce or eliminate pathogens while promoting the growth of a diverse microbial population and generating metabolic products of those microorganisms, all of which act together to promote plant and soil health, as described in detail below. In this regard, the inventors have discovered that manipulation of the time, temperature, oxidation reduction potential value, and/or pH in various stages of the process can alter the microbial and biochemical profile of the compositions.

While not wishing to be bound by theory, the metabolites in the compositions are believed to act as precursor building blocks for plant metabolism and can enhance regulatory function and growth. In one aspect, the bacteria in the compositions can produce allelochemicals that can include, for example, siderophores, antibiotics, and enzymes. In another aspect, precursor molecules for the synthesis of plant secondary metabolites can include flavonoids, allied phenolic and polyphenolic compounds, terpenoids, nitrogen-containing alkaloids, and sulfur-containing compounds.

All percentages referred to herein are percentages by weight (wt %) unless otherwise noted.

Ranges, if used, are used as shorthand to avoid having to list and describe each and every value within the range. Any value within the range can be selected, where appropriate, as the upper value, lower value, or the terminus of the range.

The term "about" refers to the variation in the numerical value of a measurement, e.g., temperature, weight, percentage, length, concentration, and the like, due to typical error rates of the device used to obtain that measure. In one embodiment, the term "about" means within 5% of the reported numerical value.

As used herein, the singular form of a word includes the plural, and vice versa, unless the context clearly dictates otherwise. Thus, the references "a", "an", and "the" are generally inclusive of the plurals of the respective terms. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

As used herein, "animal waste" refers to any material that contains animal manure, including litter, bedding or any other milieu in which animal manure is disposed. In one aspect, "animal waste" comprises avian or fowl manure, more particularly poultry manure (e.g., chicken, turkey, duck, goose, guinea fowl). In particular, "animal waste" comprises chicken manure, for example, from broilers or layers. In other aspects, "animal waste" can refer to waste from other animals, such as, for example, hogs, cattle, sheep, goats, or other animals not specifically recited herein. In yet another aspect, "animal waste" can refer to a mixture of waste products from two or more types of animals, for instance, two or more types of poultry.

"Poultry litter" refers to the bed of material on which poultry are raised in poultry rearing facilities. The litter can comprise a filler/bedding material such as sawdust or wood shavings and chips, poultry manure, spilled food, and feathers.

Manure slurry refers to a mixture of manure and any liquid, e.g., urine and/or water. Thus, in one aspect, a manure slurry can be formed when animal manure and urine are contacted, or when manure is mixed with water from an external source. No specific moisture and/or solids content is intended to be implied by the term slurry.

The term "autothermal thermophilic aerobic bioreaction," or "ATAB," is used herein to describe the bioreaction to which the substantially liquid component of the animal manure slurry is subjected in order to produce the liquid nutritional compositions of the present invention. As described below, the term refers to an exothermic process in which the separated liquid component of an animal waste slurry is subjected to elevated temperature (generated endogenously at least in part) for a pre-determined period of time. Organic matter is consumed by microorganisms present in the original waste material, and the heat released during the microbial activity maintains thermophilic temperatures.

In this regard, a "bioreaction" is a biological reaction, i.e., a chemical process involving organisms or biochemically active substances derived from such organisms.

"Autothermal" means that the bioreaction generates its own heat. In the present disclosure, while heat may be applied from an outside source, the process itself generates heat internally. "Thermophilic" refers to the reaction favoring the survival, growth and/or activity of thermophilic microorganisms. As is known in the art, thermophilic microorganisms are "heat loving," with a growth range between 45° C. and 80° C., more particularly between 50° C. and 70° C., as described in detail herein. "Aerobic" means that the bioreaction is carried out under aerobic conditions, particularly conditions favoring aerobic microorganisms, i.e., microorganisms that prefer (facultative) or require (obligate) oxygen.

The term "endogenous" as used herein refers to substances or processes arising from within—for instance, from the starting material, i.e., the animal waste, or from within a component of the manufacturing process, i.e., the separated liquid component, or from within a product of the manufacturing process, i.e., a nutritional composition as described herein. A composition may contain both endogenous and exogenous (i.e., added) components. In that regard, the term "endogenously comprising" refers to a component that is endogenous to the composition, rather than having been added.

As used herein, a biostimulant is a substance or microorganism that, when applied to plants or to the soil, stimulates existing biological & chemical processes in the plant and/or associated microbes (e.g., mycorrhizal fungi) to enhance the plant's growth, yield and/or quality through improving nutrient update, nutrient use efficiency and/or tolerance to abiotic stress (e.g., heat, saline soils).

As used herein, biofertilizers are materials of biological origin, e.g., plants, seaweed, fish, land animals, and the like, that contain sufficient levels of plant nutrients (nitrogen, phosphorus, potassium, calcium, magnesium, etc.), in forms that are either directly absorbed by plants, or are sufficiently quickly decomposed to available forms, to cause an increase in plant growth and/or quality.

As used herein, "biocontrol agents" or "biopesticides" are substances of natural or biological origin, or are organisms themselves, that facilitate a plant's inherent disease or pest-resistance mechanisms. These formulations may be very simple mixtures of natural ingredients with specific activities or complex mixtures with multiple effects on the host as well as the target pest or pathogen.

As used herein, a "soil conditioner" is a substance added to soil to improve the soil's physical, chemical or biological qualities, especially its ability to provide nutrition for plants. Soil conditioners can be used to improve poor soils, or to rebuild soils which have been damaged by improper management. Such improvement can include increasing soil organic matter, improving soil nutrient profiles, and/or increasing soil microbial diversity.

Process:

The manufacturing process comprises the following steps: (1) preparation of the starting material (the animal waste, also referred to herein as "feedstock material"); (2) separation of the prepared feedstock material into a substantially solid and a substantially liquid component; (3) drying the substantially solid component to produce a solid nutritional composition of the invention; (4) subjecting the substantially liquid component to an autothermal thermophilic aerobic bioreaction (ATAB); and (5) subjecting the bioreaction liquid product to one or more further processing steps including filtration, pasteurization and formulation via addition of other components. A schematic diagram depicting an exemplary embodiment of the manufacturing process applied to layer chicken manure is shown in FIG. 1 and described in Example 1. If manure is supplied as poultry litter, e.g., from broiler chickens, the bedding is removed prior to initiation of the above-summarized process.

In the preparation step, the feedstock material is first adjusted for moisture content and pH. The moisture content is adjusted by adding a liquid to form an aqueous slurry that is sufficiently liquid to be flowable from one container to another, e.g., via pumping through a hose or pipe. In certain embodiments, the aqueous slurry has a moisture content of at least about 80%. More particularly, the slurry has a moisture content of at least about 81%, or at least about 82%, or at least about 83%, or at least about 84%, or at least about 85%, or at least about 86%, or at least about 87%, or at least about 88%, or at least about 89%, or at least about 90%, or least about 91%, or at least about 92%, or at least about 93%, or at least about 94%, or at least about 95%, or at least about 96%, or at least about 97%, or at least about 98%, or at least about 99%, with the understanding that about 99% moisture is an upper limit. In particular embodiments, the slurry has a moisture content of between about 80% to about 95%, even more particularly between about 84% and about 87%, or between about 85% and about 90%.

The pH of the slurry is adjusted to neutral or acidic through the addition of a pH adjusting agent. Typically, the slurry will need to be acidified. In particular embodiments, the slurry is adjusted to a pH of between about 4 and about 7, or more particularly to between about 5 and about 7, or even more particularly to between about 5.5 and about 7, or even more particularly to between about 6 and about 7. In preferred embodiments, the pH of the slurry is between about 6.0, or about 6.1, or about 6.2, or about 6.3, or about 6.4, or about 6.5, or about 6.6, or about 6.7 or about 6.9 and about 7.0. Acidification of an otherwise non-acidic (i.e., basic) feedstock is important to stabilize the natural ammonia in the manure into non-volatile compounds, e.g., ammonium citrate.

An acid is typically used to adjust the pH of the slurry. In certain embodiments, the acid is an organic acid, though an inorganic acid may be used or combined with an organic acid. Suitable organic acids include but are not limited to formic acid (methanoic acid) acetic acid (ethanoic acid) propionic acid (propanoic acid) butyric acid (butanoic acid) valeric acid (pentanoic acid), caproic acid (hexanoic acid), oxalic acid (ethanedioic acid), lactic acid (2-hydroxypropanoic acid), malic acid (2-hydroxybutanedioic acid), citric acid (2-hydroxypropane-1,2,3-tricarboxylic acid) and benzoic acid (benzenecarboxylic acid). Preferably, the acid is one typically used to adjust the pH of food or feed. A preferred acid is citric acid.

The slurry preparation system is designed to prepare a homogeneous slurry in an aqueous medium at a pH of 4 to 7, preferably 6 to 7 and at an elevated temperature. The temperature is elevated at this stage for several purposes, including (1) to promote mixing and flowability of the slurry, (2) to kill pathogens and/or weed seeds, and/or (3) to facilitate growth of thermophilic bacteria present in the feedstock. The temperature can be elevated by any means known in the art, including but not limited to conductive heating of the mixing tank, use of hot water to adjust moisture content, or injection of steam, to name a few. In certain embodiments, the slurry is heated to at least about 60° C., or at least about 61° C., or at least about 62° C., or at least about 63° C., or at least about 64° C., or at least about 65° C., or at least about 66° C., or at least about 67° C., or at least about 68° C., or at least about 69° C., or at least about 70° C. Typically, the temperature does not exceed about 80° C., or more particularly it is less than about 75° C., or less than about 70° C. In certain embodiments, the temperature of the slurry is maintained at between about 65° C. and about 75° C.

The pH-adjusted aqueous slurry is maintained at the elevated temperature for a time sufficient to break the manure down into fine particles, fully homogenizing the slurry for further processing, killing pathogens and weed seeds, and/or activating the native thermophilic bacteria. In certain embodiments, the slurry is held at the elevated temperature for at least about one hour and up to about 4 hours. Typically, the slurry is subjected to chopping and/or mixing during this phase. In certain embodiments, the preparation step as outlined above is segregated from subsequent steps of the process to reduce the likelihood that downstream process steps could be contaminated with raw manure.

In an exemplary embodiment, the slurry system consists of a stainless steel tank, equipped with a chopper pump, nozzle mixing and an aeration system, pH and temperature controls and a biofiltration system for off-gases.

An exemplary process consists of charging the tank with water, heating it to 65° C. or higher, lowering the pH to 7 or lower, preferably to a range of 6-7, with citric acid. The chopper pump, nozzle mixers, aeration and off gas biofiltration systems are turned on before introducing the feedstock to ensure a moisture content of, e.g., 85 to 90%. It is a batch operation and, in various aspects, can take one to four hours to make a homogeneous slurry. The operation ensures that each particle of the manure is subjected to temperatures of 65° C. or higher for a period of at least one hour to kill substantially all the pathogens and weeds.

In certain embodiments, the animal waste slurry prepared as described above is transferred from a slurry tank by pumping, e.g., using a progressive cavity pump. Progressive cavity pumps are particularly suitable devices for moving slurries that can contain extraneous materials such as stones, feathers, wood chips, and the like. The transfer line can be directed into a vibratory screen where the screens can be either vibrating in a vertical axial mode or in a horizontal cross mode. The selected vibratory screen will have appropriate sized holes to ensure that larger materials are excluded from the slurry stream. In one embodiment, the screens exclude materials larger than about ⅛ inch in any dimension.

In particular embodiments, the slurry stream is directed into storage tanks, which may be equipped with pH and temperature controls and/or an agitation system. The slurry can be aerated to remove odiferous compounds that have been formed while the manure was in transit or storage.

Optionally, the off-gases are subjected to bio-filtration or other means of disposal. The slurry stream leaving the storage tank is sent to the centrifuge for the next step of the process.

In the separation step, the slurry stream from the storage tank is pumped into a solid-liquid separation system, which can include but not limited to mechanical screening or clarification. The purpose of this step is to reduce solids, such as cellulosic and hemicellulosic material (e.g., feathers, bones) that is unsuitable for the subsequent ATAB. It is noteworthy that a substantial fraction of phosphorus and calcium present in the feedstock tends to separate with the solids in this step.

A preferred separation method employs a decanter centrifuge that provides a continuous mechanical separation. The operating principle of a decanter centrifuge is based on gravitational separation. A decanter centrifuge increases the rate of settling through the use of continuous rotation, producing a gravitational force between 1000 to 4000 times that of a normal gravitational force. When subjected to such forces, the denser solid particles are pressed outwards against the rotating bowl wall, while the less dense liquid phase forms a concentric inner layer. Different dam plates are used to vary the depth of the liquid as required. The sediment formed by the solid particles is continuously removed by the screw conveyor, which rotates at different speed than the bowl. As a result, the solids are gradually "ploughed" out of the pond and up the conical "beach". The centrifugal force compacts the solids and expels the surplus liquid. The compacted solids then discharge from the bowl. The clarified liquid phase or phases overflow the dam plates situated at the opposite end of the bowl. Baffles within the centrifuge casing direct the separated phases into the correct flow path and prevent any risk of cross-contamination. The speed of the screw conveyor can be automatically adjusted by use of the variable frequency drive (VFD) in order to adjust to variation in the solids load.

Thus, the separation process results in formation of a substantially solid component and a substantially liquid component of the prepared animal waste slurry. The term "substantially solid" will be understood by the skilled artisan to mean a solid that has an amount of liquid in it. In particular embodiments, the substantially solid component may contain, e.g., from about 40% to about 64% moisture, often between about 48% and about 58% moisture, and is sometimes referred to herein as "solid," "cake," or "wet cake." Likewise, the term "substantially liquid" will be understood to mean a liquid that has an amount of solids in it. In particular embodiments, the substantially liquid component may contain between about 2% and about 15% solids (i.e., between about 85% and about 98% moisture), often between about 4% and about 7% solids, and is sometimes referred to herein as "liquid," "liquid component," or "centrate" (the latter if the separation utilizes centrifugation). Approximately 30% of the raw feedstock is retained in the substantially liquid component, with about 70% being retained in the cake.

The solids from the separation step are dried to a moisture content suitable for subsequent handling and packaging of the material. In certain embodiments, the solid component is dried to less than about 20% moisture. In particular embodiments, the solids are dried to less than about 19%, or less than about 18%, or less than about 17%, or less than about 16%, or less than about 15%, or less than about 14%, or less than about 13%, or less than about 12%, or less than about 11%, or less than about 10% moisture. In a preferred embodiment, the solid component is dried to less than 12% moisture. The dried solid is sometimes referred to herein as "dried cake."

In certain embodiments, the manufacturing process is a closed-loop system in which off-gases and water vapors from any or all stages of the system, including the dryer, are captured and condensed into a nutrient-rich liquid form. This liquid can be re-integrated into the liquid manufacturing processes described below, e.g., into the feedstock slurry, the bioreactor or into the base product exiting the bioreactor.

The next step involves subjecting the substantially liquid component to an autothermal thermophilic aerobic bioreaction (ATAB). ATAB is an exothermic process in which the separated liquid component with finely suspended solids is subjected to elevated temperature for a pre-determined period of time. Organic matter is consumed by microorganisms present in the original waste material, and the heat released during the microbial activity maintains thermophilic temperatures. Autothermal thermophilic aerobic bioreaction produces a biologically stable product which contains macro and micro nutrients and PGPB.

In certain embodiments, the elevated temperature conditions are between about 45° C. and about 80° C. More particularly, the elevated temperature conditions are at least about 46° C., or 47° C., or 48° C., or 49° C., or 50° C., or 51° C., or 52° C., or 53° C., or 54° C., or 55° C., or 56° C., or 57° C., or 58° C., or 59° C., or 60° C., or 61° C., or 62° C., or 63° C., or 64° C., or 65° C., or 66° C., or 67° C., or 68° C., or 69° C., or 70° C., or 71° C., or 72° C., or 73° C., or 74° C., or 75° C., or 76° C., or 77° C., or 78° C., or 79° C. In particular embodiments, the elevated temperature conditions are between about 45° C. and about 75° C., more particularly between about 45° C. and about 70° C., more particularly between about 50° C. and about 70° C., more particularly between about 50° C. and about 65° C., and most particularly between about 55° C. and about 60° C.

In certain embodiments, the liquid component is maintained at the elevated temperature for a period of several hours to several days. A range of between 1 day and 18 days is often used. In certain embodiments, the conditions can be maintained for 1, 2, 3, 4, 5, 6, 7, 8 or more days. For purposes of guidance only, the bioreaction is maintained at the elevated temperature for a longer period, e.g., three or more days, to ensure suitable reduction of pathogenic organisms, for instance to meet guidelines for use on food portions of crops. However, inasmuch as the length of the bioreaction affects the biological and biochemical content of the bio-reacted product, other times may be selected, e.g., several hours to one day or two days.

One challenge in operating under aerobic thermophilic conditions is to keep the process sufficiently aerobic by meeting or exceeding the oxygen demand while operating at the elevated temperature conditions. One reason this is challenging is that as the process temperature increases, the saturation value of the residual dissolved oxygen decreases. Another challenge is that the activity of the thermophilic micro-organisms increases within increasing temperature, resulting in increased oxygen consumption by the microorganisms. Because of these factors, greater amounts of oxygen, in various aspects, should be imparted into the biomass containing solutions.

In certain embodiments, oxygen is delivered to the bioreactor by using a jet aeration device. Jet aerators utilize two-phase jet nozzles to supply atmospheric oxygen to chemical and biological treatment processes. Process benefits of jet aeration include high oxygen transfer efficiency, independent control of oxygen transfer and mixing, superior mixing, capital and energy savings, and reduced off-gas. In addition to the efficiency inherent with a fine bubble dispersion of gas into liquid, the turbulent nature of jet aeration produces constant renewal of the gas/liquid interface, further facilitating oxygen transfer. Suitable jet aeration devices are commercially available, e.g., from Fluidyne Corp. (Cedar Falls Iowa), Kla Systems, Inc., (Assonet, Mass.) and Mass Transfer Systems, Inc. (Walpole, Mass.), to name a few.

In certain embodiments, oxygenation of the bioreaction is measured in terms of oxidation-reduction potential (ORP). Typically, the ORP of the bioreaction is maintained between about −480 mV to about +10 mV. More particularly, it is maintained within a range of between −250 mV and −50 mV.

To monitor the temperature, pH and oxygenation parameters of the ATAB, the bioreactor can be equipped with automated controllers to control such parameters. In some embodiments, the bioreactor is equipped with a programmable logic controller (PLC) that effectively controls pH, ORP, and other parameters by adjusting the air supply and feed rate of a pH adjuster to the bio-reactor.

The off-gases from the slurry preparation tank and slurry storage tank contain carbon dioxide, air, ammonia, and water vapors; whereas the off-gases from the bio-reactor contain oxygen depleted air, carbon dioxide and water vapors. In certain embodiments, these off-gases are directed to a biofilter. When applied to air filtration and purification, biofilters use microorganisms to remove undesired elements. The air flows through a packed bed and the pollutant transfers into a thin biofilm on the surface of the packing material. Microorganisms, including bacteria and fungi are immobilized in the biofilm and degrade the pollutant.

The product stream from the bioreactor is directed into a receiving container and can be used as a final product at that stage or subjected to further processing. This composition is sometimes referred to herein as "base composition" or "base product." In certain embodiments, the receiving vessel for the base composition is equipped with an agitation system that maintains the colloidal components of the liquid stream in the homogeneous suspension.

The initial heat step and the heat and other conditions applied in the ATAB are effective to substantially or completely eliminate human pathogenic organisms, as well as weeds and seeds (see, e.g., Examples 1 and 7), leaving beneficial aerobic thermophiles and mesophiles. However, in certain embodiments, the base composition is subjected to a second heat treatment for the purpose of further reducing the microbial load so that the composition can be supplemented with exogenous microorganisms as desired, e.g., in a customized product. This step, referred to herein as "pasteurization" or "flash pasteurization," depending on the time and temperature of treatment, comprises heating the liquid composition to between about 65° C. and about 100° C. for between about 5 minutes and about 60 minutes. In certain embodiments, the base composition is heated to at least 70° C., or at least 75° C., or at least 80° C., or at least 85° C., or at least 90° C., or at least 95° C. In certain embodiments, the base composition is heated for at least 10 minutes, or at least 15 minutes, or at least 20 minutes or at least 25 minutes, or at least 30 minutes, or at least 35 minutes, or at least 40 minutes, or at least 45 minutes, or at least 50 minutes, or at least 55 minutes, noting that the heating time typically is inversely proportional to the heating temperature. In certain embodiments, the composition is heated to about 95° C. for about 30 to 45 minutes.

The liquid composition can also be subjected to one or more filtration steps to remove suspended solids. The solids retained by such filtration processes can be returned to the manufacturing process system, e.g., to the aerobic bioreactor.

Filtration can involve various filter sizes. In certain embodiments, the filter size is 100 mesh (149 microns) or smaller. More particularly, the filter size is 120 mesh (125 microns) or smaller, or 140 mesh (105 microns) or smaller, or 170 mesh (88 microns) or smaller, or 200 mesh (74 microns) or smaller, or 230 mesh (63 microns) or smaller, or 270 mesh (53 microns) or smaller, or 325 mesh (44 microns) or smaller, or 400 mesh (37 microns) or smaller. In particular embodiments, the filter size is 170 mesh (88 microns), or 200 mesh (74 microns), or 230 mesh (63 microns), or 270 mesh (53 microns). In certain embodiments, a combination of filtration steps can be used, e.g., 170 mesh, followed by 200 mesh, or 200 mesh followed by 270 mesh filtrations.

Filtration is typically carried out using a vibratory screen, e.g., a stainless mesh screen, or a pressure filter vessel, or a combination thereof. Filtration typically is carried out on products cooled to ambient air temperature, i.e., below about 28° C.–30° C.

The base product can also be further formulated to produce products, sometimes referred to herein as "formulated products," "formulated compositions," and the like, for particular uses. In certain embodiments, additives include macronutrients, such as nitrogen and potassium. Products formulated by the addition of macronutrients such as nitrogen and potassium are sometimes referred to as "formulated to grade," as would be appreciated by the person skilled in the art. In exemplary embodiments comprising a liquid nutritional composition prepared from chicken manure, the base composition is formulated to contain about 1.5% to about 3% nitrogen and about 1% potassium.

In other embodiments, additives include one or more micronutrients as needed or desired. Though the base composition already contains a wide range of micronutrients and other beneficial substances as described in detail below, it is sometimes beneficial to formulate the composition with such additives. Suitable additives include, but are not limited to, blood meal, seed meal (e.g., soy isolate), bone meal, feather meal, humic substances (humic acid, fulvic acid, humin), microbial inoculants, sugars, micronized rock phosphate and magnesium sulfate, to name a few. Other materials that are suitable to add to the base product will be apparent to the person of skill in the art.

In certain embodiments, the materials added to the base composition are themselves approved for use in an organic farming program, such as the USDA NOP. In particular embodiments, nitrogen is added in the form of sodium nitrate, particularly Chilean sodium nitrate approved for use in organic farming programs. In particular embodiments, potassium is added as potassium sulfate.

The base composition can be formulated any time after it exits the bioreactor and before it is finished for packaging. In one embodiment, the product is formulated with macronutrients prior to any subsequent processing steps. In this embodiment, the product stream is directed into a formulation product receiving vessel where the macronutrients are added. Other materials can be added at this time, as desired. The formulated product receiver can be equipped with an agitation system to ensure that the formulation maintains the appropriate homogeneity.

It will be apparent to the skilled person that the above-described subsequent processing steps, i.e., pasteurization, filtration and formulation, may be performed either singly or in combination, and in any order. Thus, for instance, one embodiment comprises formulation to grade, pasteurization, two levels of filtration and a secondary formulation step. Another embodiment comprises no pasteurization and one or two levels of filtration. Other combinations are also suitable, depending on the desired properties of the finished composition.

Prior to packaging and/or storage, it can be beneficial to adjust the final pH of the liquid composition to enhance stability. Thus, in certain embodiments, the final products can be adjusted to a pH between about 4 and about 7, or between about 4.5 and about 7, or between about 5 and about 7 or between about 5.5 and about 7 or between about 6 and about 7, using a suitable pH adjusting agent as described above. In particular embodiments, the pH adjusting agent is an organic acid, such as citric acid.

In specific embodiments, post-ATAB processing includes one or more of the following steps. The base composition is formulated to grade either as 1.5-0-3 or 3-0-3 (N-P-K) by adding sodium nitrate and potassium sulfate. The pH of the composition is adjusted to 5.5 with citric acid. The composition is flushed through a vibratory screener at about 40 gallons per minute. The vibratory screener is fitted with a 200 mesh stainless steel screen. The filtered product is then pumped through a cartridge filter. Typical operating parameters of the cartridge filter include one or more of the following: (1) differential pressure up to 40 PSI; (2) inlet temperature 29.5° C. (85° F.) or less; and (3) vessel housing pressure up to 40 PSI.

Packaging of the finished product can include dispensing the product into containers from which the material can be poured. In certain embodiments, filled containers may be sealed with a membrane cap ("vent cap," e.g. from W. L. Gore, Elkton, Md.) to permit air circulation in the headspace of the containers. These membranes can be hydrophobic and have pores small enough that material cannot leak even in the event the containers are completely inverted. Additionally, the pores can be suitably small (e.g., 0.2 micron) to eliminate the risk of microbial contamination of the container contents.

Compositions:

The process described above produces two useful compositions from animal waste. The solid composition is produced from one of the two process streams of the separation step. Once dried to an appropriate moisture content, it may be packaged, stored and shipped for use as a solid nutritional composition for plants. In certain embodiments, the dried solid fertilizer is in a free flowing granular form. In particular embodiments, it comprises a bulk density of 50 lbs/ft$^3$.

In a particular embodiment, the process utilizes chicken manure. Table 2 provides a typical analysis for the dry product produced from chicken manure as the starting material.

TABLE 2

| Nutrients/Info | Value AVG |
| --- | --- |
| Ammonium Nitrogen | 0.58% |
| Organic Nitrogen | 3.25% |
| TKN | 3.82% |
| P2O5 | 3.45% |
| K | 1.24% |
| Sulfur | 0.32% |
| Calcium | 10.90% |
| Magnesium | 0.64% |
| Sodium | 0.16% |
| Copper | 61 ppm |
| Iron | 889 ppm |
| Manganese | 502 ppm |

TABLE 2-continued

| Nutrients/Info | Value AVG |
| --- | --- |
| Zinc | 508 ppm |
| Moisture | 8.15% |
| Total Solids | 91.90% |
| Total Salts | n/a |
| pH | 6.4 |
| Total Carbon | 31.40% |
| Organic Matter | 56.65% |
| Ash | 34.50% |
| Chloride | 0.16% |

The liquid nutritional compositions are produced from the other of the two process streams of the separation step. The base product exiting the bioreactor may advantageously be qualified to meet all requirements for use in government-regulated organic programs, such as the USDA NOP, and further may be approved for listing with various testing agencies, such as OMRI. This will depend in part on certain of the process parameters designed to ensure product safety, e.g., segregation of the process steps from raw manure, reduction in pathogen load by (1) initial heating during feedstock preparation, and/or (2) sufficient time at elevated temperature during the ATAB. Thus, in a preferred embodiment, the nutritional composition are able to qualify as a bio-organic liquid fertilizer, which meets all USDA and OMRI requirements.

The liquid compositions (also referred to as "liquid product") are referred to herein as "nutritional compositions;" however, the liquid compositions comprise numerous components, both biological and biochemical, that have been classified as biostimulants, biofertilizers, fertilizers, biocontrol agents and/or soil conditioners in agriculture. Therefore, the liquid compositions may be referred to interchangeably herein as "fertilizers," "biofertilizers" and "bio-organic fertilizers" or "organic biofertilizers," the latter terms applying to compositions that meet requirements for use in an organic farming program.

A typical but non-limiting example of the chemical composition of the liquid product when produced from chicken manure is: Macronutrients: nitrogen 1-3%; phosphorus<0.5%; potassium 1-3%; calcium 1-2%; magnesium 1-2%; sulfur>0.2%. Micronutrients: zinc>100 ppm; iron>300 ppm; manganese>100 ppm; copper<20 ppm; boron<20 ppm. Advantageously, the liquid nutritional compositions contain very little phosphorus (i.e., less than about 0.5%), which is helpful in instances where phosphate excess in soil or phosphate runoff is of concern.

More detailed analysis of these nutritional compositions are set out in Examples 2 and 5, which provide a snapshot of components at various stages of the above-described process. As can be seen from the examples, the chemical, biochemical and biological profiles of the liquid compositions are different at different stages of the process, e.g., raw feedstock, feedstock slurry, substantially liquid component from the separation step (centrate in embodiments utilizing centrifugation for separating the liquid and solid components), substantially solid component from the separation step (cake), sample taken after 24 hours of ATAB (T24), samples taken after 3 days of ATAB (T72), and after formulation to grade, either before ("Form") and after ("Post") pasteurization.

The liquid composition as produced from chicken manure exists as a suspension, inasmuch as it contains suspended solids that migrate with the liquid through the separation and ATAB steps. Larger solids can be filtered out. In certain embodiments, the compositions are flowable and sprayable, e.g., through 200 mesh nozzles. However, filtered material still can comprise a colloidal suspension with an average particle size of suspended solids between about 2 and about 5 microns. The small particles tend to agglomerate with one another. Even so, the product is filterable through a suitably-sized mesh filter as described above.

The nutritional compositions are of varying tan to brown color, with low odor as compared with the starting material. In certain embodiments, the pH of the compositions has been adjusted from the process pH to a final pH between about 4 and about 7, as described above, and may be adjusted as needed, e.g., to between about 4, or about 4.5, or about 5, or about 5.5, or about 6 and about 7.

The liquid compositions contain a variety of viable microorganisms, as shown, for instance, in Examples 3, 8, 9 and 10 herein for chicken manure. Typically, no exogenous microorganisms are added during the process (though they may be added after the ATAB); therefore, all microorganisms present in the liquid compositions are endogenous to the starting material. The liquid compositions comprise at least about $10^8$ colony-forming units per milliliter (CFU/mL) as measured in the base composition from the ATAB. However, the actual viable bacterial count is likely several orders of magnitude higher, given that raw poultry manure can contain $10^{11}$ or more bacteria per mL and the ATAB enriches the material in thermophiles and some mesophiles.

The liquid compositions include the following classes of organisms as assess by phospholipid fatty acid analysis (PFLA) (see, e.g., Examples 3 and 9): Actinobacteria (Actinomycetes), Gram negative bacteria, Gram positive bacteria, fungi, arbuscular mycorrhizal fungi, and protists. The comparative abundance of these classes of organisms is different in samples taken from stage to stage of the manufacturing process (see, e.g., Example 3), which may be of advantage in cases where a particular class of organism, or a particular organism itself, is deemed to be more desirable for a purpose than another.

The microbial communities of the compositions after subjection to ATAB tend to be dominated by Gram positive bacteria, which were also seen to be a substantial component of raw layer manure (see, e.g., Examples 3 and 9). A noteworthy subset of Gram positive bacteria are the Actinobacteria (Actinomycetes), which are consistently present in the liquid compositions that are not subjected to pasteurization (see, e.g., Examples 3, 9 and 10). Certain Actinobacteria are known to produce antibiotics, and they play a significant role in soil nutrient cycling. In addition, several Actinobacteria have been found to produce growth promoting compounds (Strap, J. L., 2012, "Actinobacteria-Plant Interactions: a Boon to Agriculture," in D. K. Maheshwari (ed.), Bacteria in Agrobiology: Plant Growth Responses, Springer-Verlag Berlin Heidelberg). Other small but noteworthy members of the compositions' microbial community include Rhizobia and arbuscular/mycorrhizal fungi, which have been observed in the base composition prior to pasteurization (see Examples 9 and 10). These organisms are known for their roles in nitrogen fixation and improving plant uptake of nutrients from soil, among other advantages.

Enrichment of thermophilic microorganisms from the starting layer manure is inherent in the manufacturing process described herein. Based on the microbial content of chicken manure, the large fraction of bacteria found in the liquid compositions of the invention will fall into classes of thermophilic bacteria with known advantageous properties (though mesophiles may also be present, particularly those that are spore forming).

Among other advantages, thermophiles are important for the mineralization of nitrogen, phosphorus and sulfur, increasing the availability of those nutrients to plants. Additionally, some of the bacteria cultivated in the products are also known for their nitrogen fixation (e.g., *Rhizobium*, as mentioned above) and probiotic properties, while others are known as natural pesticides, including but not limited to *Bacillus firmus* (nematicidal), *Bacillus pumilus* (fungicidal) and *Paenibacillus popilliae* (effective against Japanese Beetle larvae).

The following thermophiles are the dominant species found in composted manure of layer chickens: *Ureibacillus* spp. (including *U. thermosphaericus*), *Bacillus* spp., *Geobacillus* spp. (including *G. stearothermophilus*), *Brevibacillus* spp., and *Paenibacillus* spp. They are described in more detail below.

*Geobacillus* species are known generally to degrade hydrocarbons and are therefore useful in environmental remediation; they are known to degrade nitrogen compounds as well. More specifically, (1) *G. stearothermophilus* can improve waste treatment of metal-polluted water and soil, and can facilitate cellulose breakdown; (2) *G. thermoleovorans* is known for denitrification; (3) *G. thermocaternuiatus* can facilitate cadmium ion biosorption; and *G. thermodenitrificans* is a denitrification organism that reduces $NO_3$ to $NO_2$.

Within the genus *Bacillus*, (1) *B. licheniformis* can degrade feathers; (2) *B. subtilis* possesses several beneficial attributes, including biocontrol, plant growth promotion, sulphur (S) oxidation, phosphorus (P) solubilization and production of industrially important enzymes (amylase and cellulose). Strains of *B. subtilis* have been shown to inhibit the in vitro growth of the fungi *Fusarium oxysporum* (25-34%) and *Botryodiplodia theobromae* (100%), isolated from the postharvest rots of yam (*Dioscorea rotundata*) tubers. Other than biocontrol, *B. subtilis* is known to promote root elongation in seedlings up to 70-74% as compared to untreated seeds. *B. subtilis* is also known to oxidize elemental S to sulfate and has shown distinct P-solubilization activity in vitro. (3) *B. pumilus* has been shown to be an agricultural fungicide in that of the bacterium on plant roots prevents *Rhizoctonia* and *Fusarium* spores from germinating; (4) *B. arnyloliquelaciens* synthesizes a natural antibiotic protein, barnase, a widely studied ribonuclease that forms a tight complex with its intracellular inhibitor barstar, and plantazolicin, an antibiotic with selective activity against *Bacillus anthracis*; (5) *B. firmus*—possesses nematicidal activity and is used to protect roots from nematode infestation when applied directly to the soil, foliar treatment to turf, and as seed treatments (for these uses, *B. firmus* 1-1582 is classified as a biological nematode suppressant); and (6) *B. azotoformans* can reduce nitrite to molecular nitrogen.

Members of the genus *Ureibacillus* are known for their ability to break down soil organic matter and other cellulosic and ligneous material, and to mineralize crop residues. Various isolates of *U. thermosphaericus* have been used in biological detoxification.

Species of *Brevibacillus* are known for their antibiotic properties, with certain species having additional functionality, e.g., (1) some strains of *Br. agri* are capable of oxidizing carbon monoxide aerobically; (2) *Br. Borsteinensis* degrades polyethylene; (3) *Br. levickii*—metabolizes specific amino acids; and (4) *Br. thermoruber* is involved in reduction of nitrates to nitrites and then to molecular nitrogen.

Various *Paenibacillus* spp. also produce antimicrobial substances that affect a wide spectrum of micro-organisms such as fungi, soil bacteria, plant pathogenic bacteria and even important anaerobic pathogens as *Clostridium botulinum*. More specifically, several *Paenibacillus* species serve as efficient plant growth promoting rhizobacteria (PGPR). PGPR competitively colonize plant roots and can simultaneously act as biofertilizers and as antagonists (biopesticides) of recognized root pathogens, such as bacteria, fungi and nematodes. They enhance plant growth by several direct and indirect mechanisms. Direct mechanisms include phosphate solubilization, nitrogen fixation, degradation of environmental pollutants and hormone production. Indirect mechanisms include controlling phytopathogens by competing for resources such as iron, amino acids and sugars, as well as by producing antibiotics or lytic enzymes. With respect to particular species, (1) *P. granivorans* dissolves native soil starches; (2) *P. cookii* is a P solubizer; (3) *P. borealis* is a nitrogen fixing organism and suppresses soil-borne pathogens; (4) *P. popilliae* is a bio pesticide effective against Japanese Beetle larvae; and (5) *P. chinjuensis* is an exopolysaccharide-producing bacterium.

The liquid compositions also contain a vast assortment of biochemical metabolites (see, e.g., Example 4 herein). These include sugars and sugar acids, polyols and sugar alcohols, growth factors, lipids and fatty acids, amines (including amino acids), phenolics, carboxylic and organic acids, and nucleosides, among the compounds that have been identified.

Non-limiting examples of sugars and sugar acids that can be present in the liquid compositions include: 3,6-anhydro-D-galactose, beta-gentiobiose, cellobiose, glucose, glucose-1-phosphate, glyceric acid, fructose, fucose, galactose, isomaltose, isoribose, isothreonic acid, lactobionic acid, lyxose, maltose, maltotriose, ribose, sucrose, tagatose, threonic acid, trehalose, UDP-glucuronic acid, xylonic acid, xylonic acid isomer, xylose, and/or xylulose.

Non-limiting examples of polyols and sugar alcohols that can be present in the liquid compositions include: 1-deoxyerythritol, 1-hexadecanol, 2-deoxyerythritol, deoxypentitol, diglycerol, erythritol, glycerol, hexitol, lyxitol, mannitol, pinitol, threitol, and/or xylitol.

Non-limiting examples of plant hormones and other growth factors that can be present in the liquid compositions include: citramalic acid, indole-3-acetic acid (IAA), 5-hydroxy-3-indoleacetic acid, 6-hydroxynicotinic acid, galactinol, pantothenic acid, and/or salicylic acid.

Non-limiting examples of lipids and fatty acids that can be present in the liquid compositions include: 1-monoolein, 1-monopalmitin, 1-monostearin, 2-monoolein, arachidic acid, arachidonic acid, beta-hydroxymyristic acid, beta-sitosterol, capric acid, caprylic acid, cerotinic acid, cholesterol, cis-gondoic acid, dihydrocholesterol, D-erythro-sphingosine, glycerol-alpha-phosphate, heptadecanoic acid, hexadecylglycerol, isoheptadecanoic acid, lauric acid, lignoceric acid, linoleic acid, myristic acid, nonadecanoic acid, octadecanol, oleamide, oleic acid, palmitic acid, palmitoleic acid, pelargonic acid, pentadecanoic acid, squalene, stearic acid, and/or stigmasterol.

Non-limiting examples of amines that can be present in the liquid compositions include: valine, aminomalonate, 1,3-diaminopropane, 2,4-diaminobutyric acid, 3-aminoisobutyric acid, 5-aminovaleric acid, 5-methoxytryptamine, alanine, alpha-aminoadipic acid, asparagine, aspartic acid, beta-alanine, beta-glutamic acid, citrulline, cyclohexylamine, cysteine, ethanolamine, glutamic acid, glutamine, glycine, glycyl proline, homoserine, hydroxylamine, isoleucine, leucine, lysine, maleimide, methionine, methionine sulfoxide, N-acetyl-D-galactosamine, n-acetyl-d-hexosamine, N-acetylaspartic acid, N-acetylglutamate, N-acetylputrescine, N-carbamylglutamate, N-methylalanine, N-methylglutamic acid, norvaline, O-acetylserine, oxoproline, phenylalanine, phenylethylamine, putrescine, serine, spermidine, taurine, threonine, thymine, trans-4-hydroxyproline, tryptophan, tyramine, and/or tyrosine.

Non-limiting examples of phenolics that can be present in the liquid compositions include: 3,4-dihydroxybenzoic acid, 4-hydroxybenzoate, catechol, cis-caffeic acid, ferulic acid, hydroquinone, phenol, tyrosol, and/or vanillic acid.

Non-limiting examples of carboxylic acids and organic acids that can be present in the liquid compositions include: 2-hydroxy-2-methylbutanoic acid, 2-hydroxyadipic acid, 2-hydroxybutanoic acid, 2-hydroxyglutaric acid, 2-hydroxyhexanoic acid, 2-hydroxyvaleric acid, 2-isopropylmalic acid, 2-ketoadipic acid, 2-methylglyceric acid, 2-picolinic acid, 3-(3-hydroxyphenyl) propionic acid, 3-(4-hydroxyphenyl) propionic acid, 3-hydroxy-3-methylglutaric acid, 3-hydroxybenzoic acid, 3-hydroxybutyric acid, 3-hydroxypalmitic acid, 3-hydroxyphenylacetic acid, 3-hydroxypropionic acid, 3-phenyllactic acid, 3,4-dihydroxycinnamic acid, 3,4-dihydroxy-hydrocinnamic acid, 3,4-dihydroxy-phenylacetic acid, 4-aminobutyric acid, 4-hydroxybutyric acid, 4-hydroxymandelic acid, 4-hydroxyphenylacetic acid, 4-pyridoxic acid, aconitic acid, adipic acid, alpha-ketoglutarate, behenic acid, benzoic acid, chenodeoxycholic acid, citric acid, digalacturonic acid, fumaric acid, gluconic acid, gluconic acid lactone, glutaric acid, glycolic acid, hexuronic acid, hydrocinnamic acid, isocitric acid, isohexonic acid, isopentadecanoic acid, kynurenic acid, lactic acid, malic acid, malonic acid, methylmaleic acid, oxalic acid, oxamic acid, phenylacetic acid, pimelic acid, pipecolinic acid, pyrrole-2-carboxylic acid, pyruvic acid, quinolinic acid, ribonic acid, succinic acid, sulfuric acid, tartaric acid, uric acid, and/or urocanic acid.

Non-limiting examples of nucleosides that can be present in the liquid compositions include: thymidine, 5,6-dihydrouracil, 7-methylguanine, adenine, adenosine, cytosine, guanine, pseudo uridine, and/or uracil.

Non-limiting examples of metabolites that were not placed into the above-mentioned categories but that can be present in the liquid compositions include: zymosterol, 1-methylhydantoin, 1,2-cyclohexanedione, 2-deoxypentitol, 2-deoxytetronic acid, 2-ketoisocaproic acid, 2,3-dihydroxybutanoic acid, 2,8-dihydroxyquinoline, 3-(3-hydroxyphenyl)-3-hydroxypropionic acid, 3-ureidopropionate, 4-methylcatechol, 5-hydroxymethyl-2-furoic acid, butane-2,3-diol, butyrolactam, conduritol-beta-epoxide, creatinine, daidzein, glycerol-3-galactoside, hypoxanthine, isothreitol, lanosterol, methanolphosphate, myo-inositol, nicotinic acid, octadecylglycerol, ononitol, parabanic acid, phosphate, piperidone, propane-1,3-diol, pyrogallol, pyrophosphate, tocopherol acetate, tocopherol alpha-, tocopherol gamma-, urea, xanthine, and/or xanthurenic acid.

As with the microorganisms discussed above, the comparative abundance of these classes of biochemicals is different in samples taken from stage to stage of the manufacturing process (see Example 4), which may be of advantage in cases where a particular class of substances, or a particular substance itself, is deemed to be more desirable for a purpose than is another. A particularly noteworthy class of metabolites present in the liquid compositions is the class of growth factors, including but not limited to, citramalic acid, salicylic acid, galactinol, indole-3-acetic acid (IAA) and 5-hydroxy-IAA. Among other functions, citramalic acid and salicylic acid have been found to solubilize soil phosphorus to facilitate its uptake into plants (Khorassani, R. et al., 2011, BMC Plant Biol. 11: 121). Salicylic acid is a known signaling molecule in host defense reactions such as ISR and SAR. Galactinol has been found to act in concert with other sugars (e.g., raffinose) as osmoprotectants and stabilizers of cellular membranes, and also as scavengers of reactive oxygen species (ROS). As such, galactinol can play a role in the protection of cellular metabolism (particularly photosynthesis in chloroplasts) from oxidative damage (Nishizawa, A., et al., 2008, Plant Physiol. 147(3): 1251-1263). Indole-3-acetic acid (IAA) is the most common, naturally occurring, plant hormone of the auxin class. As do all auxins, IAA has many different effects, such as inducing cell elongation and cell division with all subsequent results for plant growth and development. On a larger scale, IAA serves as signaling molecule necessary for development of plant organs and coordination of growth (Zhao, Y., 2010, Ann. Rev. Plant Biol. 61: 49-64). The IAA derivative 5-hydroxy-3-indoleacetic acid possesses related, though typically less potent, plant hormone properties and is also known as a metabolite of serotonin.

Certain embodiments of the invention can utilize the distinctive metabolite profiles exhibited at certain points of the manufacturing process to enrich for particularly useful compounds, or groups of compounds, such as known plant growth factors. In this regard, it is noteworthy that relatively larger fractions of growth factors can be obtained from an ATAB after 24 hours (e.g., "T24" in Example 4) than later in the process. Among the growth factors identified in the compositions, citramalic acid and/or galactinol may be more readily isolated directly from the separation step (in the centrate), while indole-3-acetic acid and 5-hydroxy-3-indoleacetic acid may be more readily isolated from the ATAB at 24 hours. Such selection of liquid products from different stages may be used to advantage to produce products with different modes of action, e.g., improving P acquisition, favoring induced systemic resistance, promoting overall plant growth, among others.

Other noteworthy metabolite classes that are significantly represented in the liquid compositions include phenolics, amino acids, fatty acids and organic acids.

Phenolics and organic acids are building blocks for complex organic acids such as humic acid and fulvic acid, among other biologically relevant compounds. Fatty acids and lipids are essential, not only as membrane constituents but also for plant growth and development.

Phenolics are additionally significant in plant defenses mechanisms (see Daayf, F. et al, 2012, Chapter 8 in *Recent Advances in Polyphenol Research*, Volume 3, 1$^{st}$ Ed., (Eds Cheynier, V. et al., John Wiley & Sons Ltd.) Phenolic-based plant defense mechanisms include physical changes such as lignification and suberization of the plant cell walls, as well as metabolic changes such as de novo synthesis of pathogenesis-related (PR) proteins, and biosynthesis and accumulation of phenylpropanoid secondary metabolites. Many phytoalexins are produced through the phenylpropanoid pathway. In addition, this pathway contributes not only to the pool of free metabolites but also to the group of compounds that are integrated into cell wall reinforcement.

Amino acids and other nitrogen-containing breakdown products of proteins, and their derivatives, have been shown to have a variety of biostimulatory effects on plants. For example, there is considerable evidence that exogenous application of a number of structural and non-protein amino acids can provide protection from environmental stresses or are active in metabolic signaling (see Calvo, P. et al., 2014, Plant Soil 383: 3-41; du Jardin, P., 2015, Scientia Horticulturae 196: 3-14). Several non-protein amino acids have also been shown to have roles in plant defense (see Huang T. et al. 2011, Phytochemistry 72: 1531-1537; Vranova et al. 2011, Plant Soil 342: 31-48).

Uses:

The dried solid product resulting from the above-described reaction scheme contains all macronutrients and micronutrients required for plant growth. It is dried to an appropriate moisture content and is used as a soil amendment and/or additive for other fertilizer products. The solid composition can be applied prior to planting, or as a side dressing, in accordance with known practices.

The liquid compositions can be formulated in a variety of ways known in the industry, as described above and exemplified herein. For instance, they can be formulated for application to dryland crop systems, field irrigation, drip irrigation, hydroponic and/or other soil-free systems, and turf, among others. They can also be formulated for hydroponic, aeroponic and foliar spray application. They are also formulated for use in various soil-less media, including organic media such as peat moss, composted pine bark, coir and the like, and inorganic media such as sand, vermiculite, perlite, rock wool and the like.

The liquid compositions are used to advantage on any plant or crop, including but not limited to angiosperms, gymnosperms, ferns and mosses. These include, but are not limited to: cereals, such as wheat, barley, rye, oats, rice, maize and sorghum; legumes, such as beans, lentils, peas, soybeans, clover and alfalfa; oil plants, such as canola, mustard, poppy, olives, sunflowers, coconut, castor beans, cocoa beans and groundnuts; beet including sugar beet and fodder beet; cucurbits, such as zucchini, cucumbers, melons, pumpkins, squash and gourds; fiber plants, such as cotton, flax, hemp and jute; fruit, such as stone fruit and soft fruit, such as apples, pears, plums, peaches, almonds, cherries, grapes (for direct consumption or for wine production) and berries, e.g. strawberries, raspberries and blackberries; citrus fruit, such as oranges, lemons, grapefruit and mandarins; vegetables, such as spinach, lettuce, asparagus, cabbages, carrots, onions, tomatoes, potatoes and paprika; trees for lumber or forestation, such as oak, maple, pine and cedar; and also tobacco, nuts, coffee, eggplant, sugar cane, tea, pepper, hops, bananas, natural rubber plants, Cannabis, turfgrasses and ornamentals (e.g., woody perennial, foliage and flower ornamentals, and ornamental grasses).

The compositions also will find utility in non-plant crops, for instance in mushroom culture, wherein they are advantageously applied to substrates such as straw (e.g., cereal straw), enriched sawdust, compost, paper and paper products (e.g., shredded cardboard), plant debris and other organic materials such as seed shells, corncobs, and banana fronds. The compositions can also be formulated for use in culture of algae, including cyanobacteria, which are produced commercially for a variety of purposes. For instance, algae are often cultivated for use as nutritional supplements. Additionally, they are used in photobioreactor systems to recycle flue gas emissions (e.g., carbon dioxide) from operations such as power generating plants.

It is noteworthy that the liquid compositions are aqueous and easy to mix with other aqueous materials and to formulate for drip or spray applications. They have been noted in particular for their ease of use for applications involving spraying or liquid injection, because they tend not to clog machinery like certain oil-based compositions.

In some embodiments, the liquid compositions are formulated to grade, e.g., to provide standardized amounts of macronutrients such as nitrogen and potassium. However, due to their biostimulant content, they have been demonstrated to have a beneficial effect on plants and soils even in the absence of added macronutrients. What is more, the beneficial biostimulants in the compositions enhance the effect of the macronutrients, such that less is needed to produce an equivalent plant growth effect observed with traditional fertilizers (see Example 11). As such, these compositions provide numerous advantages when applied to plants and/or soils, to promote plant growth and health, to deter pests and pathogens, and/or to condition the soil.

Typical application rates for a liquid composition of substantially the content shown in Table 2, formulated to grade at 1.5-0-3 (8.6 lbs/gal) or 3-0-3 (with 1% sulfur, 9.6 lbs/gal), will be understood by the skilled person. Examples are as follows, in gallons per acre. (1) *Brassica*: starter—5-10; side dress, 3-8; (2) cucurbits: starter or side dress, 8-10; (3) leafy greens: Starter, 8; side dress, 8-10; (4) peppers: starter, 5-8; side dress, 8-10; (5) tomatoes: starter or side dress, 5-8; (6) cane fruit: annual/plant ½-1 gallon (7) strawberries: side dress, 10-15; (8) grapevine: side dress, 8-10; (9) corn: starter, 5-8; side dress or foliar, 8-15; (10) soybeans: foliar, 10; (11) small grains: starter, 5-10; side dress, 8-10; (12) hay: starter, 8; side dress or foliar, 5-10. Thus, another aspect of the invention features a method of improving plant health or productivity through the application of the above-described liquid nutritional compositions to plants, plant parts, seeds and/or soils or other media in which plants are grown. The plant or crop selected for such treatment can be any of those listed above, or any other plant or crop known to the skilled person. Depending on the medium in which the plant is grown, the composition may be applied directly to the plant or indirectly through the growth medium, as described above.

The effect of the composition on the health or productivity of the plant can be observed or measured by any means know in the art. For example, plant health or productivity can be observed or measured by one or more of: germination rate, germination percentage, robustness of germination (e.g., hypocotyl, epicotyl, radicle or cotyledon development), root biomass, root structure and development, total biomass, stem, leaf or flower size, crop yield, structural strength/integrity, photosynthetic capacity, time to crop maturity, yield quality (e.g., dry matter, starch and sugar content, protein content, appearance, Brix value), resistance or tolerance to stress (e.g., heat, cold, drought, hypoxia, salinity); and resistance or tolerance to pests or pathogens, (e.g., insects, nematodes, weeds, fungi, bacteria and/or viruses). In certain embodiments, plants treated with the compositions of the invention are compared with untreated plants. "Untreated" plants can include plants treated with a "control," such as water, or plants treated with one or more other compositions, or plants not treated with any compositions. In other embodiments, various parameters of treated plants can be compared with historical measurements for that type of plant in other locations or at other times (e.g., past seasons). Thus, in various embodiments, one or more parameters of growth and/or productivity can be measured between or among the same or an equivalent crop: (a) grown in substantially the same location during the same growing season; or (b) grown in the substantially same location during a different growing season; or (c) grown in a different location during the same growing season; or d) grown in a different location during a different growing season. "The same or equivalent crop" is intended to mean the same plant genus or the same plant species or the same plant subspecies or variety. "Substantially the same location" is intended to mean, for instance, in an adjacent or nearby plot, or in an adjacent or nearby field, or within a defined geographical distance, e.g., closer than one mile apart.

For purposes of such comparison, observations or measurements of parameters of plant health and/or productivity can be made by any convenient or available method, or any combination of methods. These can include, but are not limited to, visual observations, field measurements and laboratory measurements, all of which are familiar to the person skilled in the art.

Another aspect of the invention features a method of conditioning soil, i.e., building and/or improving the quality of soil. This method is particularly applicable to soil in which crops are grown, but alternatively can be applied as a remediation to damaged or polluted soils in which crops are not grown presently.

The condition or quality of soil is composed of inherent and dynamic soil properties. Inherent properties, such as texture, type of clay, depth of bedrock, drainage class and the like, are not affected to a great extent by management efforts. In contrast, dynamic properties or use-dependent properties can change over the course of months and years in response to land use or management practice changes. Dynamic properties include organic matter, soil structure, infiltration rate, bulk density, and water and nutrient holding capacity. Changes in dynamic properties depend both on land management practices and the inherent properties of the soil. Some properties, such as bulk density, may be considered inherent properties below 20-50 cm, but are dynamic properties near the surface.

Thus, deficiencies in dynamic properties of soil can be addressed by management efforts and the compositions of the invention may be used to advantage in this regard. Such deficiencies include, but are not limited to, deficiencies in organic matter, chemical/nutrient deficiencies, microbial content and structural parameters such as lack of porosity (compaction). Measurable soil quality indicators and their functions in agricultural settings include, but are not limited to: aggregate stability, available water capacity, bulk density, infiltration capacity, respiration, slaking and soil crusts, soil structure and macropores, presence and/or quantity of macronutrients and/or micronutrients, and biological content, i.e., total biomass and breakdown of biological communities, e.g., quantity and type of bacteria, fungi, protists and other soil dwellers (insects, nematodes, earthworms and the like).

The compositions can be applied to soil before planting a crop, or they can be applied to soil containing crops or other growths of plants, or they can be applied to soil between plantings, i.e., between growing seasons. In certain embodiments, application rates can be the same as those exemplified above for treatment of plants. Indeed, in this regard, treatment of plants via application to soils also comprises a treatment of the soil itself. In other embodiments, application rates are different from those selected for treatment of plants.

In certain embodiments, soil treated with the compositions of the invention is compared with untreated soil. "Untreated" soil can include soil treated with a "control," such as water, or soil treated with one or more other compositions, or soil not treated with any compositions. In one embodiment, such comparison comprises "before and after" measurements, or sequential periodic measurements of the soil being treat over a selected time period. In other embodiments, various parameters of treated soils can be compared with historical measurements for that type of soil in other locations or at other times. Thus, in various embodiments, one or more parameters of soil conditioning can be measured between or among the same or an equivalent soil type in substantially the same location or in a different location. "The same or equivalent soil" is intended to mean the same or similar soil type, and/or a different soil type with a similar deficiency. "Substantially the same location" is intended to mean, for instance, in an adjacent or nearby plot, or in an adjacent or nearby field, or within a defined geographical distance, e.g., closer than one mile apart.

For purposes of such comparison, observations or measurements of parameters of soil condition or quality can be made by any convenient or available method, or any combination of methods. These can include, but are not limited to, visual observations, field measurements and laboratory measurements, all of which are familiar to the person skilled in the art.

mixed with water 25 adequate to elevate the moisture level of the slurry to a moisture range from about 84% to about 87% moisture. The slurry was then heated with steam 30 to 65° C. for a minimum of 1 hour to break down the manure into fine particles and was fully homogenized into a slurry for further processing. Additionally, the step included both the killing of any pathogens that were found in raw manure as well as the activation of native thermophilic bacteria. In a particular embodiments, this part of the manufacturing process was segregated from the rest of the system to reduce the risk that processed fertilizer material would be contaminated by raw manure. The mixing tank process parameters for the preparation of feedstock material 20 are shown in Table 3.

TABLE 3

Mixing Tank Process Parameters.

| Process Parameter | Range of Operational Parameters | | Notes |
|---|---|---|---|
| Mixing Tank | 3,000 to 4,000 gallons | | Tank Size 5,000 gallons |
| Axial Turbine Mixer | 45 to 60 HZ | 75 to 100% | Spins clockwise, forces material down turns tank over 1 to 3 times per minute |
| Macerator | 45 to 60 HZ | 75 to 100% | Reduces particle size, homogenizes mix |
| Pump | 45 to 60 HZ | 75 to 100% | Pump Size 3 HP, Positive Displacement |
| Mixing Tank pH | 6.5 to 7.0 | | Citric acid addition varies from patch to patch typically 1 to 2% by weight addition |
| Mixing Tank Temperature | 65 C. to 75 C. 60 minutes | | Measured by thermowell via tank penetration |
| Moisture % | 84 to 87% | | Measured by loss of drying |
| Viscosity | 2000 to 3000 CPS | | |
| Heating Method | Direct Steam Injection 3 to 8 PSI | | Direct steam injection to heat the material |

HZ, hertz;
HP, horsepower;
CPS, centipoise;
PSI, pounds per square inch

The following examples are provided to describe the invention in greater detail. They are intended to illustrate, not to limit, the invention.

Example 1. Process for Producing Fertilizer/Nutritional Composition from Chicken Manure Depicted in FIG. 1 is an embodiment of the production process described herein for producing liquid and solid fertilizers from chicken manure. The production process depicted in FIG. 1 produced pathogen-free products that retained the primary and secondary nutrients, as well as micro-nutrients, present in layer manure. In addition, the process described herein removed potentially problematic phosphorus from the products.

As shown in FIG. 1, the process began 10 when raw chicken manure was transported to the location directly from the farm(s) in covered live bottom trailers. The trucks were unloaded into mix tanks at the location and combined with citric acid 15 and water to form a homogeneous slurry. The citric acid bound the natural organic ammonia in raw manure.

The next step in the process involved the preparation of feedstock material 20. In this step, the stored slurry was The slurry was then sent to the centrifuge 35, whereas debris, oyster shells, and other grit from chicken feed were removed 40. In preferred embodiments, centrifuge 35 is a decanting centrifuge. Suitable centrifuge parameters for the separation of the solid and liquid fractions are shown in Table 4. The centrifuge 35 separated the slurry into two streams—a liquid stream and a solid stream. The solid stream 42 was dried to about 12% (or less) moisture and used to produce a dry fertilizer product ("dry formulation"). The liquid stream 45 was sent to the aerobic bioreactor 50.

TABLE 4

Centrifuge parameters

| Process Parameter | Range of Operational Parameters | Notes |
|---|---|---|
| Decanting Centrifuge | 3250 RPM Max | |
| Influent volume | 25-30 gallons per minute | Slurry from mixer being pumped into centrifuge |
| Effluent volume | 25% of input manure by weight is extracted as finely suspended solids | Liquid fraction exiting the centrifuge |
| Solids separation | 75% of input manure by weight | Solids fraction discharge |

TABLE 4-continued

Centrifuge parameters

| Process Parameter | Range of Operational Parameters | Notes |
|---|---|---|
| Differential | 7 to 12% | |
| Bowl Speed | 2900 to 3250 RPM | |
| Torque Scroll | 10% or less | |

RPM, revolutions per minute

Once the liquid stream 45 was fed to the to the aerobic bioreactor 50, native microorganisms were cultivated. These metabolized the organic components of the feedstock into primary and secondary metabolomic byproducts including, but not limited to, plant growth factors, lipids and fatty acids, phenolics, carboxylic acids/organic acids, nucleosides, amines, sugars, polyols and sugar alcohol, and other compounds. Depending on its age, the liquid feedstock remained in the aerobic bioreactor 50 under gentle agitation (e.g., full turnover occurs 6 times per hour) for a minimum of 1 days to a maximum of about 8 days, and at a uniform minimum temperature of 55° C. The aerobic bioreactor process parameters are provided in Table 5.

mildly aerobic conditions at a temperature ranging from about 45° C. (i.e., the temperature at which the product enters into the mesophilic state) to about 15-20° C. (i.e., room temperature). For the specialty product, formulated liquid product was flash pasteurized 55, filtered 60, and then further formulated (secondary formulation) 65 for special use, e.g., with custom microbes. The specialty product is then transferred into a storage or packaged 70.

Liquid products were filtered using a vibratory stainless mesh followed by a cartridge filter vessel unit with operating parameters that include a 27 gallons per minute (GPM) inlet flow at 84 pounds per square inch (PSI) with 0 differential pressure at 27° C. In such embodiments, the cartridge filters are rated at 100 mesh with 99.9% absolute rating. For the particular embodiment depicted in FIG. 1, the formulated liquid product (the standard or the specialty following the pasteurization step 55) was completely homogenized with necessary amendments and cooled to ambient temperature (i.e., about 15-20° C.). For example, the amendments included sodium nitrate and potassium sulfate. The pH of the homogenized product was titrated to 5.50 with citric acid and then flushed through a vibratory stainless mesh screener at about 40 gallons per minute. The vibratory screener was

TABLE 5

Bioreactor process parameters

| Process Parameter | Range of Operational Parameters | | | | Notes |
|---|---|---|---|---|---|
| Data collection Record | 1 minute to 30 minutes | | | | How frequent the PLC records data |
| Hydraulic Retention time/ Residence time of material in reactors | 1 to 8 days | | | | How long the material resides in the bioreactor |
| Bioreactor #1 Foam Level (feet) | 8 to 13 feet | | | | 8,000 gallon tank |
| Bioreactor #2 Foam Level (feet) | 8 to 13 feet | | | | 8,000 gallon tank |
| Bioreactor Blower (Hz) | 0 to 28 HZ | 0-46% | 0-46 | SCFM | 0-100 SCFM 6PSI |
| Bioreactor Foam Pump (Hz) | 0 to 60 HZ | 0-100% | 0-200 | GPM | 0-200 GPM pump 7.5 HP pump |
| Bioreactor Mixing Pump (Hz) | 0 to 60 HZ | 0-100% | 0-750 | GPM | 0-750 GPM pump 15 HP pump |
| Bioreactor ORP (mV) | −480 to +10 mV | | | | Analytical tool |
| Bioreactor pH | 6.5 to 7.0 | | | | Analytical tool |
| Bioreactor Temperature (° C.) | 45 to 70 C. | | | | Analytical tool |
| pH peristaltic pump | 0-8 GPH | | | | pH adjustment tool ON/OFF signal processed via 4-20ma signal from Bioreactor pH probe |
| Influent to Bioreactor Pump PSI | 3 to 5 PSI | | | | Pressure into the Pump |
| Discharge Foam Cutting Pump | 8 to 10 PSI | | | | Pressure exiting the foam cutting spray nozzle at the top of the tank |

GPH, gallons per hour;
PSI, pounds per square inch;
Hz, hertz;
ORP, oxidation reduction potential;
PLC, programmable logic controller The liquid product from the aerobic bioreactor 50 was managed in either of two ways. The first was a standard product process, while the second was a specialty product process. Both products were formulated 62 (primary formulation) with supplemental nitrogen (e.g., sodium nitrate, blood meal or hydrolyzed oilseeds) and potassium (e.g., sulfate of potash), and filtered directly into storage or packaging 70. For standard product process, the formulated liquid product was filtered 63 and transferred into a storage tank 70. The formulated standard product was stored under fitted with a 200 mesh stainless steel screen. The filtered product was then pumped through a cartridge filter to a receiving vessel having an approximate 275 gallon tote or a 6,500 gallon storage tank. The operating parameters of the cartridge vessel included a differential pressure up to about 40 pounds per square inch (PSI), an inlet temperature up to about 85° F. (about 29.5° C.), and a vessel housing pressure up to about 40 PSI. The parameters for the pasteurization 55 and filtration 63, 60 are summarized in Table 6.

TABLE 6

Downstream processing after bioreactor

| Process Parameter | Range of Operational Parameters | Notes |
|---|---|---|
| Pasteurization | 65 to 100° C. 5 to 60 minutes | Steam injection |
| Filtration Step 1 | 88 to 74 micron | vibratory stainless mesh |
| Filtration Step 2 | 50 to 74 micron | pressure filter vessel |

For storage 70, storage vessels were maintained under mild aerobic conditions at a pH from about 6.5 to about 7.0. The headspaces of the storage tanks were purged with sterile air and agitated to ensure thorough mixing of the air. While the product was indefinitely stable under these conditions, the storage also served as a maturation stage with mesophilic bacteria converting ligand and cellulosic material into plant-useful compounds. Prior to bulk shipment or packaging 70, a third filtration step was applied. Bottles were sealed with a membrane cap to permit air circulation in the headspace of the containers. The membranes were hydrophobic with pores having a very small size (less than about 0.2 microns) such that material would not leak even when the containers were inverted. The small size of the pores also significantly reduced the potential for microbial contamination from the environment. The storage parameters for certain aspects of the storage and filtration are shown in Table 7.

TABLE 7

Storage parameters

| Process Parameter | Range of Operational Parameters | Notes |
|---|---|---|
| Axial Turbine mixing | 50-68 RPM | 42 inch axial turbine shaft, 1.5 HP 1 to 1.6 turnovers per minute Interval programmed mixing cycle |
| Filtration Step 3 | 50-74 micron | Final filtration prior to shipment QC step hybrid sieve test |

HP, horsepower;
RPM, revolutions per minute;
QC, quality control

In certain embodiments, quality control measures were included to reduce the risk of pathogen reemergence. For instance, the above-described fertilizer production process is a closed system to safeguard against accidental contamination with raw manure. In such aspects, quality control included three major quality assurance steps: 1) raw manure storage was segregated in closed tanks away from the rest of the manufacturing process; 2) the product was transported from formulation/flash pasteurization step directly to storage without exposure; and 3) bulk packages (totes/tankers) and bottles were loaded in an area distant from manure storage.

Samples taken from various stages of the process described above and depicted in FIG. 1 (circles labeled 1-7) were subjected to several analyses, including metabolite profiling, macronutrient composition, micronutrient composition, total carbon content, total nitrogen content, and microbial community characterization. These samples included the raw manure (sample 1 or Raw) taken from the initial process step 10, the slurry taken after the preparation of feedstock material 25 (sample 2 or Slurry), the solid taken after the separation by centrifugation 35 (sample 3 or Cake), the liquid stream 45 taken after the separation by centrifugation 35 (sample 4 or Centrate), the sample taken after 24 hours in the aerobic bioreactor 50 (sample 5A or T24), the sample taken after 72 hours in the aerobic bioreactor 50 and prior to primary formulation 52 (sample 5B or T72), the sample taken after primary formulation without heat pasteurization (sample 6 or Formulated Unpasteurized), and the sample taken after the final heat pasteurization step 55, but prior to filtration 60 (sample 7 or Formulated Post-Pasteurized). In some examples, formulated liquid fertilizer samples were also taken from the product material that had been filtered 60. The samples discussed above were evaluated according to the methods described herein to produce the results described in the following Examples.

Example 2. Chemical Composition of Samples 1-7

The production process was carried out as described in Example 1, and samples 1-7 were taken from various stages of the process as indicated in FIG. 1. In the particular examples, samples 1-4 and 5B were submitted for chemical composition analysis to determine the macro and micronutrient content as well as the fertilizer equivalents within each sample. Each sample was submitted to the University of Kentucky Soil and Plant Testing Laboratory (Lexington, Ky., USA) and analyzed to determine the macronutrient content, micronutrient content, and the fertilizer equivalents. The results for each sample are summarized in Table 8.

TABLE 8

Chemical composition of samples taken from various process stages.

| | Info | | | | | |
|---|---|---|---|---|---|---|
| Nutrients | 1-Raw | 2-Slurry | 4-Centrate | 3-Cake* WET | 3-Cake** DRY | 5B-T72 |
| Ammonium Nitrogen | 0.88% | 0.53% | 0.33% | 0.72% | 0.58% | 0.40% |
| Organic Nitrogen | 1.89% | 0.35% | 0.31% | 0.86% | 3.25% | 0.21% |
| TKN | 2.78% | 0.88% | 0.64% | 1.79% | 3.82% | 0.61% |
| P2O5 | 2.03% | 0.72% | 0.28% | 1.67% | 3.45% | 0.34% |
| K | 1.40% | 0.50% | 0.31% | 0.57% | 1.24% | 0.43% |
| Sulfur | 0.39% | 0.10% | 0.07% | 0.46% | 0.32% | 0.07% |
| Calcium | 3.56% | 1.16% | 0.27% | 5.48% | 10.90% | 0.30% |
| Magnesium | 0.36% | 0.11% | 0.05% | 0.25% | 0.64% | 0.06% |
| Sodium | 0.33% | 0.06% | 0.05% | 0.25% | 0.16% | 0.09% |
| Copper (ppm) | 90 | 13 | >25 | >25 | 61 | 5 |
| Iron (ppm) | 490 | 244 | 50 | 934 | 889 | 50 |
| Manganese (ppm) | 219 | 78 | 75 | 210 | 502 | 20 |
| Zinc (ppm) | 288 | 82 | 42 | 197 | 508 | 25 |

TABLE 8-continued

Chemical composition of samples taken from various process stages.

| Nutrients | 1-Raw | 2-Slurry | 4-Centrate | 3-Cake* WET | 3-Cake** DRY | 5B-T72 |
|---|---|---|---|---|---|---|
| Moisture | 51.93% | 88.04% | 95.58% | 55.43% | 8.15% | 94.90% |
| Total Solids | 49.04% | 11.96% | 4.43% | 44.57% | 91.90% | 5.10% |
| Total Salts | n/a | 2.67% | 1.35% | 6.29% | n/a | 1.31% |
| pH | 7.6 | 7.0 | 6.8 | 7.4 | 6.4 | 7.4 |
| Total Carbon | 17.07% | 3.34% | 1.23% | 14.28% | 31.40% | n/a |
| Organic Matter | 22.32% | 5.73% | 2.34% | 27.12% | 56.65% | 2.39% |
| Ash | 19.00% | 2.00% | 1.33% | 9.65% | 34.50% | 1.45% |
| Chloride | 0.39% | 0.06% | 0.10% | 0.04% | 0.16% | 0.12% |

*Sample 3-Cake WET was taken directly following centrifugation.
**Sample 3-Cake DRY was dried to less than 12% moisture content.

In addition, FTIR was performed on samples 1-7 (except sample 5B) to examine how the different steps in the production process transform the raw product. In this example, the samples were evaluated for structural and/or biochemical changes that may have occurred throughout the production process. Fourier Transform Infrared Spectroscopy (FTIR) is a tool suitable for collecting infrared (IR) spectra resulting from the adsorption of molecules within a solid, liquid, or gas sample. IR spectroscopy relies on the fact that certain molecules absorb specific frequencies determined by the shape and configuration of absorbing molecules. FTIR was used to examine how the raw product was transformed as it underwent the different steps of a production process described herein, e.g., in Example 1. In particular, IR spectra from the mid-IR region (i.e., 600 to 1800 $cm^{-1}$) were used to evaluate the structural or biochemical changes that may have occurred throughout the production process. To accomplish this, a 5% mixture of material from each of samples 1-6 was prepared by freeze-drying followed by grinding and thorough mixing with potassium bromide (KBr). IR spectra were recorded using a NICOLET 6700 FTIR (Thermo Fisher Scientific Inc., Waltham, Mass., USA) equipped with a SMART collector diffuse reflectance accessory and MCT/A detector. In these examples, each sample spectra was an average of 254 spectra collected with 4 $cm^{-1}$ resolution.

Figure 2:
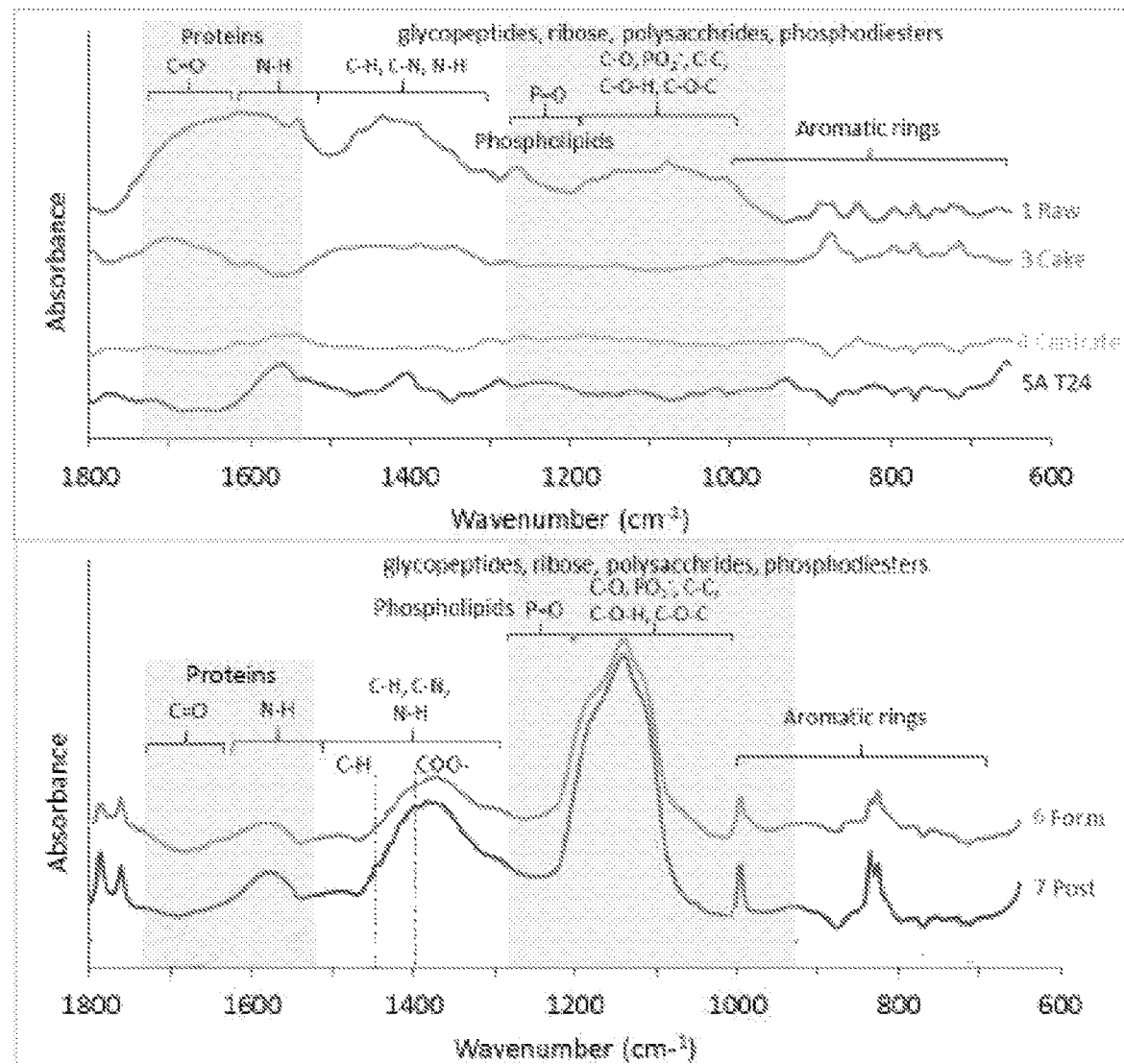
FIG. 2 is a graph showing FTIR spectra from samples collected at various stages in the production process of FIG. 1. Band assignments are based on Filip and Hermann (Eur. J. Soil. Biol., 2001, 37:137-143); Maquelin et al. (J. Microbiol., 2002, 51:255-271), and Rodriquez (Clin. Microbiol. News, 2000, 22:57-61), the contents of each of which are incorporated by reference herein in their entireties. The vertical lines indicate the location of absorption bands characteristic for functional groups contributing to the formation of absorption bands at specific wavenumbers. 1 Raw, raw manure or sample 1; 3 Cake, filter cake or sample 2; 4 Centrate, liquid stream centrate or sample 4; 5A T24, liquid product after 72 hours in aerobic bioreactor or sample 5A; 6 Form, formulated unpasteurized liquid product or sample 6; 7 Post, formulated post-pasteurized liquid product or sample 7.

FIG. 2 depicts a significant reduction in the characteristic fingerprint region of proteins (1750-1500 $cm^{-1}$) and the bands associated with phospholipids (1250-1220 $cm^{-1}$), glycopeptides, ribose, polysaccharides and phosphodiesters (1200-1000 $cm^{-1}$) during the production process. When compared to the Raw sample, spectra from the formulated samples 6 and 7 (i.e., Formulated Unpasteurized and Formulated Post-Pasteurized, respectively) had greater signal intensities from the phospholipid, glycopeptide, ribose and polysaccharides region and less from the proteins region. The reduction in proteins and increase in phospholipids are likely indicative of the microbial driven decomposition taking place during the production process. Decomposition of components in the 'as-received' material (e.g., raw bedding and feathers) during the production process resulted in an increase in components of microbial origin (i.e., phospholipids found in microbe cell walls) and those resulting from decomposition (e.g., phosphodiesters).

Example 3. Microbial Communities Present in Samples 1-7

Samples 1-7 (except for sample 5B) from the process described in Example 1 were analyzed for microbial community composition. To identify and characterize the microbial communities that are present in these samples, microbial biomarkers were analyzed using phospholipid fatty acid (PLFA) analysis. While concentration of biomarker groups may increase or decrease within a particular stage, they may do so disproportionally. As such, relative abundance (i.e., the concentration of each biomarker group relativized to the total microbial biomass (TMB) within each sample) was used to evaluate how the microbial community composition within each sample changes throughout the process. Interpreting the data prepared in these two ways (i.e., concentration and proportional abundance) was expected to prove useful. For example, the percent biomarker for one category may decrease even though its absolute concentration increases. As such, the composition of the microbial community within a sample may be more telling of its function, or functional potential, than the concentration of any one biomarker group alone.

Phospholipids were extracted from each of the samples using the high-throughput methodology described by Buyer and Sasser (2012, Applied Soil Ecology, 61:127-130), the content of which is incorporated by reference herein in its entirety. Briefly, phospholipids were extracted from freeze dried samples in Bligh-Dyer extractant containing an internal 19:0 (1,2-dinonadecanoyl-sn-glycero-3-phosphocholine) standard for 2 hours by rotating end-over-end followed by centrifugation for 10 minutes. Then, the liquid phase from each sample was transferred to 13×100 mm test tubes and 1.0 ml chloroform and deionized water were added. After vortexing for 10 seconds, the samples were centrifuged for 10 minutes and the top phase removed, while the lower phase containing the phospholipids was evaporated to dryness. Lipid separation was achieved by solid phase extraction (SPE) using a 96 well SPE plate (Phenomenex, Torrance, Calif., USA). The dried samples were dissolved in 1 ml hexane and loaded onto the SPE column followed by two 1 ml additions of chloroform and 1 ml of acetone. Phospholipids were then eluted from the column into new vials using a 0.5 ml of a 5:5:1 methanol:chloroform:$H_2O$ mixture. A transesterification reagent (0.2 ml) was then added, and the samples were incubated at 37° C. for 15 minutes. After incubation, acetic acid (0.075M) and chloroform (0.4 ml) were added to each sample. Each sample was quickly vortexed and then allowed to separate, after which the bottom phase was removed and evaporated to dryness. The extract was then dissolved in 0.7 µl of hexane and the fatty acid methyl esters (FAME) detected on an AGILENT 7890 gas chromatograph (GC) equipped with automatic sampler, an Agilent 7693 Ultra 2 column, and a flame ionization detector (Agilent Technologies, Wilmington, Del., USA). The carrier gas was ultra-high-purity hydrogen gas with a column split ratio of 30:1. The oven temperature was increased from 190° C. to 285° C. and then to 310° C. at a rate of 10° C./min and 60° C./min, respectively. FAME identities and relative percentages were automatically calculated using MIDI methods (Sherlock Microbial Identification System version 6.2, MIDI Inc., Newark, Del., USA) described by Buyer and Sasser (2012).

Figure 3:
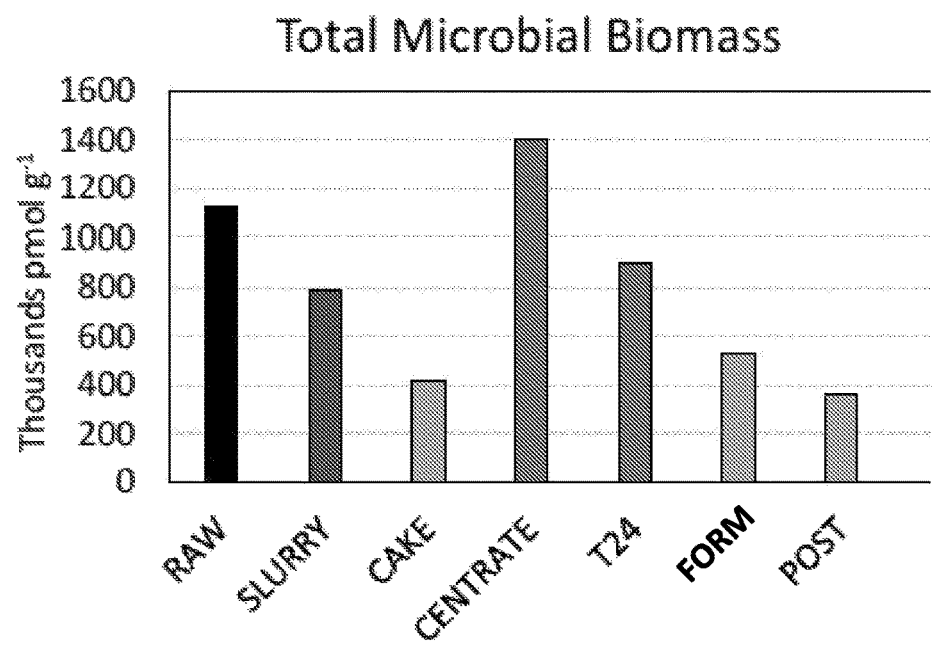
FIG. 3 is a bar graph showing the concentration of microbial biomarker groups in samples collected at various stages in the fertilizer production process of FIG. 1. The x-axis identifies the various samples, including the raw chicken manure (Raw), the slurry taken from the slurry stage (Slurry), the solid taken after centrifugation (Cake), the liquid taken after centrifugation (Centrate), the sample taken after 24 hours in the bioreactor (T24), the formulated sample taken after 72 hours in the bioreactor and prior to the pasteurization step (Form), and the formulated sample taken after the final heat pasteurization step (Post). The y-axis indicates the concentration of the microbial markers in pmol $g^{-1}$.

As shown in FIG. 3 and Table 9, the greatest concentration of total microbial biomass (i.e., the total of the bacterial biomass and the fungi biomass) was detected in both the Raw and Centrate samples followed by the T24, Slurry and Formulated Unpasteurized samples. The Cake and Formulated Post-Pasteurized samples had the least concentration of total microbial biomass. Shown in Tables 9 and 10 are the PLFA results for actinobacteria, gram positive bacteria, gram negative bacteria, fungi, arbuscular mycorrhizal fungi, and protists. General fatty acid methyl ester (FAME) biomarkers are those found across multiple microbial biomarker groups and are not assigned to any one group. However, FAME biomarkers are included in calculations of total microbial biomass. Actinobacteria are a phylum of gram positive bacteria that are distinctive for the significant role they play in soil nutrient cycling. Several Actinobacteria species have been identified that produce growth promoting compounds (see, e.g., Strap (2012)).

The concentration of total fungal biomass (TFB) of the first four steps of the production process (i.e., samples 1-4 or Raw, Slurry, Cake, and Centrate, respectively) was in the range from about 110 nmol g$^{-1}$ to about 150 nmol g$^{-1}$, but then decreased greatly in the T24 sample. The lowest concentration of TFB among the samples tested was found in the Formulated Post-Pasteurized sample. The Formulated Post-Pasteurized sample follows the pasteurization step in the production process, which likely explains the reduction in TFB and overall reduction in the concentration of all microbial biomarker groups in this sample.

General fungal biomass made up a greater portion of the total microbial biomass in samples 1-3 compared to all other samples tested. As shown in Table 10, the Cake (3) sample had the greatest relative abundance of fungi making up over a quarter of the total microbial biomass present. The proportion of Gram positive bacteria decreased from 35% in the Raw (1) sample to its lowest, 6.9%, in the Cake (3) sample.

TABLE 10

Microbial community composition based on relative abundance of PLFA biomarker groups.

| Sample | Relative Abundance (%) | | | | | | |
|---|---|---|---|---|---|---|---|
| | FAME | Actin | G– | G+ | Fungi | AM Fungi | Protists |
| 1-Raw | 44.1 | 0.60 | 6.8 | 35.1 | 13.0 | 0.02 | 0.32 |
| 2-Slurry | 61.2 | 0.77 | 9.1 | 14.6 | 13.7 | 0.03 | 0.62 |
| 3-Cake | 59.2 | 0.49 | 6.9 | 6.9 | 26.0 | 0.00 | 0.67 |
| 4-Centrate | 59.5 | 0.80 | 10.1 | 19.3 | 9.6 | 0.04 | 0.64 |
| 5A-T24 | 45.9 | 0.48 | 7.7 | 43.1 | 2.7 | 0.00 | 0.08 |
| 6-Form | 43.2 | 0.26 | 6.3 | 48.0 | 2.2 | 0.02 | 0.05 |
| 7-Post | 33.5 | 0.37 | 4.0 | 60.4 | 1.7 | 0.00 | 0.04 |

Form, Formulated Unpasteurized sample;
Post, Formulated Post-Pasteurized sample;
FAME, fatty acid methyl esters;
Actin, Actinobacteria;
G–, gram negative bacteria;
G+, gram positive bacteria;
AM Fungi, arbuscular mycorrhizal fungi Example 4. Identification of Metabolites Samples 1-7 (except sample 5B) were collected as described above and analyzed via Gas chromatography mass spectrometry (GC/MS) to provide insight into how the chemical profiles differ between the different process steps and as a first-approximation of the chemical composition in the samples. GC time of flight MS (GC-TOF-MS) is a commonly used mass spectrometric method for determining the chemical composition within a complex matrix. The approach used herein was untargeted in that the analysis was not aimed at identifying any one particular class of compounds, but rather provided an approximation of all the chemicals present in the sample. The ability to identify the compounds from their mass spectra was dependent on the quality and size of the database of compounds with known mass spectra.

In preparation for GC analysis, samples were extracted in acetonitrile, dried down in a SPEEDVAC vacuum concen-

TABLE 9

Concentration of microbial biomarker groups in samples from the process of Example 1.

| Sample | Concentration (nmol g$^{-1}$) | | | | | | | | | | |
|---|---|---|---|---|---|---|---|---|---|---|---|
| | FAME | Actin | G– | G+ | Fungi | AM Fungi | Protists | TBB | TFB | TMB | F:B |
| 1-Raw | 496.52 | 6.81 | 76.80 | 394.74 | 146.55 | 0.2809 | 3.56 | 974.86 | 146.83 | 1125.25 | 0.1305 |
| 2-Slurry | 484.68 | 6.06 | 71.92 | 115.88 | 108.62 | 0.2500 | 4.88 | 678.55 | 108.87 | 792.30 | 0.1374 |
| 3-Cake | 245.44 | 2.03 | 28.50 | 28.47 | 107.68 | B.D. | 2.76 | 304.44 | 107.68 | 414.88 | 0.2596 |
| 4-Centrate | 831.61 | 11.19 | 141.33 | 270.39 | 134.45 | 0.5509 | 8.96 | 1254.52 | 135.01 | 1398.48 | 0.0965 |
| 5A-T24 | 412.97 | 4.32 | 68.84 | 387.97 | 24.43 | B.D. | 0.69 | 874.10 | 24.43 | 899.22 | 0.0272 |
| 6-Form | 228.79 | 1.40 | 33.35 | 254.12 | 11.59 | 0.0917 | 0.28 | 517.67 | 11.68 | 529.63 | 0.0221 |
| 7-Post | 121.03 | 1.34 | 14.42 | 218.31 | 6.03 | B.D. | 0.13 | 355.10 | 6.03 | 361.26 | 0.0167 |

Form, Formulated Unpasteurized sample;
Post, Formulated Post-Pasteurized sample;
FAME, fatty acid methyl esters;
Actin, Actinobacteria;
G–, gram negative bacteria;
G+, gram positive bacteria;
AM Fungi, arbuscular mycorrhizal fungi;
TBB, total bacterial biomass;
TMB, total microbial biomass;
TFB, total fungal biomass;
F:B, fungus to bacteria ratio trator (ThermoFisher Scientific Inc., Waltham, Mass., USA), and then derivatized for GC TOF-MS according to Sana et al. (Metabolomics, 2010, 6:451-465), the content of which is incorporated by reference herein in its entirety. An AGILENT 6890 gas chromatograph coupled to a PEGASUS IV TOF mass spectrometer (Agilent, Böblingen, Germany) was used to analyze the composition. A GERSTEL CIS4 with dual MPS injector with a multipurpose sample (MPS2) dual rail was used to inject 0.5 μL of the sample into the GERSTEL CIS cold injection system (Gerstel, Muehlheim, Germany). The injector was operated in splitless mode with a flow rate of 10 μl/s and then by opening the split vent after 25 seconds. Next, the temperature was increased from 50° C. to 250° C. at a rate of 12° C./s. For separation, a 30 m long, 0.25 mm i.d. Rtx-5Sil MS column was used with an additional 10 m integrated guard column (0.25 μm of 5% diphenyl film and an additional 10 m integrated guard column; Restek, Bellefonte, Pa.). The carrier gas (99.9999% pure Helium) was used with a built-in purifier (Airgas, Radnor Pa.) set at constant flow rate of 1 ml/min. The oven temperature was held constant at 50° C. for 1 min and then ramped at 20° C./min to 330° C. and held constant for 5 minutes. Mass spectrometry was performed on a PEGASUS IV TOF mass spectrometer (LECO Corp., St. Joseph, Mich.) with the transfer line temperature between gas chromatograph and mass spectrometer maintained at 280° C. The electron impact ionization energy was −70 eV, and the ion source temperature was 250° C. MS data were acquired from m/z 85-500 at 17 spectra $s^{-1}$ controlled by the LECO-CHROMA TOF software vs. 2.32 (LECO Corp., St. Joseph, Mich.). Data were preprocessed immediately after acquisition and stored as .cdf files. Automated metabolite annotation was performed using the BinBase metabolic annotation database as described in Fiehn et al., ("Setup and Annotation of Metabolomic Experiments by Integrating Biological and Mass Spectrometric Metadata" in LECTURE NOTES IN COMPUTER SCIENCE, vol. 3615 pp. 224-239 (2005)), the content of which is incorporated herein by reference in its entirety. The relative abundance of the compounds was calculated via peak height normalized to the sum intensity of all identified peaks. As one skilled in the art will appreciate, peak height is a more precise for identifying low abundance metabolites. Hierarchical clustering was used to group the identified root exudate compounds into clusters using a Ward's minimum variance method as described in Ward (J. Am. Statistical Assoc., 1963, 58:236-244), the content of which is incorporated by reference herein in its entirety. The results are presented as dendrograms, and color maps were generated after clustering to show how the metabolite levels vary between the different stages of the production process. The identity and distribution of known compounds in each of the samples is discussed first and then followed by a discussion of the unknowns.

Known Compounds.

Figure 4:
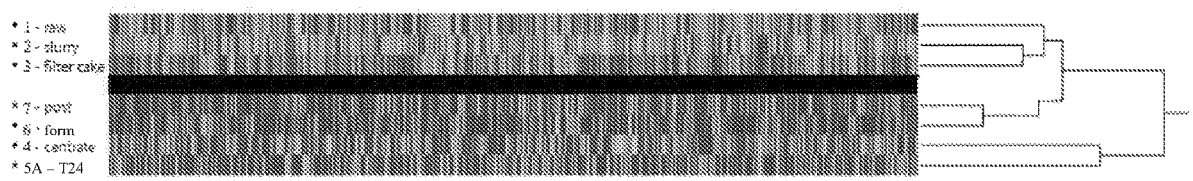
FIG. 4 depicts the heat map resulting from hierarchical cluster analysis (Ward's minimum variance method) showing the relative peak abundance of the known compounds in the 7 samples (rows) taken from the fertilizer production process of FIG. 1. Each column represents one of the 254 identified metabolites where the colors from blue, gray to red reflect the relative abundance of the metabolites from lowest to highest. The dendrogram to the right of the heat map indicates similarities between the samples.

Of the 706 unique compounds identified in the untargeted GC analysis, 252 were positively identified (FIG. 4). The dendrogram to the right of the heat map in FIG. 4 indicates which samples are most similar to each other. The Centrate (4) and T24 (5A) samples had the greatest relative peak abundance for a large majority of the chemicals identified and were unique among the other steps in the process. The relative abundance of chemicals in the Formulated Post-Pasteurized (7) and Formulated Unpasteurized (6) samples were similar, and both were similar to the Slurry (2) and Cake (3) samples. Chemicals in fractions 2 and 3, and 6 and 7 were similar to those in the Raw (1) sample.

The 252 identified chemicals were classified into distinct chemical classes including sugars, polyol/sugar alcohols, growth factors, lipids/fatty acids, amines, phenolics, carboxylic and organic acids, and nucleosides. Those compounds not fitting any of these classes were categorized as "other". The relative peak abundance of each of these compound classes within each of the samples is depicted in Table 11. The Raw sample had a large proportion of carboxylic and organic acids, the proportion of which were appreciably reduced in the Slurry, Cake and Centrate samples, which were dominated by amines and a greater proportion of lipids and fatty acids. In the T24 sample, the proportion of carboxylic and organic acids rebounded as did the proportion of unclassified chemicals (i.e., other). The chemical composition and amounts thereof in the Formulated Unpasteurized and Formulated Post-Pasteurized samples were very similar. Shown in Table 12 is a list of the known chemicals identified and grouped by functional class. Table 13 provides the relative peak abundance data of the identified known chemicals for each sample tested.

TABLE 11

Relative peak abundance of the identified chemicals.

| Sample | Sugar | Polyol/ Sugar alcohol | Growth factor | Lipids/ fatty acids | amines | phenolics | Carboxylic acids/ organic acids | nucleosides | other |
|---|---|---|---|---|---|---|---|---|---|
| 1-Raw | 66705 | 39217 | 11772 | 225618 | 1376373 | 63343 | 2825680 | 34567 | 300420 |
| 2-Slurry | 60431 | 30507 | 16992 | 378225 | 1984846 | 26576 | 497403 | 5169 | 154921 |
| 3-Cake | 50141 | 14407 | 10742 | 383221 | 975961 | 12574 | 273535 | 3112 | 94318 |
| 4-Centrate | 193671 | 73318 | 48621 | 778905 | 4007446 | 60056 | 1261583 | 25568 | 468090 |
| 5A-T24 | 43963 | 76236 | 206776 | 342180 | 2904018 | 32799 | 1991126 | 24324 | 853369 |
| 6-Form | 5774 | 7242 | 14057 | 196666 | 305760 | 5938 | 582619 | 1326 | 88778 |
| 7-Post | 7010 | 6441 | 17710 | 145750 | 448978 | 5821 | 713499 | 1716 | 148832 |

Form, Formulated Unpasteurized;

Post, Formulated Post-Pasteurized

TABLE 12

List of identified known chemicals.

| Name | Representative Function |
|---|---|
| Sugars and Sugar Acids | |
| 3,6-anhydro-D-galactose | |
| beta-gentiobiose | |
| cellobiose | a disaccharide with the formula [HOCH$_2$CHO(CHOH)$_3$]$_2$O. Cellobiose, a reducing sugar, consists of two β-glucose molecules linked by a β bond. |
| glucose | |
| glucose-1-phosphate | |
| glyceric acid | a natural three-carbon sugar acid |
| fructose | |
| fucose | a hexose deoxy sugar with the chemical formula C$_6$H$_{12}$O$_5$. It is found on N-linked glycans on the mammalian, insect and plant cell surface, and is the fundamental sub-unit of the fucoidan polysaccharide. |
| galactose | |
| isomaltose | |
| isoribose | |
| isothreonic acid | A sugar acid derived from therose |
| lactobionic acid | a sugar acid. It is a disaccharide formed from gluconic acid and galactose. |
| lyxose | Lyxose is an aldopentose - a monosaccharide containing five carbon atoms, and including an aldehyde functional group. I |
| maltose | |
| maltotriose | |
| ribose | |
| sucrose | |
| tagatose | Tagatose is a functional sweetener. It is a naturally occurring monosaccharide, specifically a hexose. It is often found in dairy products, and is very similar in texture to sucrose and is 92% as sweet, but with only 38% of the calories. |
| threonic acid | Threonic acid is a sugar acid derived from threose. The L-isomer is a metabolite of ascorbic acid. One study suggested that because L-threonate inhibits DKK1 expression in vitro, it may have potential in treatment of androgenic alopecia. |
| trehalose | Trehalose, also known as mycose or tremalose, is a natural alpha-linked disaccharide formed by an α,α-1,1-glucoside bond between two α-glucose units. |
| UDP-glucuronic acid | Uridine diphosphate glucuronic acid is a sugar used in the creation of polysaccharides and is an intermediate in the biosynthesis of ascorbic acid. |
| xylonic acid | Xylonic acid is a sugar acid that can be obtained by the complete oxidation of xylose |
| xylonic acid isomer | Xylonic acid is a sugar acid that can be obtained by the complete oxidation of xylose |
| xylose | a monosaccharide of the aldopentose type, which means that it contains five carbon atoms and includes a formyl functional group. |
| xylulose | Xylulose is a ketopentose, a monosaccharide containing five carbon atoms, and including a ketone functional group. It has the chemical formula C$_5$H$_{10}$O$_5$. |
| Polyols/Sugar Alcohols | |
| 1-deoxyerythritol | |
| 1-hexadecanol | |
| 2-deoxyerythritol | A polyol |
| deoxypentitol | |
| diglycerol | |
| erythritol | sugar alcohol that has been approved for use as a food additive in the United States and throughout much of the world. |
| glycerol | |
| hexitol | |
| lyxitol | |
| mannitol | an osmotic diuretic that is metabolically inert in humans and occurs naturally, as a sugar or sugar alcohol, in fruits and vegetables |
| pinitol | a cyclic polyol. It is a known anti-diabetic agent isolated from *Sutherlandia frutescens* leaves. Gall plant tannins can be differentiated by their content of pinitol.. |
| threitol | a four-carbon sugar alcohol with the molecular formula C$_4$H$_{10}$O$_4$. It is primarily used as an intermediate in the chemical synthesis of other compounds. |
| xylitol | a sugar alcohol used as a sweetener. |
| Growth Factors | |
| indole-3-acetate (IAA) | the most common, naturally-occurring, plant hormone of the auxin class. |
| 5-hydroxy-3-indoleacetic acid | is the main metabolite of serotonin |
| 6-hydroxynicotinic acid | an intermediate in the oxidation of nicotonic acid by *Pseudomonas fluorescens* |
| citramalic acid | Citramalic acid and salicylic acid in sugar beet root exudates solubilize soil phosphorus |
| galactinol | Galactinol Is a Signaling Component of the Induced Systemic Resistance Caused by *Pseudomonas chlororaphis* O6 Root Colonization |
| pantothenic acid | |
| salicylic acid | a monohydroxybenzoic acid, a type of phenolic acid and a beta hydroxy acid; widely used in organic synthesis and functions as a signaling moledule. |

TABLE 12-continued

List of identified known chemicals.

| Name | Representative Function |
| --- | --- |
| Lipids/Fatty Acids | |
| 1-monoolein | one of the most important lipids in the fields of drug delivery, emulsion stabilization and protein crystallization |
| 1-monopalmitin | |
| 1-monostearin | |
| 2-monoolein | |
| arachidic acid | is a polyunsaturated omega-6 fatty acid 20:4. It is structurally related to the saturated arachidic acid found in Cupuaçu butter. |
| arachidonic acid | is a polyunsaturated omega-6 fatty acid 20:4. It is structurally related to the saturated arachidic acid found in Cupuaçu butter. |
| beta-hydroxymyristic acid | also called tetradecanoic acid, is a common saturated fatty acid |
| beta-sitosterol | one of several phytosterols with chemical structures similar to that of cholesterol. Sitosterols are white, waxy powders with a characteristic odor. |
| capric acid | a saturated fatty acid (no double bond so in shorthand 10:0) member of the sub-group called medium chain fatty acids (MCFA), from 6 to 12 carbon atoms. |
| caprylic acid | common name for the eight-carbon saturated fatty acid known by the systematic name octanoic acid |
| cerotinic acid | A longchain fatty acid found in natural waxes, wool fat, and certain lipids. |
| cholesterol | a sterol (or modified steroid), [4]a lipid molecule and is biosynthesized by all animal cells because it is an essential structural component of all animal cell membranes that is required to maintain both membrane structural integrity and fluidity |
| cis-gondoic acid | |
| dihydrocholesterol | |
| D-erythro-sphingosine | |
| glycerol-alpha-phosphate | |
| heptadecanoic acid | or margaric acid, is a saturated fatty acid. Its molecular formula is $CH_3(CH_2)_{15}COOH$ |
| hexadecylglycerol | |
| isoheptadecanoic acid | Heptadecanoic acid, or margaric acid, is a saturated fatty acid. Its molecular formula is $CH_3(CH_2)_{15}COOH$ |
| lauric acid | Lauric acid or systematically, dodecanoic acid, is a saturated fatty acid with a 12-carbon atom chain, |
| lignoceric acid | or tetracosanoic acid, is the saturated fatty acid with formula $C_{23}H_{47}COOH$. It is found in wood tar, various cerebrosides, and in small amounts in most natural fats. |
| linoleic acid | Conjugated linoleic acids are a family of at least 28 isomers of linoleic acid found mostly in the meat and dairy products derived from ruminants. |
| myristic acid | also called tetradecanoic acid, is a common saturated fatty acid with the molecular formula $CH_3(CH_2)_{12}COOH$. |
| nonadecanoic acid | a 19-carbon long-chain saturated fatty acid |
| octadecanol | |
| oleamide | amide of the fatty acid oleic acid |
| oleic acid | a fatty acid that occurs naturally in various animal and vegetable fats and oils. I |
| palmitic acid | or hexadecanoic acid in IUPAC nomenclature, is the most common fatty acid found in animals, plants and microorganisms. |
| palmitoleic acid | a common constituent of the glycerides of human adipose tissue |
| pelargonic acid | |
| pentadecanoic acid | a saturated fatty acid. Its molecular formula is $CH_3(CH_2)_{13}COOH$. It is rare in nature, being found at the level of 1.2% in the milk fat from cows. |
| squalene | a natural 30-carbon organic compound originally obtained for commercial purposes primarily from shark liver oil, although plant sources are now used as well, including amaranth seed, rice bran, wheat germ, and olives |
| stearic acid | a saturated fatty acid with an 18-carbon chain |
| stigmasterol | Stigmasterol is an unsaturated phytosterol occurring in the plant fats or oils Pasteurization will inactivate stigmasterol. |
| Amines | |
| valine | an α-amino acid that is used in the biosynthesis of proteins. |
| aminomalonate | an enzyme inhibitor |
| 1,3-diaminopropane | trimethylenediamine, is a simple diamine with the formula $(CH_2)_3(NH_2)_2$. |
| 2,4-diaminobutyric acid | |
| 3-aminoisobutyric acid | a product formed by the catabolism of thymine |
| 5-aminovaleric acid | |
| 5-methoxytryptamine | also known as mexamine, is a tryptamine derivative closely related to the neurotransmitters serotonin and melatonin |
| alanine | an α-amino acid that is used in the biosynthesis of proteins. |
| alpha-aminoadipic acid | an intermediate in the α-Aminoadipic acid pathway for the metabolism oflysine and saccharopine |
| asparagine | an α-amino acid that is used in the biosynthesis of proteins. |
| aspartic acid | also known as aspartate, is an α-amino acid that is used in the biosynthesis of proteins |
| beta-alanine | a naturally occurring beta amino acid, which is an amino acid in which the amino group is at the β-position from the carboxylate group |

TABLE 12-continued

List of identified known chemicals.

| Name | Representative Function |
|---|---|
| beta-glutamic acid | an α-amino acid that is used in the biosynthesis of proteins. |
| citrulline | organic compound citrulline is an α-amino acid. Its name is derived from *citrullus*, the Latin word for watermelon, from which it was first isolated in 1914 |
| cyclohexylamine | |
| cysteine | a semi-essential proteinogenic amino acid with the formula $HO_2CCHCH_2SH$. |
| ethanolamine | |
| glutamic acid | an α-amino acid that is used in the biosynthesis of proteins. |
| glutamine | an α-amino acid that is used in the biosynthesis of proteins. |
| glycine | an α-amino acid that is used in the biosynthesis of proteins. |
| glycyl proline | |
| homoserine | Homoserine is an α-amino acid with the chemical formula $HO_2CCHCH_2CH_2OH$. L-Homoserine is not one of the common amino acids encoded by DNA. It differs from the proteinogenic amino acid serine by insertion of an additional —$CH_2$— unit into the backbone. |
| hydroxylamine | Hydroxylamine is an inorganic compound with the formula $NH_2OH$. |
| isoleucine | an α-amino acid that is used in the biosynthesis of proteins |
| leucine | an α-amino acid used in the biosynthesis of proteins. |
| lysine | an α-amino acid that is used in the biosynthesis of proteins. |
| maleimide | Maleimide is a chemical compound with the formula $H_2C_2(CO)_2NH$. This unsaturated imide is an important building block in organic synthesis. |
| methionine | Methionine is an essential amino acid in humans. Like other essential amino acids this means that a restriction of dietary intake to zero will eventually lead to death. |
| methionine sulfoxide | Methionine sulfoxide is the organic compound with the formula $CH_3SCH_2CH_2CHCO_2H$. It occurs naturally although it is formed post-translationally. |
| N-acetyl-D-galactosamine | N-Acetylgalactosamine, is an amino sugar derivative of galactose |
| n-acetyl-d-hexosamine | |
| N-acetylaspartic acid | |
| N-acetylglutamate | In prokaryotes, lower eukaryotes and plants it is the first intermediate in the biosynthesis of arginine |
| N-acetylputrescine | |
| N-carbamylglutamate | an affective precursor of arginine |
| N-methylalanine | |
| N-methylglutamic acid | chemical derivative of glutamic acid in which a methyl group has been added to the amino group. It is an intermediate in methane metabolism. |
| norvaline | an amino acid with the formula $CH_3(CH_2)_2CHCO_2H$. The compound is an isomer of the more common amino acid valine. |
| O-acetylserine | s the α-amino acid with the chemical formula $HO_2CCHCH_2OCCH_3$. It is an intermediate in the biosynthesis of the common amino acid cysteine in bacteria and plants. |
| oxoproline | |
| phenylalanine | an α-amino acid used in the biosynthesis of proteins |
| phenylethylamine | |
| putrescine | Putrescine, or tetramethylenediamine, is a foul-smelling organic chemical compound $NH_2(CH_2)_4NH_2$ that is related to cadaverine; both are produced by the breakdown of amino acids in living and dead organisms and both are toxic in large doses |
| serine | an α-amino acid that is used in the biosynthesis of proteins. |
| spermidine | Spermidine is a polyamine compound found in ribosomes and living tissues, and having various metabolic functions within organisms. |
| taurine | Taurine, or 2-aminoethanesulfonic acid, is an organic compound that is widely distributed in animal tissues. It is a major constituent of bile and can be found in the large intestine, and accounts for up to 0.1% of total human body weight. |
| threonine | an α-amino acid that is used in the biosynthesis of proteins. |
| thymine | one of the four nucleobases in the nucleic acid of DNA that are represented by the letters G-C-A-T. The others are adenine, guanine, and cytosine. Thymine is also known as 5-methyluracil, a pyrimidine nucleobase. |
| trans-4-hydroxyproline | a common non-proteinogenic amino acid |
| tryptophan | an α-amino acid that is used in the biosynthesis of proteins. |
| tyramine | Tyramine, also known by several other names, is a naturally occurring monoamine and trace amine derived from the amino acid tyrosine. Tyramine acts as a catecholamine releasing agent. |
| tyrosine | Tyrosine or 4-hydroxyphenylalanine is one of the 22 amino acids that are used by cells to synthesize proteins. It is a non-essential amino acid with a polar side group. |
| Phenolics | |
| 3,4-dihydroxybenzoic acid | |
| 4-hydroxybenzoate | |
| catechol | |
| cis-caffeic acid | consists of both phenolic and acrylic functional groups. It is found in all plants because it is a key intermediate in the biosynthesis oflignin, one of the principal components of plant biomass and its residues |
| ferulic acid | hydroxycinnamic acid, a type of organic compound. It is an abundant phenolic phytochemical found in plant cell wall components such as arabinoxylans as covalent side chains. |

TABLE 12-continued

List of identified known chemicals.

| Name | Representative Function |
|---|---|
| hydroquinone | Hydroquinone has a variety of uses principally associated with its action as a reducing agent that is soluble in water. |
| phenol | |
| tyrosol | Tyrosol is a phenylethanoid, a derivative of phenethyl alcohol. It is a natural phenolic antioxidant present in a variety of natural sources. The principal source in the human diet is olive oil. |
| vanillic acid | Vanillic acid is a dihydroxybenzoic acid derivative used as a flavoring agent. It is an oxidized form of vanillin. It is also an intermediate in the production of vanillin from ferulic acid. |
| Carboxylic Acids/Organic Acids | |
| 2-hydroxy-2-methylbutanoic acid | |
| 2-hydroxyadipic acid | |
| 2-hydroxybutanoic acid | a hydroxybutyric acid with the hydroxyl group on the carbon adjacent to the carboxyl. |
| 2-hydroxyglutaric acid | |
| 2-hydroxyhexanoic acid | |
| 2-hydroxyvaleric acid | |
| 2-isopropylmalic acid | an intermediate in the biosynthesis of leucine |
| 2-ketoadipic acid | |
| 2-methylglyceric acid | |
| 2-picolinic acid | organic compound with the formula $C_5H_4N$. It is a derivative of pyridine with a carboxylic acid substituent at the 2-position. It is an isomer of nicotinic acid, which has the carboxyl side chain at the 3-position. |
| 3-(3-hydroxyphenyl)propionic acid | |
| 3-(4-hydroxyphenyl)propionic acid | |
| 3-hydroxy-3-methylglutaric acid | |
| 3-hydroxybenzoic acid | |
| 3-hydroxybutyric acid | |
| 3-hydroxypalmitic acid | |
| 3-hydroxyphenylacetic acid | |
| 3-hydroxypropionic acid | |
| 3-phenyllactic acid | |
| 3,4-dihydroxycinnamic acid | |
| 3,4-dihydroxy-hydrocinnamic acid | |
| 3,4-dihydroxy-phenylacetic acid | a metabolite of the neurotransmitter dopamine |
| 4-aminobutyric acid | |
| 4-hydroxybutyric acid | |
| 4-hydroxymandelic acid | |
| 4-hydroxyphenylacetic acid | a chemical compound found in olive oil and beer. In industry the chemical is an intermediate used to synthesize atenolol and 3,4-dihydroxyphenylacetic acid |
| 4-pyridoxic acid | |
| aconitic acid | |
| adipic acid | the organic compound with the formula $(CH_2)4(COOH)_2$. From an industrial perspective, it is the most important dicarboxylic acid: |
| alpha-ketoglutarate | one of two ketone derivatives of glutaric acid. Its anion, α-ketoglutarate is an important biological compound. α-Ketoglutarate is one of the most important nitrogen transporters in metabolic pathways. |
| behenic acid | a carboxylic acid, the saturated fatty acid with formula $C_{21}H_{43}COOH$. |
| benzoic acid | a colorless crystalline solid and a simple aromatic carboxylic acid. |
| chenodeoxycholic acid | a bile acid. It occurs as a white crystalline substance insoluble in water but soluble in alcohol and acetic acid |
| citric acid | |
| digalacturonic acid | |
| fumaric acid | or trans-butenedioic acid is the chemical compound with the formula $HO_2CCH=CHCO_2H$. This white crystalline compound is one of two isomeric unsaturated dicarboxylic acids, the other being maleic acid. |
| gluconic acid | an organic compound with molecular formula $C_6H_{12}O_7$ and condensed structural formula $HOCH_2(CHOH)_4COOH$. Gluconic acid, gluconate salts, and gluconate esters occur widely in nature because such species arise from the oxidation of glucose |
| gluconic acid lactone | also known as gluconolactone, is a food additive with the E number E575 used as a sequestrant, an acidifier, or a curing, pickling, or leavening agent. |
| glutaric acid | |
| glycolic acid | Glycolic acid; chemical formula $C_2H_4O_3$, is the smallest α-hydroxy acid. |
| hexuronic acid | |
| hydrocinnamic acid | Phenylpropanoic acid or hydrocinnamic acid is a carboxylic acid with the formula $C_9H_{10}O_2$ belonging to the class of phenylpropanoids. |

TABLE 12-continued

List of identified known chemicals.

| Name | Representative Function |
|---|---|
| isocitric acid | Isocitric acid is an organic compound closely related to citric acid. |
| isohexonic acid | Hexanoic acid is the carboxylic acid derived from hexane with the general formula $C_5H_{11}COOH$. |
| isopentadecanoic acid | |
| kynurenic acid | a product of the normal metabolism of amino acid L-tryptophan. It has been shown that kynurenic acid possesses neuroactive activity. |
| lactic acid | an organic compound with the formula $CH_3CHCO_2H$. |
| malic acid | Malic acid is an organic compound with the molecular formula $C_4H_6O_5$. It is a dicarboxylic acid that is made by all living organisms, contributes to the pleasantly sour taste of fruits, and is used as a food additive. |
| malonic acid | Malonic acid is a dicarboxylic acid with structure $CH_2(COOH)_2$. |
| methylmaleic acid | Maleic acid or cis-butenedioic acid is an organic compound that is a dicarboxylic acid, a molecule with two carboxyl groups |
| oxalic acid | |
| oxamic acid | |
| phenylacetic acid | a white solid with a disagreeable odor. Endogeneously, it is a catabolite of phenylalanine. |
| pimelic acid | Pimelic acid is the organic compound with the formula $HO_2C(CH_2)_5CO_2H$. Derivatives of pimelic acid are involved in the biosynthesis of the amino acid called lysine |
| pipecolinic acid | a small organic molecule which accumulates in pipecolic acidemia. It is the carboxylic acid of piperidine. |
| pyrrole-2-carboxylic acid | |
| pyruvic acid | Pyruvic acid is the simplest of the alpha-keto acids, with a carboxylic acid and a ketone functional group. |
| quinolinic acid | Quinolinic acid, also known as pyridine-2,3-dicarboxylic acid, is a dicarboxylic acid with a pyridine backbone |
| ribonic acid | obtained by oxidation of ribose |
| succinic acid | Succinic acid is a dicarboxylic acid with chemical formula $(CH_2)_2(CO_2H)_2$. |
| sulfuric acid | |
| tartaric acid | Tartaric acid is a white crystalline organic acid that occurs naturally in many plants, most notably in grapes. Its salt, potassium bitartrate, commonly known as cream of tartar, develops naturally in the process of winemaking. |
| uric acid | Uric acid is a heterocyclic compound of carbon, nitrogen, oxygen, and hydrogen with the formula $C_5H_4N_4O_3$. It forms ions and salts known as urates and acid urates, such as ammonium acid urate. |
| urocanic acid | Urocanic acid is an intermediate in the catabolism of L-histidine. |
| Nucleosides | |
| thymidine | Thymidine is a pyrimidine deoxynucleoside. Deoxythymidine is the DNA nucleoside T, which pairs with deoxyadenosine in double-stranded DNA. In cell biology it is used to synchronize the cells in G1/early S phase. |
| 5,6-dihydrouracil | an intermediate in the catabolism of uracil |
| 7-methylguanine NIST | a modified purine nucleoside. It is a methylated version of guanosine and when found in human urine, it may be a biomarker of some types of cancer. |
| adenine | nucleobase. Its derivatives have a variety of roles in biochemistry including cellular respiration, |
| adenosine | purine nucleoside composed of a molecule of adenine attached to a ribosesugar molecule (ribofuranose) moiety via a β-N$_9$-glycosidic bond. |
| cytosin | Cytosine is one of the four main bases found in DNA and RNA, along with adenine, guanine, and thymine. It is a pyrimidine derivative, with a heterocyclic aromatic ring and two substituents attached. The nucleoside of cytosine is cytidine |
| guanine | one of the four main nucleobases found in the nucleic acids DNA and RNA, the others being adenine, cytosine, and thymine. |
| pseudo uridine | Pseudouridine is an isomer of the nucleoside uridine in which the uracil is attached via a carbon-carbon instead of a nitrogen-carbon glycosidic bond. It is the most prevalent of the over one hundred different modified nucleosides found in RNA. |
| uracil | one of the four nucleobases in the nucleic acid of RNA that are represented by the letters A, G, C and U. The others are adenine, cytosine, and guanine. In RNA, uracil binds to adenine via two hydrogen bonds. |
| Others | |
| zymosterol | Zymosterol is a cholesterol intermediate in the cholesterol biosynthesis. Disregarding some intermediate compounds lanosterol can be considered a precursor of zymosterol in the cholesterol synthesis pathway |
| 1-methylhydantoin | |
| 1,2-cyclohexanedione | |
| 2-deoxypentitol NIST | |
| 2-deoxytetronic acid | |
| 2-ketoisocaproic acid | an intermediate in the metabolism of leucine |
| 2,3-dihydroxybutanoic acid NIST | |
| 2,8-dihydroxyquinoline | Product of quinoline metabolism by *Pseudomonas* sp |
| 3-(3-hydroxyphenyl)-3-hydroxypropionic acid | |

TABLE 12-continued

List of identified known chemicals.

| Name | Representative Function |
| --- | --- |
| 3-ureidopropionate | an intermediate in the metabolism of uracil |
| 4-methylcatechol | 4-Methylcatechol is a chemical compound. It is a component of castoreum, the exudate from the castor sacs of the mature beaver. |
| 5-hydroxymethyl-2-furoic acid NIST | A byproduct of the fungus *Aspergillus* and probably other species of fungi and yeast as well |
| butane-2,3-diol NIST | 2,3-Butanediol has three stereoisomers, all of which are colorless, viscous liquids. Butanediols have applications as precursors to various plastics and pesticides. is produced by a variety of microorganisms in a process known as butanediol fermentation. It is found naturally in cocoa butter, in the roots of *Ruta graveolens*, sweet corn, and in rotten mussels. |
| butyrolactam NIST | a chemical compound from the group of lactams . Butyrolactam, the lactam of the γ-aminobutyric acid (GABA), an inhibitory neurotransmitter , and it can be obtained by hydrolysis are converted to GABA. |
| conduritol-beta-epoxide | |
| creatinine | |
| daidzein | structurally belongs to the group of isoflavones |
| glycerol-3-galactoside | |
| hypoxanthine | a naturally occurring purine derivative. It is occasionally found as a constituent of nucleic acids, where it is present in the anticodon of tRNA in the form of its nucleoside inosine. |
| isothreitol | |
| lanosterol | a tetracyclic triterpenoid and is the compound from which all animal and fungi steroids are derived. |
| methanolphosphate | |
| myo-inositol | Inositol or cyclohexane-1,2,3,4,5,6-hexol is a chemical compound with formula $C_6H_{12}O_6$ or $(-CHOH-)_6$, a six-fold alcohol of cyclohexane |
| nicotinic acid | Nicotinic acid and its amide nicotinamide are the common forms of the B-vitamin niacin (vitamin B3). |
| octadecylglycerol | |
| ononitol | Ononitol is a cyclitol. It is a 4-O-methyl-myo-inositol and is a constituent of *Medicago sativa*. |
| parabanic acid NIST | |
| phosphate | |
| piperidone | a derivative of piperidine with the molecular formula $C_5H_9NO$. 4-Piperidone is used as an intermediate in the manufacture of chemicals and pharmaceutical drugs. |
| propane-1,3-diol NIST | 1,3-Propanediol is the organic compound with the formula $CH_2(CH_2OH)_2$. This three-carbon diol is a colorless viscous liquid that is miscible with water. |
| pyrogallol | Pyrogallol is an organic compound with the formula $C_6H_3(OH)_3$. It is a white solid although because of its sensitivity toward oxygen, samples are typically brownish. It is one of three isomeric benzenetriols |
| pyrophosphate | pyrophosphate is a phosphorus oxyanion |
| tocopherol acetate | Tocopheryl acetate, also known as vitamin E acetate, is a common vitamin supplement with the molecular formula $C_{31}H_{52}O_3$. It is the ester of acetic acid and tocopherol. It is often used in dermatological products such as skin creams. |
| tocopherol alpha- | α-Tocopherol is a type of tocopherol or vitamin E |
| tocopherol gamma- | γ-Tocopherol is one of the chemical compounds that is considered vitamin E |
| urea | |
| xanthine | Xanthine, is a purine base found in most human body tissues and fluids and in other organisms. A number of stimulants are derived from xanthine, including caffeine and theobromine. Xanthine is a product on the pathway of purine degradation. |
| xanthurenic acid | Xanthurenic acid, or xanthurenate, is a chemical shown to induce gametogenesis of *Plasmodium falciparum*, the parasite that causes malaria. It is found in the gut of the *Anopheles* mosquito. |

TABLE 13

Relative peak abundance of the identified chemicals.

| Sample | zymosterol | xanthurenic acid | ononitol | octadecyl glycerol | xanthine | benzoic acid | adipic acid | nicotinic acid | urea | myo-inositol | γ tocopherol | tocopherol alpha- | tocopherol acetate | squalene | pyrophosphate | pyrogallol | propane-1,3-diol | piperidone | phosphate |
|---|---|---|---|---|---|---|---|---|---|---|---|---|---|---|---|---|---|---|---|
| 1 - raw | 124 | 2206 | 84 | 506 | 3857 | 22130 | 1475 | 7516 | 44115 | 4113 | 409 | 143 | 195 | 1938 | 291 | 153 | 1608 | 5557 | 147264 |
| 2 - slurry | 250 | 2867 | 132 | 640 | 1451 | 49350 | 1685 | 2293 | 203 | 6066 | 335 | 131 | 118 | 2047 | 85 | 249 | 3967 | 14247 | 6755 |
| 3 - cake | 392 | 1550 | 74 | 526 | 460 | 19038 | 1244 | 799 | 1698 | 1181 | 368 | 103 | 183 | 1545 | 432 | 94 | 966 | 2516 | 7714 |
| 4 - centrate | 266 | 9381 | 190 | 1668 | 15036 | 147281 | 3353 | 5939 | 1880 | 18353 | 707 | 644 | 140 | 5910 | 99 | 241 | 8121 | 55855 | 16207 |
| 5A - T24 | 494 | 15265 | 179 | 197 | 1179 | 349321 | 5850 | 8612 | 78070 | 261 | 860 | 777 | 127 | 2731 | 66 | 3926 | 6877 | 235057 | 822 |
| 7 - post | 703 | 1812 | 104 | 129 | 76 | 82457 | 1829 | 308 | 16123 | 155 | 362 | 127 | 134 | 331 | 516 | 101 | 886 | 15782 | 11701 |
| 6 - form | 297 | 1936 | 123 | 120 | 101 | 34230 | 1322 | 287 | 11986 | 269 | 261 | 210 | 218 | 749 | 142 | 72 | 1737 | 9516 | 10211 |

| Sample | parabanic acid | conduritol-beta-epoxide | butyrolactam NIST | butane-2,3-diol NIST | 1-methylhydantoin | 1,2-cyclohexanedione | 5-hydroxymethyl-2-furoic acid NIST | valine | tyrosine | tyramine | 3-ureidopropionate | tryptophan | 3-(3-hydroxyphenyl)-3-hydroxypropionic acid | trans-4-hydroxyproline | 2-ketoisocaproic acid | 2-deoxytetronic acid | 2-deoxypentitol NIST | glycerol-3-galactoside | daidzein | creatinine |
|---|---|---|---|---|---|---|---|---|---|---|---|---|---|---|---|---|---|---|---|---|
| 1 - raw | 5600 | 1171 | 3551 | 4743 | 5487 | 476 | 2510 | 148122 | 39321 | 12714 | 1356 | 3966 | 158 | 2941 | 1843 | 1471 | 482 | 367 | 1794 | 1012 |
| 2 - slurry | 2790 | 1160 | 4768 | 6389 | 4360 | 1120 | 1570 | 215093 | 56112 | 55231 | 2642 | 14646 | 182 | 1605 | 1639 | 1981 | 547 | 149 | 2411 | 368 |
| 3 - cake | 1391 | 541 | 1708 | 4042 | 1699 | 734 | 578 | 79230 | 13380 | 24219 | 824 | 2203 | 111 | 612 | 773 | 818 | 329 | 118 | 3214 | 628 |
| 4 - centrate | 14581 | 3234 | 19483 | 38143 | 8080 | 184 | 4098 | 364196 | 167202 | 86503 | 5987 | 42389 | 148 | 2225 | 1723 | 5021 | 1140 | 266 | 4713 | 2542 |
| 5A - T24 | 8223 | 2743 | 42076 | 11353 | 6235 | 2255 | 7981 | 35924 | 6980 | 184045 | 8802 | 1103 | 663 | 14330 | 748 | 8090 | 1222 | 194 | 4706 | 2500 |
| 7 - post | 69 | 69 | 2070 | 2293 | 1671 | 1074 | 317 | 1684 | 718 | 24261 | 74 | 188 | 136 | 432 | 669 | 919 | 144 | 97 | 93 | 358 |
| 6 - form | 1236 | 133 | 2105 | 2122 | 1923 | 460 | 680 | 2077 | 449 | 14786 | 117 | 247 | 177 | 1630 | 327 | 670 | 150 | 144 | 535 | 218 |

| Sample | 2,3-dihydroxybutanoic acid | | | | | | methylcatechol | | | | | lanosterol | linoleic acid | | isothreitol | hypoxanthine | | | | 2,8-dihydroxyquinoline |
|---|---|---|---|---|---|---|---|---|---|---|---|---|---|---|---|---|---|---|---|---|
| | | | | | | | 4-methylcatechol | | | | methanolphosphate | | | | | | thymine | threonine | taurine | spermidine | serine |
| 1 - raw | 219 | | | | | | 88 | | | | 1232 | 189 | 7634 | | 518 | 9292 | 7456 | 1473 | 3460 | 642 | 5543 | 5552 |
| 2 - slurry | 312 | | | | | | 121 | | | | 774 | 206 | 17598 | | 1103 | 511 | 2201 | 2643 | 4809 | 1132 | 9349 | 1637 |
| 3 - cake | 187 | | | | | | 132 | | | | 1522 | 329 | 27421 | | 234 | 192 | 1177 | 921 | 2010 | 2077 | 5910 | 673 |
| 4 - centrate | 427 | | | | | | 108 | | | | 1257 | 398 | 35434 | | 374 | 8838 | 6111 | 3816 | 12612 | 2728 | 20640 | 939 |
| 5A - T24 | 239 | | | | | | 831 | | | | 1368 | 227 | 7848 | | 239 | 426 | 49364 | 530 | 1584 | 1467 | 23729 | 692 |
| 7 - post | 83 | | | | | | 169 | | | | 1248 | 69 | 726 | | 268 | 109 | 299 | 397 | 427 | 158 | 393 | 325 |
| 6 - form | 111 | | | | | | 95 | | | | 943 | 124 | 560 | | 141 | 97 | 1037 | 484 | | 89 | 1923 | 112 |

TABLE 13-continued

Relative peak abundance of the identified chemicals.

| Sample | putrescine | phenylethylamine | phenyl-alanine | oxoproline | O-acetylserine | norvaline | N-methylglutamic acid | N-methylalanine | N-carbamylglutamate | N-acetylputrescine | N-acetylornithine | N-acetylglutamate | glycine | alanine | n-acetyl-d-hexosamine |
|---|---|---|---|---|---|---|---|---|---|---|---|---|---|---|---|
| 1 - raw | 6438 | 1212 | 17114 | 78015 | 563 | 8819 | 16053 | 18292 | 838 | 1293 | 862 | 542 | 24995 | 469853 | 299 |
| 2 - slurry | 24843 | 4233 | 42346 | 64355 | 459 | 27664 | 7310 | 79238 | 394 | 1922 | 443 | 451 | 22034 | 635610 | 264 |
| 3 - cake | 5855 | 3223 | 11700 | 16307 | 282 | 7145 | 2449 | 18176 | 250 | 620 | 271 | 380 | 20161 | 328258 | 251 |
| 4 - centrate | 100518 | 6502 | 118647 | 150331 | 584 | 46737 | 21025 | 170067 | 996 | 3244 | 746 | 1207 | 44359 | 1213184 | 671 |
| 5A - T24 | 319316 | 15285 | 4335 | 5623 | 1301 | 7159 | 21666 | 30639 | 527 | 14262 | 1036 | 1228 | 7357 | 19923 | 177 |
| 7 - post | 1831 | 892 | 492 | 3158 | 242 | 255 | 5368 | 1723 | 215 | 1910 | 166 | 55 | 20423 | 4237 | 110 |
| 6 - form | 19225 | 908 | 313 | 2983 | 312 | 304 | 2863 | 3247 | 140 | 1000 | 117 | 96 | 20540 | 1898 | 225 |

| Sample | N-acetyl-D-galactosamine | N-acetylaspartic acid | methionine sulfoxide | methionine | cyclohexylamine | citrulline | maleimide | lysine | leucine | isoleucine | hydroxylamine | homoserine | glycylproline | alanine-alanine | glutamine |
|---|---|---|---|---|---|---|---|---|---|---|---|---|---|---|---|
| 1 - raw | 457 | 3560 | 812 | 3956 | 1201 | 745 | 1124 | 3453 | 105313 | 71751 | 94032 | 570 | 1030 | 852 | 398 |
| 2 - slurry | 177 | 2465 | 502 | 6447 | 757 | 612 | 741 | 1474 | 136042 | 100706 | 114972 | 876 | 369 | 743 | 316 |
| 3 - cake | 133 | 717 | 488 | 778 | 646 | 693 | 551 | 201 | 58600 | 35007 | 127228 | 358 | 206 | 450 | 177 |
| 4 - centrate | 129 | 3017 | 1466 | 16298 | 1267 | 1634 | 1687 | 3747 | 276693 | 173099 | 93890 | 2047 | 858 | 1971 | 647 |
| 5A - T24 | 235 | 192 | 855 | 555 | 2033 | 1173 | 2567 | 4334 | 40139 | 37527 | 50164 | 1047 | 9872 | 1276 | 604 |
| 7 - post | 201 | 391 | 311 | 86 | 310 | 195 | 899 | 280 | 967 | 1566 | 169696 | 128 | 244 | 171 | 172 |
| 6 - form | 109 | 201 | 233 | 88 | 401 | 318 | 649 | 119 | 840 | 1779 | 162821 | 129 | 169 | 309 | 147 |

| Sample | glutamic acid | ethanolamine | 5-aminovaleric acid | cysteine | 3-amino-isobutyric acid | 2,4-diaminobutyric acid | 1,3-diaminopropane | beta-glutamic acid | beta-alanine | aspartic acid | asparagine | arachidonic acid | alpha-aminoadipic acid | alanine-alanine | |
|---|---|---|---|---|---|---|---|---|---|---|---|---|---|---|---|
| 1 - raw | 54262 | 2429 | 56569 | 377 | 1722 | 1274 | 1122 | 16013 | 6955 | 72811 | 177 | 912 | 1488 | | |
| 2 - slurry | 26108 | 1555 | 234818 | 465 | 8851 | 1716 | 812 | 1235 | 43191 | 30303 | 128 | 1164 | 427 | | |
| 3 - cake | 3940 | 786 | 164211 | 275 | 3989 | 373 | 1380 | 403 | 16981 | 13024 | 88 | 2001 | 281 | | |
| 4 - centrate | 46128 | 2405 | 519628 | 666 | 30117 | 5038 | 5124 | 3328 | 102212 | 142073 | 269 | 2953 | 1121 | | |
| 5A - T24 | 1239 | 5128 | 1777927 | 472 | 55308 | 10797 | 3142 | 734 | 128251 | 18549 | 254 | 1418 | 1369 | | |
| 7 - post | 201 | 715 | 182439 | 63 | 2134 | 1993 | 129 | 382 | 11765 | 2562 | 79 | 350 | 242 | | |
| 6 - form | 145 | 561 | 37594 | 122 | 2478 | 1474 | 415 | 221 | 15098 | 2653 | 54 | 381 | 134 | | |

| Sample | 5-methoxytryptamine | | | | | | myristic acid | lignoceric acid | lauric acid | aspartic acid | isoheptadecanoic acid NIST | hexadecylglycerol NIST | heptadecanoic acid | glycerol-alpha-phosphate | D-erythro sphingosine |
|---|---|---|---|---|---|---|---|---|---|---|---|---|---|---|---|
| 1 - raw | 173 | | | | | | 1808 | 707 | 8517 | | 2364 | 314 | 6573 | 451 | 455 |
| 2 - slurry | 199 | | | | | | 2584 | 863 | 10690 | | 5445 | 419 | 11488 | 131 | 557 |
| 3 - cake | 166 | | | | | | 2422 | 758 | 9370 | | 3432 | 390 | 9606 | 421 | 502 |
| 4 - centrate | 395 | | | | | | 4693 | 1641 | 18833 | | 9190 | 901 | 24725 | 258 | 1123 |
| 5A - T24 | 1004 | | | | | | 2993 | 396 | 11799 | | 4490 | 139 | 9690 | 138 | 539 |
| 7 - post | 343 | | | | | | 732 | 308 | 6066 | | 3791 | 157 | 2497 | 186 | 135 |
| 6 - form | 609 | | | | | | 1123 | 385 | 6089 | | 1713 | 107 | 6627 | 230 | 92 |

TABLE 13-continued

Relative peak abundance of the identified chemicals.

| Sample | cis-gondoic acid | cholesterol | cerotinic aci | caprylic acid | capric acid | palmitoleic acid | beta-sitosterol | palmitic acid | oleic acid | behenic acid | arachidic acid | 2-monoolein | 2-deoxyerythritol | 1-monostearin | 1-monopalmitin |
|---|---|---|---|---|---|---|---|---|---|---|---|---|---|---|---|
| 1 - raw | 205 | 10267 | 198 | 1941 | 849 | 63 | 19049 | 26272 | 8947 | 2625 | 4236 | 387 | 4044 | 265 | 461 |
| 2 - slurry | 205 | 18183 | 240 | 2456 | 1047 | 808 | 39404 | 49136 | 22654 | 4211 | 8206 | 744 | 8619 | 355 | 658 |
| 3 - cake | 192 | 15436 | 209 | 2169 | 812 | 967 | 33696 | 53350 | 31479 | 3222 | 6362 | 8519 | 2319 | 653 | 671 |
| 4 - centrate | 542 | 33560 | 411 | 2064 | 1183 | 1747 | 72438 | 117161 | 52177 | 8288 | 15576 | 1133 | 23032 | 361 | 93 |
| 5A - T24 | 189 | 19440 | 258 | 4643 | 1740 | 1078 | 35516 | 39935 | 27484 | 1497 | 2932 | 288 | 16646 | 225 | 220 |
| 7 - post | 101 | 5442 | 329 | 1466 | 718 | 56 | 8494 | 10924 | 3050 | 1673 | 2153 | 155 | 569 | 381 | 115 |
| 6 - form | 95 | 6676 | 113 | 2224 | 815 | 115 | 15261 | 21366 | 5234 | 1982 | 3010 | 243 | 1978 | 439 | 319 |

| Sample | 1-monoolein | stearic acid | pentadecanoic acid | pelargonic acid | caprylic acid | beta-hydroxymyristic acid | octadecanol | oleamide NIST | nonadecanoic acid | xylulose NIST | xylonic acid isomer |
|---|---|---|---|---|---|---|---|---|---|---|---|
| 1 - raw | 1227 | 86160 | 7441 | 26773 | | 420 | 662 | 176 | 1761 | 654 | 664 |
| 2 - slurry | 3637 | 142612 | 10110 | 28922 | | 455 | 589 | 479 | 2318 | 265 | 471 |
| 3 - cake | 19176 | 138957 | 10419 | 23977 | | 680 | 650 | 683 | 1722 | 738 | 133 |
| 4 - centrate | 4274 | 321790 | 25985 | 28458 | | 960 | 796 | 455 | 5057 | 1480 | 1004 |
| 5A - T24 | 8606 | 102755 | 171150 | 28257 | | 823 | 650 | 417 | 1247 | 195 | 138 |
| 7 - post | 9827 | 58018 | 1854 | 25173 | | 256 | 465 | 126 | 533 | 87 | 89 |
| 6 - form | 10125 | 80658 | 4993 | 22837 | | 235 | 530 | 132 | 920 | 80 | 129 |

| Sample | xylonic acid | fructose | xylitol | trehalose | tagatose | sucrose | ribose | maltotriose | maltose | lyxose | isoribose | isomaltose | xylose | galactose |
|---|---|---|---|---|---|---|---|---|---|---|---|---|---|---|
| 1 - raw | 240 | 259 | 654 | 1559 | 497 | 51 | 2873 | 203 | 1278 | 7866 | 876 | 99 | 35832 | 5995 |
| 2 - slurry | 237 | 135 | 352 | 456 | 247 | 22 | 1102 | 77 | 527 | 3436 | 1033 | 107 | 48723 | 773 |
| 3 - cake | 124 | 85 | 216 | 672 | 167 | 89 | 722 | 123 | 2482 | 2188 | 321 | 162 | 39206 | 1308 |
| 4 - centrate | 406 | 1059 | 1059 | 225 | 538 | 62 | 2467 | 92 | 808 | 7682 | 4374 | 109 | 153622 | 13319 |
| 5A - T24 | 100 | 71 | 490 | 171 | 912 | 55 | 3099 | 60 | 386 | 1482 | 2371 | 92 | 33098 | 203 |
| 7 - post | 61 | 117 | 127 | 335 | 32 | 84 | 400 | 111 | 272 | 267 | 374 | 154 | 3728 | 176 |
| 6 - form | 83 | 74 | 140 | 248 | 79 | 87 | 429 | 96 | 287 | 116 | 323 | 101 | 2503 | 254 |

| Sample | fucose | 3,6-anhydro-D-galactose | beta-gentiobiose | glucose | cellobiose | vanillic acid | urocanic acid | uric acid | lactobionic acid UDP-glucuronic acid | isoribose | threonic acid | tartaric acid | sulfuric acid |
|---|---|---|---|---|---|---|---|---|---|---|---|---|---|
| 1 - raw | 2159 | 944 | 1783 | 199 | 61 | 2212 | 630 | 113383 | 2219 | 411 | 572 | 314 | 2371 |
| 2 - slurry | 932 | 181 | 841 | 224 | 148 | 4780 | 140 | 9746 | 514 | 269 | 311 | 87 | 1201 |
| 3 - cake | 347 | 129 | 533 | 368 | 170 | 2307 | 122 | 26661 | 396 | 149 | 118 | 103 | 236 |
| 4 - centrate | 2574 | 459 | 1497 | 3605 | 71 | 13154 | 340 | 2642 | 1823 | 380 | 465 | 155 | 1260 |
| 5A - T24 | 205 | 350 | 288 | 54 | 116 | 704 | 190 | 12808 | 151 | 735 | 96 | 544 | 315 |
| 7 - post | 141 | 195 | 233 | 78 | 120 | 129 | 84 | 141 | 70 | 128 | 133 | 129 | 603 |
| 6 - form | 127 | 158 | 266 | 99 | 127 | 180 | 160 | 113 | 138 | 139 | 85 | 70 | 3137 |

TABLE 13-continued

Relative peak abundance of the identified chemicals.

| Sample | succinic acid | lactic acid | pyruvic acid | isohexonic acid | pyrrole-2-carboxylic acid | oxamic acid | oxalic acid | methylmaleic acid | fumaric acid | malonic acid | malic acid |
|---|---|---|---|---|---|---|---|---|---|---|---|
| 1 - raw | 10204 | 13155 | 2604 | 1175 | 1413 | 847 | 419 | 84 | 1341 | 234 | 1009 |
| 2 - slurry | 35486 | 38347 | 1091 | 101 | 1040 | 313 | 302 | 131 | 555 | 197 | 183 |
| 3 - cake | 8833 | 15905 | 234 | 107 | 486 | 217 | 289 | 90 | 445 | 164 | 135 |
| 4 - centrate | 89353 | 38112 | 1004 | 269 | 2494 | 1323 | 312 | 127 | 1732 | 262 | 529 |
| 5A - T24 | 3301 | 2894 | 414 | 86 | 4813 | 237 | 159 | 243 | 1966 | 84 | 64 |
| 7 - post | 813 | 1494 | 240 | 92 | 555 | 271 | 339 | 163 | 600 | 132 | 211 |
| 6 - form | 270 | 3246 | 128 | 145 | 483 | 236 | 434 | 120 | 250 | 95 | 100 |

| Sample | citric acid | kynurenic acid | isopentadecanoic acid | quinolinic acid | ribonic acid | pipecolinic acid | phenylacetic acid | hydrocinnamic acid | isocitric acid | pimelic acid | hexuronic acid | glycolic acid | glutaric acid | gluconic acid lactone | gluconic acid | digalacturonic acid |
|---|---|---|---|---|---|---|---|---|---|---|---|---|---|---|---|---|
| 1 - raw | 2502309 | 117 | 6259 | 611 | 4045 | 6248 | 6274 | 10531 | 40930 | 592 | 361 | 4507 | 1619 | 227 | 312 | 859 |
| 2 - slurry | 114857 | 160 | 10309 | 807 | 1163 | 20909 | 23012 | 55305 | 1699 | 795 | 355 | 7816 | 2580 | 86 | 113 | 238 |
| 3 - cake | 65268 | 169 | 11435 | 439 | 611 | 28830 | 8236 | 18563 | 1075 | 274 | 211 | 861 | 1421 | 109 | 93 | 275 |
| 4 - centrate | 367798 | 261 | 21808 | 2348 | 2242 | 47562 | 70989 | 205865 | 6076 | 1904 | 1299 | 10953 | 7308 | 332 | 336 | 421 |
| 5A - T24 | 568 | 127 | 15099 | 1077 | 568 | 89907 | 281239 | 485189 | 105 | 3242 | 226 | 9142 | 17973 | 107 | 79 | 244 |
| 7 - post | 518160 | 109 | 1590 | 222 | 178 | 13730 | 30947 | 22784 | 6069 | 772 | 135 | 1408 | 636 | 104 | 179 | 281 |
| 6 - form | 383142 | 222 | 1355 | 116 | 161 | 2558 | 24223 | 46799 | 4328 | 489 | 142 | 1663 | 365 | 50 | 129 | 301 |

| Sample | 3-hydroxy-propionic acid | citramalic acid | cis-caffeic acid | 3-hydroxy-palmitic acid | 3-hydroxy-butyric acid | chenodeoxycholic acid | aminomalonate | alpha-ketoglutarate | 3-hydroxy-3-methyl-glutaric acid | 3-hydroxy-benzoic acid | 3,4-dihydroxy-phenylacetic acid | 3,4-dihydroxy-hydrocinnamic acid NIST | 4-pyridoxic acid | 4-hydroxymandelic acid | aconitic acid | 3-phenyllactic acid |
|---|---|---|---|---|---|---|---|---|---|---|---|---|---|---|---|---|
| 1 - raw | 12527 | 374 | 630 | 392 | 2466 | 1632 | 673 | 497 | 124 | 632 | 521 | 834 | 329 | 2845 | 7489 | 5715 |
| 2 - slurry | 6384 | 751 | 625 | 700 | 5892 | 658 | 386 | 57 | 145 | 1136 | 583 | 4078 | 176 | 4527 | 1525 | 10077 |
| 3 - cake | 2765 | 319 | 253 | 970 | 2140 | 1796 | 227 | 119 | 92 | 466 | 292 | 395 | 152 | 2181 | 463 | 4955 |
| 4 - centrate | 7419 | 1266 | 1165 | 955 | 15381 | 1133 | 557 | 182 | 188 | 2988 | 2722 | 1766 | 570 | 13174 | 8640 | 14186 |
| 5A - T24 | 19701 | 7324 | 3636 | 1122 | 4566 | 1098 | 203 | 109 | 86 | 8383 | 17383 | 251759 | 1359 | 2279 | 228 | 731 |
| 7 - post | 483 | 1748 | 169 | 365 | 235 | 761 | 114 | 163 | 88 | 2913 | 130 | 149 | 97 | 430 | 682 | 189 |
| 6 - form | 470 | 888 | 320 | 484 | 778 | 907 | 101 | 154 | 115 | 924 | 1386 | 539 | 176 | 233 | 402 | 136 |

| Sample | 3-hydroxy-phenylacetic acid | 3-(4-hydroxy-phenyl)propionic acid | 3,4-dihydroxy-cinnamic acid | 4-hydroxyphenylacetic acid | 4-hydroxyphenyllactic acid | 4-hydroxymandelic acid | 4-hydroxybutyric acid | 3-(3-hydroxy-phenyl)propionic acid | 4-aminobutyric acid | 2-picolinic acid | 2-methylglyceric acid NIST |
|---|---|---|---|---|---|---|---|---|---|---|---|
| 1 - raw | 12527 | 7472 | 70 | 8593 | | | 1064 | 3275 | 7508 | 733 | 252 |
| 2 - slurry | 6384 | 28408 | 182 | 23575 | | | 1907 | 11886 | 14352 | 787 | 880 |
| 3 - cake | 2765 | 11938 | 49 | 10453 | | | 1381 | 4535 | 3779 | 348 | 328 |
| 4 - centrate | 7419 | 72737 | 269 | 62632 | | | 4060 | 30451 | 31270 | 2740 | 2468 |
| 5A - T24 | 19701 | 110418 | 4833 | 263795 | | | 6425 | 228118 | 46169 | 962 | 1911 |
| 7 - post | 483 | 1805 | 91 | 22687 | | | 871 | 11992 | 854 | 655 | 484 |
| 6 - form | 470 | 1286 | 581 | 18674 | | | 641 | 23338 | 1330 | 830 | 373 |

TABLE 13-continued

Relative peak abundance of the identified chemicals.

| Sample | 2-ketoadipic acid | 2-isopropylmalic acid | 2-hydroxyvaleric acid | 2-hydroxyhexanoic acid | 2-hydroxyglutaric acid | 2-hydroxybutanoic acid | 2-hydroxyadipic acid | 2-hydroxy-2-methylbutanoic acid | uracil | thymidine | pseudouridine | guanine | cytosin |
|---|---|---|---|---|---|---|---|---|---|---|---|---|---|
| 1 - raw | 454 | 652 | 1986 | 8602 | 2057 | 5450 | 30 | 649 | 22560 | 210 | 505 | 1057 | 189 |
| 2 - slurry | 1327 | 386 | 4744 | 23456 | 1585 | 9471 | 386 | 506 | 2825 | 141 | 170 | 86 | 159 |
| 3 - cake | 980 | 222 | 3294 | 14480 | 440 | 8064 | 129 | 422 | 1861 | 168 | 85 | 151 | 80 |
| 4 - centrate | 3169 | 1212 | 13982 | 30227 | 5027 | 22646 | 445 | 1161 | 21818 | 137 | 212 | 192 | 134 |
| 5A - T24 | 14394 | 202 | 37160 | 10007 | 619 | 6464 | 48 | 4909 | 13195 | 356 | 1247 | 87 | 452 |
| 7 - post | 3908 | 71 | 10449 | 657 | 168 | 45652 | 108 | 631 | 213 | 161 | 116 | 103 | 116 |
| 6 - form | 1827 | 49 | 4177 | 758 | 55 | 44656 | 90 | 408 | 319 | 144 | 114 | 79 | 104 |

| Sample | adenosine | adenine | dihydrocholesterol | 7-methylguanine NIST | 5,6-dihydrouracil | threitol | stigmasterol | salicylic acid | pinitol | phenol | mannitol | lyxitol | isothreonic acid | hexitol |
|---|---|---|---|---|---|---|---|---|---|---|---|---|---|---|
| 1 - raw | 228 | 9002 | 1074 | 501 | 315 | 765 | 256 | 360 | 7214 | 1820 | 227 | 3721 | 1627 | 138 |
| 2 - slurry | 118 | 241 | 134 | 544 | 885 | 775 | 757 | 597 | 3963 | 3031 | 153 | 1792 | 581 | 319 |
| 3 - cake | 85 | 183 | 843 | 286 | 213 | 406 | 388 | 304 | 1594 | 2325 | 66 | 586 | 197 | 109 |
| 4 - centrate | 139 | 1185 | 197 | 1337 | 414 | 1778 | 1187 | 1387 | 10531 | 3460 | 314 | 6387 | 923 | 727 |
| 5A - T24 | 294 | 6404 | 1763 | 1403 | 886 | 133 | 606 | 5080 | 10781 | 2172 | 205 | 2175 | 410 | 229 |
| 7 - post | 248 | 392 | 298 | 103 | 264 | 268 | 168 | 1638 | 179 | 1274 | 114 | 227 | 145 | 99 |
| 6 - form | 100 | 268 | 601 | 60 | 138 | 176 | 270 | 560 | 144 | 834 | 152 | 121 | 101 | 56 |

| Sample | glucose-1-phosphat | erythritol | tyrosol | hydroquinone | diglycerol | deoxypentitol | catechol | 1-hexadecanol | 1-deoxyerythritol | pantothenic acid | indole-3-acetate | galactinol | 6-hydroxynicotinic acid | 5-hydroxy 3-iIAA |
|---|---|---|---|---|---|---|---|---|---|---|---|---|---|---|
| 1 - raw | 2172 | 6010 | 1065 | 268 | 4881 | 3096 | 202 | 322 | 5072 | 549 | 9271 | 736 | 924 | 292 |
| 2 - slur | 774 | 3753 | 2293 | 401 | 3520 | 1338 | 471 | 278 | 7899 | 301 | 14482 | 512 | 774 | 923 |
| 3 - cake | 183 | 1336 | 1043 | 235 | 1173 | 427 | 142 | 410 | 3380 | 127 | 9265 | 682 | 273 | 395 |
| 4 - centr | 1997 | 10139 | 5949 | 607 | 3798 | 2800 | 600 | 445 | 22972 | 715 | 41797 | 2034 | 2420 | 1655 |
| 5A -T24 | 1298 | 277 | 9284 | 3619 | 1309 | 2384 | 21393 | 890 | 24961 | 254 | 202467 | 186 | 1659 | 2210 |
| 7 - post | 292 | 126 | 429 | 129 | 489 | 82 | 81 | 194 | 569 | 97 | 17118 | 241 | 90 | 164 |
| 6 - form | 631 | 106 | 712 | 215 | 318 | 89 | 1086 | 374 | 1397 | 98 | 13338 | 240 | 96 | 285 |

| Sample | glycerol | glyceric acid | ferulic acid | 4-hydroxy-benzoate | 3,4-dihydroxy-benzoate |
|---|---|---|---|---|---|
| 1 - raw | 24265 | 4588 | 858 | 4757 | 27542 |
| 2 - slur | 9119 | 1022 | 460 | 10465 | 2816 |
| 3 - cake | 3821 | 473 | 405 | 4984 | 1613 |
| 4 - centr | 12417 | 1888 | 1799 | 29693 | 7703 |
| 5A -T24 | 4009 | 1201 | 717 | 6719 | 7250 |
| 7 - post | 3483 | 399 | 103 | 792 | 486 |
| 6 - form | 2813 | 376 | 128 | 1131 | 563 |

Figure 5A:
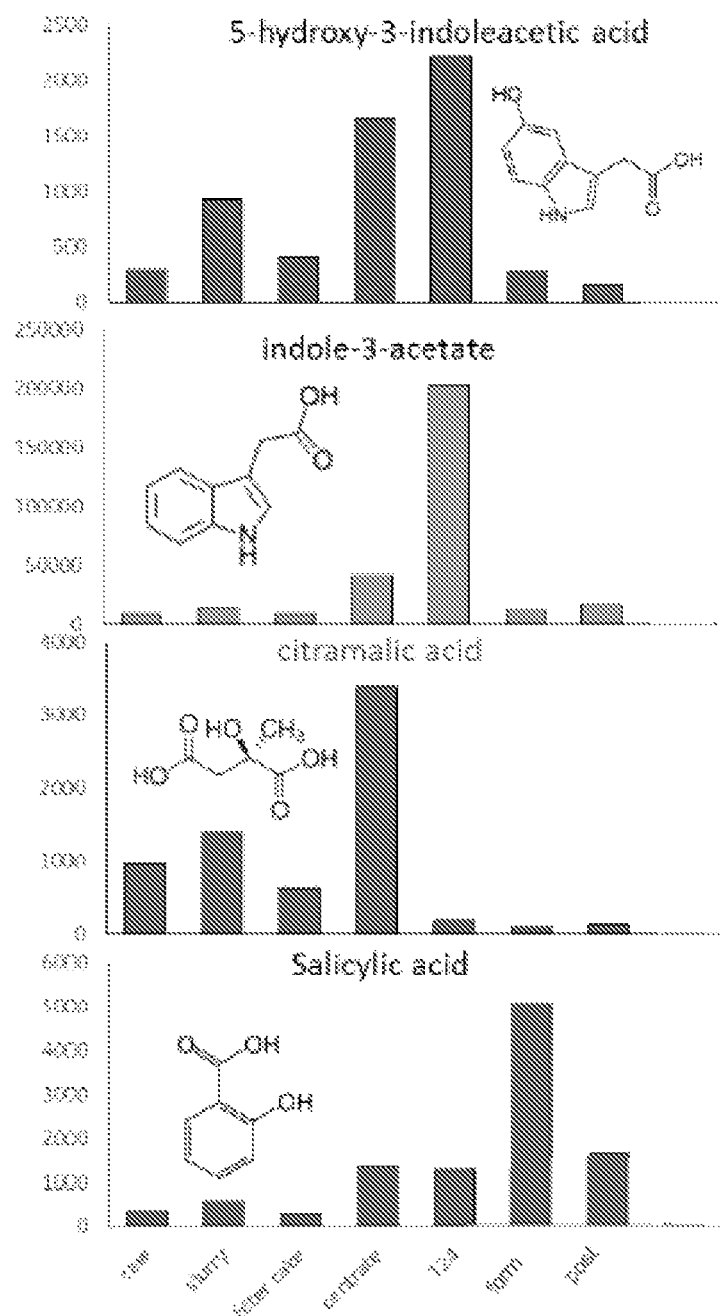
FIG. 5A is a bar graph showing the relative peak abundance (y-axis) of several known plant growth promoting compounds in the 7 samples taken from the fertilizer production process of FIG. 1. The top panel represents the relative peak abundance of 5-hydroxy-3-indoleacetic acid. The second panel from the top represents the relative peak abundance of indole-3-acetate. The third panel from the top represents the relative peak abundance of citramalic acid. The bottom panel represents the relative peak abundance of salicylic acid.
Figure 5B:
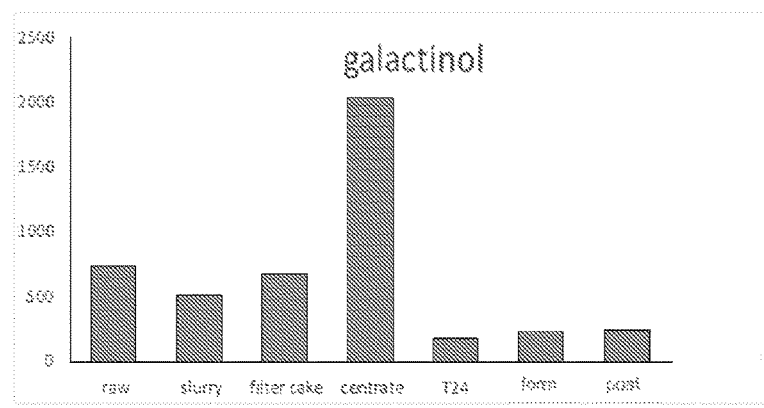
FIG. 5B is a bar graph showing the relative peak abundance (y-axis) of galactinol in the 7 samples taken from the fertilizer production process of FIG. 1.

Out of the 254 chemicals identified in the untargeted analysis, there were several compounds of potential interest for their known plant growth promoting properties (FIG. 5A and FIG. 5B). For example, there are numerous studies on the plant growth promoting properties of the phytohormone Indole-3-acetic acid and its derivatives (5-hydroxyl-3-indoleacetic acid, indole-3-acetate) and its production by certain rhizosphere bacteria (see, e.g., Patten and Glick, J. Microbiol., 1996, 42:207-220; Spaepen, et al., FEMS Microbiol. Rev., 2007, 31:425-448), the contents of each of which are incorporated by reference herein in their entireties. Citramalic acid and salicylic acid from sugar beet root exudates have been shown to solubilize soil phosphorus (Kharassani, et al., BMC Plant Biology, 2011, 11:121), the content of which is incorporated by reference herein in its entirety. In addition, Salicylic acid is known for its role in plant stress responses (An and Mou, J. Integrative Plant Biol., 2011, 53:412-428; Raskin, Annu. Rev. Plant Physiol. Plant Mol. Biol., 1992, 43:439-463), has been shown to activate the systemic acquired resistance pathway in plants (Meyer et al., 1999), and as a plant metabolite is known for its role in moderating the colonization of the rhizosphere microbiome (Lebeis et al., Science, 2015, 349:860-864), the contents of each of the references is incorporated by reference herein in their entireties. Galactinol is a signaling component of the induced systemic resistance caused by *Pseudomonas chlororaphis* O6 colonization.

The maximal relative peak abundance of many of these compounds were found in different steps of the production process described herein and not always in the final product. A first approach to identifying the "active" ingredients of the product could be to focus on determining the concentration of the compounds in the final product and evaluating via plant growth assays the how effective this dose is at promoting growth or altering root system architecture. Another approach could be to use the plant growth assays to screen samples from the different stages for plant growth promoting potential. In this way, if a differential growth response is seen in products from different steps of the production process, these could be potentially be commercialized as different products with different modes of action (e.g., improving P acquisition, favoring induced system resistance).

Unknown Chemicals.

Figure 6:
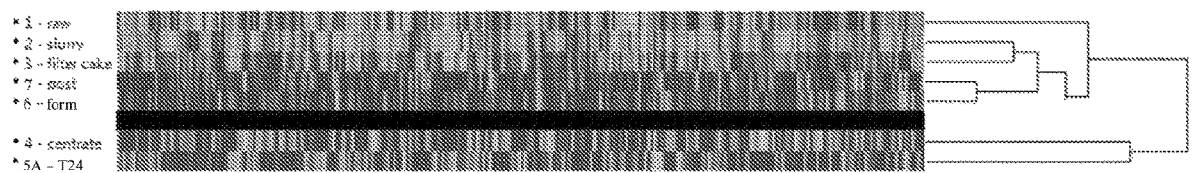
FIG. 6 is a heat map resulting from hierarchical cluster analysis (Ward's minimum variance method) showing the relative peak abundance of the unknown compounds in the 7 samples (rows) taken from the fertilizer production process of FIG. 1. Each column represents one of the unidentified metabolites where the colors from blue, gray to red reflect the relative abundance of the metabolites from lowest to highest. The dendrogram to the right of the heat map indicates similarities between the samples.

The remaining unique chemicals detected in the liquid compositions did not exist in the Binbase database and were not identifiable. Comparison of the composition of unknown compounds in the samples from the different process steps resulted in a dendgrogram (FIG. 6) similar to what was found for the known compounds (FIG. 4). The Centrate (4) and T24 (5A) samples had the greatest relative peak abundance for a large majority of the chemicals identified and were unique among the other steps in the process. The relative abundance of chemicals in the Formulated Post-Pasteurized (7) and Formulated Unpasteurized (6) samples were similar. The Slurry (2) and Cake (3) samples were similar and, together, were similar to the Raw (1) sample.

Example 5. Analysis of a Liquid Product Sample Taken after 72 Hours in the Bioreactor, but Prior to the Primary Formulation Step A T72 sample (5B) was prepared using the process of Example 1. Sample 5B is the liquid product obtained after 72 hours in the aerobic bioreactor 50, but taken prior to primary formulation 52 (see FIG. 1). To determine the nutrient content of this sample, the sample was sent to Midwest Laboratories, Inc. (Omaha, Nebr., USA) for nutrient analysis. The results are shown in Table 14 and Table 15.

TABLE 14

Nutrient analysis

| Nutrients | | Analysis (as rec'd) | Analysis (dry weight) | Total content lbs per ton (as rec'd) |
|---|---|---|---|---|
| Nitrogen | | | | |
| Total Nitrogen | % | 0.57 | 18.39 | 11.4 |
| Organic Nitrogen | % | 0.26 | 8.42 | 5.2 |
| Ammonium Nitrogen | % | 0.309 | 9.968 | 6.2 |
| Nitrate Nitrogen | % | <0.01 | — | — |
| Major and Secondary Nutrients | | | | |
| Phosphorus | % | 0.08 | 2.58 | 1.6 |
| Potassium as $K_2O$ | % | 0.38 | 12.26 | 7.6 |
| Sulfur | % | <0.05 | — | — |
| Calcium | % | 0.22 | 7.10 | 4.4 |
| Magnesium | % | 0.06 | 1.94 | 1.2 |
| Sodium | % | 0.070 | 2.258 | 1.4 |
| Micronutrients | | | | |
| Zinc | ppm | 27.5 | 887 | — |
| Iron | ppm | 79.1 | 2552 | 0.2 |
| Manganese | ppm | <20 | — | — |
| Copper | ppm | <20 | — | — |
| Boron | ppm | <100 | — | — |
| Other Properties | | | | |
| Moisture | % | 96.90 | | |
| Total Solids | % | 3.10 | | 62.0 |
| Organic Matter | % | 1.99 | 64.19 | 39.8 |
| Ash | % | 1.10 | 35.48 | 22.0 |
| C:N Ratio | | 4:1 | | |
| Total Carbon | % | 2.50 | 80.65 | |
| Chloride | % | 0.14 | 4.52 | |
| pH | | 6.9 | | | ppm, parts per million

TABLE 15

Nutrient analysis - amino acids

| Nutrient | Level Found (as rec'd) | Level Found (dry weight) | Units | Reporting Limit | Method |
|---|---|---|---|---|---|
| Aspartic acid | 0.05 | 1.61 | % | 0.01 | AOAC 994.12 (Alt. III) |
| Threonine | 0.02 | 0.64 | % | 0.01 | AOAC 994.12 (Alt. III) |
| Serine | 0.02 | 0.64 | % | 0.01 | AOAC 994.12 (Alt. III) |
| Glutamic acid | 0.05 | 1.61 | % | 0.01 | AOAC 994.12 (Alt. III) |
| Proline | 0.01 | 0.32 | % | 0.01 | AOAC 994.12 (Alt. III) |
| Glycine | 0.02 | 0.64 | % | 0.01 | AOAC 994.12 (Alt. III) |
| Alanine | 0.03 | 0.97 | % | 0.01 | AOAC 994.12 (Alt. III) |
| Cysteine | | n.d. | % | 0.01 | AOAC 994.12 (Alt. I) |

TABLE 15-continued

Nutrient analysis - amino acids

| Nutrient | Level Found (as rec'd) | Level Found (dry weight) | Units | Reporting Limit | Method |
|---|---|---|---|---|---|
| Valine | 0.02 | 0.64 | % | 0.01 | AOAC 994.12 (Alt. III) |
| Methionine | | n.d. | % | 0.01 | AOAC 994.12 (Alt. I) |
| Isoleucine | 0.03 | 0.97 | % | 0.01 | AOAC 994.12 (Alt. III) |
| Leucine | 0.04 | 1.29 | % | 0.01 | AOAC 994.12 (Alt. III) |
| Tyrosine | 0.05 | 1.61 | % | 0.01 | AOAC 994.12 (Alt. III) |
| Phenylalanine | 0.03 | 0.97 | % | 0.01 | AOAC 994.12 (Alt. III) |
| Lysine (total) | 0.04 | 1.29 | % | 0.01 | AOAC 994.12 (Alt. III) |
| Histidine | 0.03 | 0.97 | % | 0.01 | AOAC 994.12 (Alt. III) |
| Arginine | 0.06 | 1.94 | % | 0.01 | AOAC 994.12 (Alt. III) |
| Tryptophan | | n.d. | % | 0.01 | AOAC 988.15 (mod) |
| Erythromycin residue | | | ppm | 0.05 | FDA LIB 4438 |
| Penicillin residue | n.d. | | ppm | 0.05 | FDA LIB 4438 |
| Chlorotetracycline (CTC) residue | n.d. | | ppm | 0.05 | FDA LIB 4438 |
| Virginiamycin residue | n.d. | | ppm | 0.05 | FDA LIB 4438 |
| Doxycycline (residue) | n.d. | | ppm | 0.050 | FDA LIB 4438 |
| Tetracycline (residue) | n.d. | | ppm | 0.050 | FDA LIB 4438 |
| Oxytetracycline (OTC) residue | n.d. | | ppm | 0.05 | FDA LIB 4438 |
| Protein | 3.6 | 116 | % | 0.1 | MWL FO 014 |
| Ortho-phosphate (P2O5) | n.d. | | % | 0.10 | AFPC 11-6 |
| Poly-phosphate (P2O5) | n.d. | | % | 0.10 | Calculation | n.d., not detected;
ppm, parts per million

Example 6. Efficiency of the Filtration System

In some aspects, it is desirable to conduct a modified sieve analysis and measure retain material that is greater than a known sieve size of a quantity of product, e.g., to examine the efficacy of the pressure filter vessel used in the production method described in Example 1. In other aspects, such a modified sieve analysis can be used for quality control.

Figure 7A:
FIG. 7A is a photograph of the modified sieve test filtering apparatus.
Figure 7B:
FIG. 7B is a photograph of the modified sieve test retain fraction collection.

To determine the efficacy of the filtration step (e.g., the pressure filtration steps 60, 63 of Example 1 and FIG. 1) of the methods described herein, a modified sieve analysis was performed on the formulated liquid product produced as described in Example 1. Briefly, 9,000 mL of formulated liquid composition was collected in a pristine five gallon pail and promptly transferred to the laboratory to undergo the modified sieve analysis. Next, four 8 inch sieve, all stainless, half height, American Section of the International Association for Testing Materials (ASTM) standard stackable sieves were thoroughly cleansed and oven dried at 60° C. for 1 hour and then stacked on a vibratory bucket sieve unit. The vibratory motor was engaged, and 9,000 mL of product was poured such that it flowed freely through the stacked apparatus at a rate of 1,500 mL per minute. Upon complete passage of all material, the apparatus was permitted to run for an additional 60 seconds. FIG. 7A is a photograph of an exemplary filtering apparatus. The stackable sieves were collected and a gentle rinse of room temperature water of approximately 70° F. (approximately 21° C.) was sprayed over the top surface of the sieves to dislodge and cleanse any material less than the sieve rating. Retain material on each sieve was rinsed free with a direct stream of water into a vacuum filtration unit equipped with a 0.20 micron filter with a known weight. FIG. 7B is a photograph of an exemplary retain fraction collection procedure. Finally, sieve material and the 0.20 micron filter were removed from filter apparatus, dried at 101° C. for 24 hours, and weighed. The modified sieve test was performed using mesh sizes 230, 200, 170, and 140.

Figure 7C:
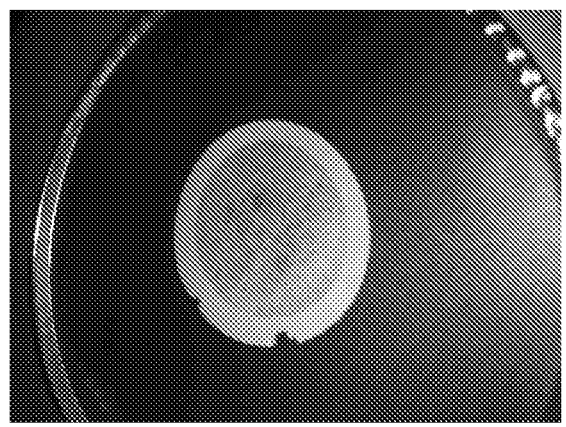
FIG. 7C is a photograph showing retained material on a filtration disc following pressure filtration in an embodiment of the fertilizer production process.
Figure 8:
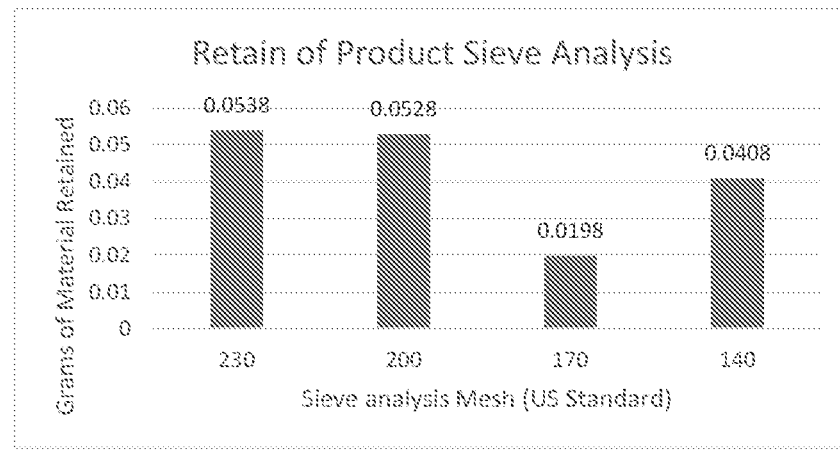
FIG. 8 is a graphical representation of the modified sieve test data. The x-axis represents data from mesh sizes 230, 200, 170, and 140. The y-axis represents the grams of material retained.
Figure 9A:
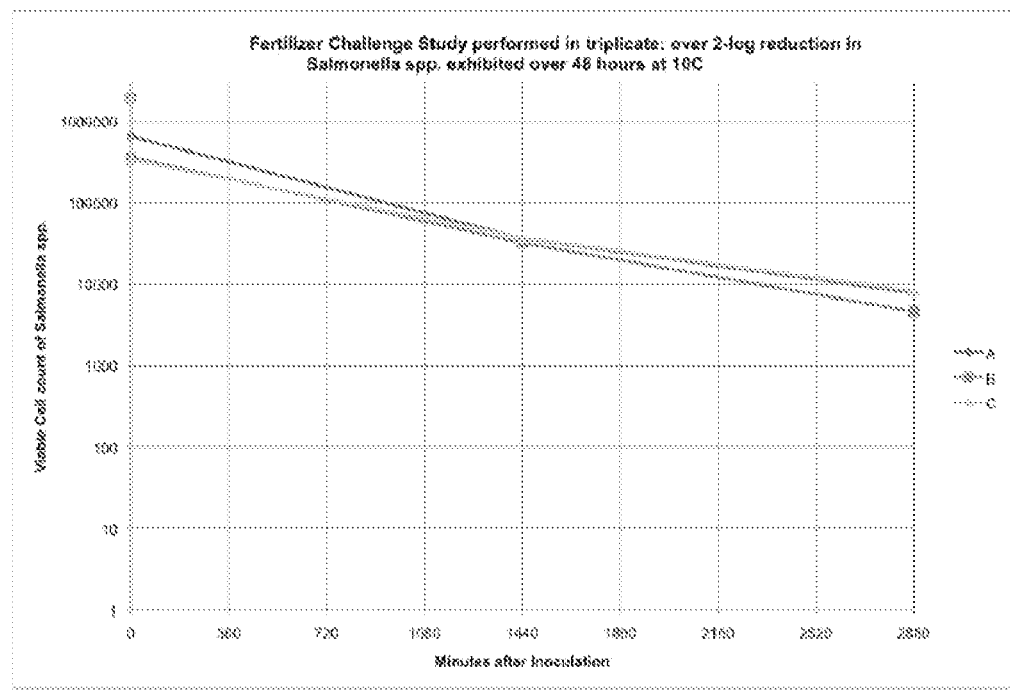
FIG. 9A is a graphical representation of the fertilizer challenge study on *Salmonella* spp. The x-axis represents minutes after inoculation of the sample with the bacteria. The y-axis represents the viable count of bacteria in log 10 scale. Lines A, B, and C represent samples done in triplicate.
Figure 9B:
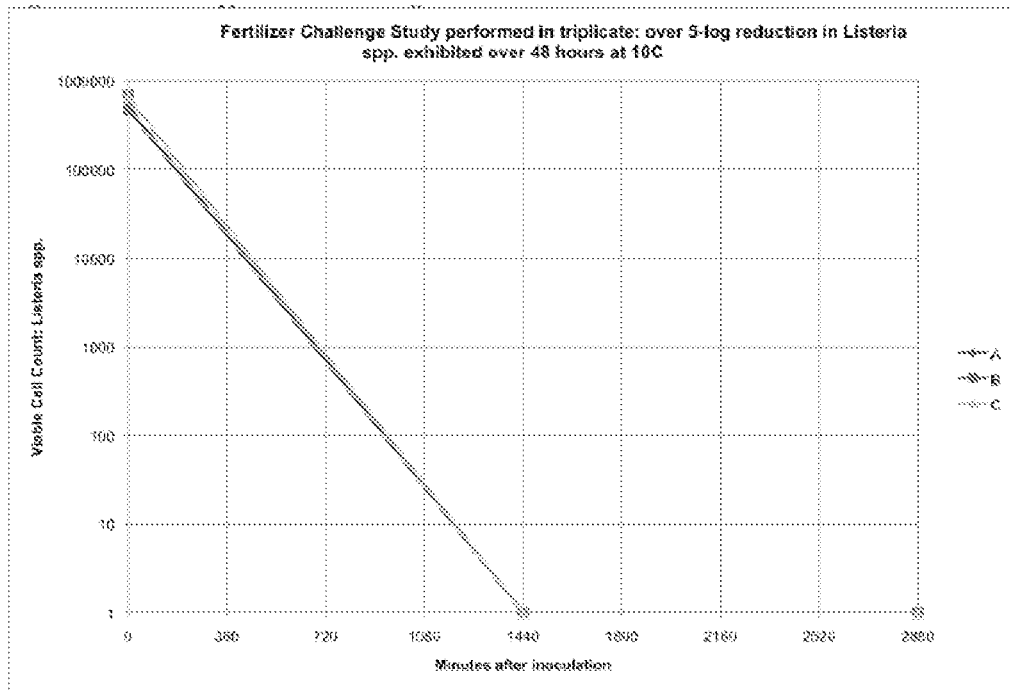
FIG. 9B is a graphical representation of the fertilizer challenge study on *Listeria* spp. The x-axis represents minutes after inoculation of the sample with the bacteria. The y-axis represents the viable count of bacteria in log 10 scale. Lines A, B, and C represent samples done in triplicate.
Figure 9C:
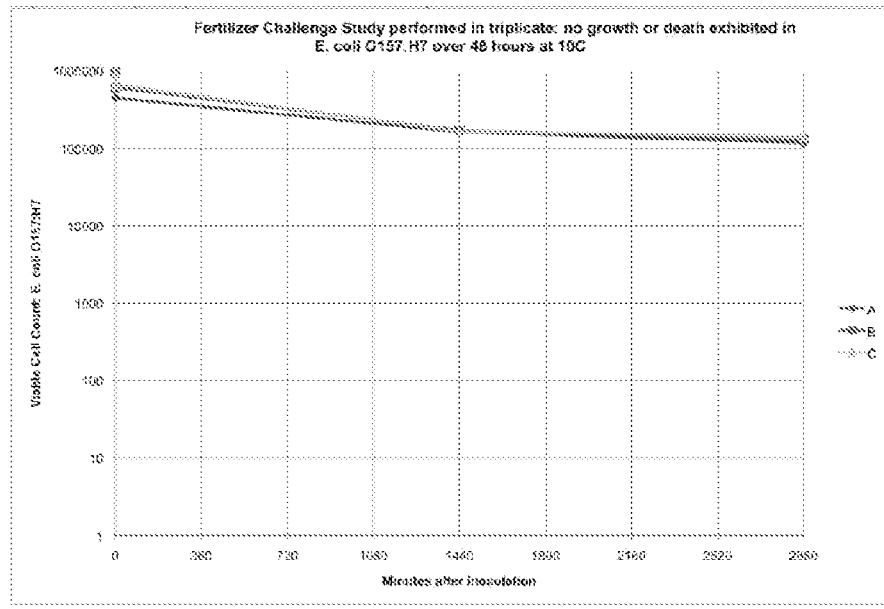
FIG. 9C is a graphical representation of the fertilizer challenge study on *E. coli* O157:H7. The x-axis represents minutes after inoculation of the sample with the bacteria. The y-axis represents the viable count of bacteria in log 10 scale. Lines A, B, and C represent samples done in triplicate.
Figure 9D:
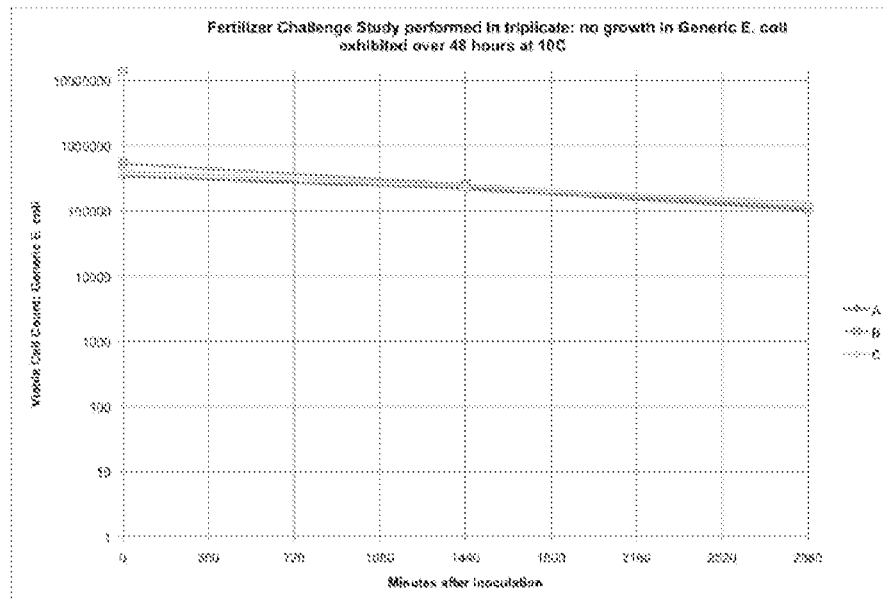
FIG. 9D is a graphical representation of the fertilizer challenge study on generic *E. coli*. The x-axis represents minutes after inoculation of the sample with the bacteria. The y-axis represents the viable count of bacteria in log 10 scale. Lines A, B, and C represent samples done in triplicate.

The data for the modified sieve mesh test sizes, micron rating, new filter weight in grams, processed filter weight in grams, retain and retain as a percentage of tested material are shown in Table 16. FIG. 7C is a photograph showing the retained material on an exemplary filtration disc used in pressure filtration of the process described herein. Depicted in FIG. 9 is a graphical representation of the data from the modified sieve test. These data show that pressure filtration used in the present method yields a finished liquid product that is within the specified 99.9% absolute filter rating of the 100 mesh filter cartridge.

TABLE 16

Sieve test results.

| Sieve Mesh | Micron Rating | New Filter (grams) | Processed Filter Dry (grams) | Retain (grams) | % Retain (Retain grams/9,000 mL) |
|---|---|---|---|---|---|
| 230 | 63 | 0.0966 | 0.1504 | 0.0538 | 0.000005978 |
| 200 | 74 | 0.0945 | 0.1473 | 0.0528 | 0.000005867 |
| 170 | 88 | 0.0933 | 0.1131 | 0.0198 | 0.000002200 |
| 140 | 105 | 0.0940 | 0.1348 | 0.0408 | 0.000004533 |

Example 7. Pathogen Challenge Study and GMO Analysis

To assess the viability of certain pathogenic and non-pathogenic bacteria in the liquid product produced by the methods described herein, a challenge study was conducted on samples following formulation, pasteurization, and filtration. The objective was to assess the viability of inoculated Salmonella ssp., Listeria ssp., E. coli O157:H7 and Generic E. coli ssp. in the liquid product. The specific organisms chosen for use in this study were Salmonella typhimurium, Listeria monocytogenes, E. coli O157:H7, and generic E. coli mixed cultures. Growth media was inoculated with individual cultures of Salmonella typhimurium, Listeria monocytogenes, E. coli O157:H7, and generic E. coli from strains grown and cultured at Alliant Food Safety Labs, LLC (Farmington, Conn., USA). Cell suspensions were mixed to prepare inoculums containing approximately equal numbers of cells of each strain. The number of viable cells were verified by approved plate count methods well known in the art. Nine containers of each sample type preparation were inoculated with a composite culture at approximately 1,000,000 colony forming units (CFU) per gram of product with one separate container used for a negative control. After inoculation, all products were stored at cool warehouse temperatures (10° C.).

Formulated liquid composition was maintained at ambient temperatures (21° C.) with a pH 5.33 and a water activity of 0.910. To a sterile tube, 5 mL of the liquid was added and inoculated with about $1.0 \times 10^6$ colony forming units (CFU) per gram of liquid. The inoculum was prepared and concentrated into a 100 µl portion of solution. Then, 100 µl of inoculum was dispensed into each 5 mL tube with a sterile pipette. The negative control contained 100 µl sterile water. Inoculated samples were tested in triplicate at 1 minute, 24 hours, and 48 hours after inoculation using plating methods well known in the art.

Table 17 provides the baseline information for a subsample that was collected aseptically and tested on day 0 for Total Plate Count, Enterobacteriaceae plate count, *Listeria* spp., and *Salmonella* ssp. Tables 18-23 provide the data for the challenge test. The results show that the methods described herein produce a liquid product while reducing certain pathogenic bacteria present in raw manure (see FIGS. 9A-D).

TABLE 17

Baseline information

| Sample | Day | Results |
|---|---|---|
| Total Plate Count | 0 | <10 CFU/g |
| Enterobacteriaceae | 0 | <10 CFU/g |
| *Listeria* spp. | 0 | Negative/25 g |
| *Salmonella* ssp. | 0 | Negative/25 g |

CFU, colony forming units.

TABLE 18

Bacterial Strain

| Bacterial Culture | Strain | Approximate Inoculums |
|---|---|---|
| *Salmonella typhimurium* | ATCC 13311 | $2.0 \times 10^6$ cells per gram of product |
| *Listeria monocytogenes* | ATCC 19115 | $7.0 \times 10^5$ cells per gram of product |
| *Escherichia coli* (Migula) Castellani and Chalmers | ATCC 51813 | $1.0 \times 10^7$ cells per gram of product |
| *Escherichia coli* O157:H7 | ATCC 35150 ATCC 43888 | $1.3 \times 10^7$ cells per gram of product |

TABLE 19

*S. typhimurium* challenge

| Culture | CFU/gram | | | LOG Value | | | Time |
|---|---|---|---|---|---|---|---|
| Inoculum | 1900000 | 1900000 | 1900000 | $1.9 \times 10^6$ | $1.9 \times 10^6$ | $1.9 \times 10^6$ | 0 hr |
| *S. typhimurium* | 660000 | 360000 | 340000 | $6.6 \times 10^5$ | $3.6 \times 10^5$ | $3.4 \times 10^5$ | 1 min |
| | 36000 | 32000 | 37000 | $3.6 \times 10^4$ | $3.2 \times 10^4$ | $3.7 \times 10^4$ | 24 hrs |
| | 7800 | 4600 | 8300 | $7.8 \times 10^3$ | $4.6 \times 10^3$ | $8.3 \times 10^3$ | 48 hrs |

TABLE 20

*L. monocytogenes* challenge

| Culture | CFU/gram | | | LOG Value | | | Time |
|---|---|---|---|---|---|---|---|
| Inoculum | 700000 | 700000 | 700000 | $7.0 \times 10^5$ | $7.0 \times 10^5$ | $7.0 \times 10^5$ | 0 hr |
| *L. monocytogenes* | 510000 | 480000 | 660000 | $5.1 \times 10^5$ | $4.8 \times 10^5$ | $6.6 \times 10^5$ | 1 min |
| | <10 | <10 | <10 | $<1.0 \times 10^1$ | $<1.0 \times 10^1$ | $<1.0 \times 10^1$ | 24 hrs |
| | <10 | <10 | <10 | $<1.0 \times 10^1$ | $<1.0 \times 10^1$ | $<1.0 \times 10^1$ | 48 hrs |

TABLE 21

*E. coli* O157:H7 challenge

| Culture | CFU/gram | | | LOG Value | | | Time |
|---|---|---|---|---|---|---|---|
| Inoculum | 700000 | 700000 | 700000 | $7.0 \times 10^5$ | $7.0 \times 10^5$ | $7.0 \times 10^5$ | 0 hr |
| *L. monocytogenes* | 510000 | 480000 | 660000 | $5.1 \times 10^5$ | $4.8 \times 10^5$ | $6.6 \times 10^5$ | 1 min |
| | <10 | <10 | <10 | $<1.0 \times 10^1$ | $<1.0 \times 10^1$ | $<1.0 \times 10^1$ | 24 hrs |
| | <10 | <10 | <10 | $<1.0 \times 10^1$ | $<1.0 \times 10^1$ | $<1.0 \times 10^1$ | 48 hrs |

TABLE 22 non-pathogenic *E. coli* challenge

| Culture | CFU/gram | | | LOG Value | | | Time |
|---|---|---|---|---|---|---|---|
| Inoculum | 13000000 | 13000000 | 13000000 | $1.3 \times 10^7$ | $1.3 \times 10^7$ | $1.3 \times 10^7$ | 0 hr |
| Generic *E. coli* | 340000 | 530000 | 410000 | $3.4 \times 10^5$ | $5.3 \times 10^5$ | $4.1 \times 10^5$ | 1 min |
| | 220000 | 250000 | 240000 | $2.2 \times 10^5$ | $2.5 \times 10^5$ | $2.4 \times 10^5$ | 24 hrs |
| | 100000 | 110000 | 130000 | $1.0 \times 10^5$ | $1.1 \times 10^5$ | $1.3 \times 10^5$ | 48 hrs |

TABLE 23

Negative controls

| Culture | CFU/gram | | | LOG Value | | | Time |
|---|---|---|---|---|---|---|---|
| Control | <10 | Na | Na | $1 \times 10^1$ | Na | Na | 0 hr |
| | <10 | Na | Na | $1 \times 10^1$ | Na | Na | 1 min |
| | <10 | Na | Na | $1 \times 10^1$ | Na | Na | 24 hrs |
| | <10 | Na | Na | $1 \times 10^1$ | Na | Na | 48 hrs |

The formulated liquid product produced by the production method described herein was also tested for the presence of plant material from genetically modified organisms (GMO) using qualitative PCR. Qualitative PCR methods are well within the purview of the skilled artisan and will not be discussed further. The results of this analysis is shown in Table 24.

TABLE 24

35S Promoter/NOS Terminator/FMV Promoter QPCR Analysis

| Test Component | Result |
|---|---|
| Corn/Maize DNA Reference | Not detected |
| Soy DNA Reference (additional) | Not detected |
| CaMV 35S Promoter | Not detected |
| NOS Terminator | Not detected |
| FMV Promoter | Not detected |

Example 8. Bacterial Enumeration and Morphology in T72 Samples

A T72 sample (see FIG. 1, sample 5B) of liquid product produced after 72 hours in the bioreactor 50 and taken prior to formulation was analyzed for bacterial enumeration and colony observation. Serial dilutions were executed by protocol, with exception of final plating technique. A pour plate technique with 9 mL of molten 50° C. Trypticase soy agar (TSA) was used. T72 samples were collected from the bioreactor, and a series of 8 plates were inoculated for each sample. The plates from the $10^{-6}$ dilution were the only plates observed for microbial growth since there were between 30 and 300 colonies per plate and therefore suitable for observation. Plates were incubated at 29° C. As shown in Table 25, the average CFU per ml was calculated as $1 \times 10^8$ or about 100,000,000.

TABLE 25

CFU calculations

CFU analysis base

| Sample # | $10^{-6}$ plates (total colonies) |
|---|---|
| 1 | 63 and 85 |
| 2 | 116 and 103 |
| 3 | 165 and 168 |
| 4 | 91 |
| 5 | 26 and 28 |
| 6 | 109 and 99 |
| 7 | 48 and 74 |

Calculations

| Sample # | Average | CFU/mL |
|---|---|---|
| 1 | 74 | 8.22E+07 |
| 2 | 109.5 | 1.22E+08 |
| 3 | 166.5 | 1.85E+08 |
| 4 | 91 | 1.01E+08 |
| 5 | 30 | 3.33E+07 |
| 6 | 101 | 1.12E+08 |
| 7 | 61 | 6.78E+07 |

Using microscopy techniques well within the purview of the skilled artisan, isolated colonies were observed on the TSA plates of the T72 samples. The form, elevation, margin, surface, opacity, and cosmogenesis of the bacterial colonies present on the TSA plates were recorded (see Table 26). Finally, isolated colony Gram staining was performed and analyzed microscopically. Staining for both Gram positive and Gram negative bacteria was performed. In addition, the shapes associated with Gram positive and Gram negative bacteria was recorded in Table 27.

TABLE 26

Bacterial colony observations

| Form | Elevation | Margin | Surface | Opacity | Cosmogenesis |
|---|---|---|---|---|---|
| Circular | Raised | Undulate | Rough | Clear | White |
| Irregular | Convex | Curled | Dull | Opaque | Red |
| | Umbonate | Lobate | Wrinkled | | Pink |
| | | Entire | Glistening | | Yellow |
| | | | | | Buff |
| | | | | | Purple |

TABLE 27

Bacterial morphology observations

| Form | Elevation | Margin | Surface | Opacity | Cosmogenesis |
|---|---|---|---|---|---|
| Circular | Raised | Undulate | Rough | Clear | White |
| Irregular | Convex | Curled | Dull | Opaque | Red |
| | Umbonate | Lobate | Wrinkled | | Pink |
| | | Entire | Glistening | | Yellow |
| | | | | | Buff |
| | | | | | Purple |

| Cocci | Bacilli |
|---|---|
| Coccus (−) | Bacillus (+) |
| Diplococcus(+, −) | Diplobacillus (−) |

TABLE 27-continued

Bacterial morphology observations

| Streptococcui (+, −) | Streptobacilli (+, −) |
| Staphylococci (+, −) | |

Example 9. Microbial Community Composition of T72 Samples

To assess the microbial community composition of the liquid product produced after 72 hours in the bioreactor 50 and taken prior to formulation, T72 samples were obtained as described in Example 1 (see FIG. 1, sample 5B). Samples were homogenized with sterile ground glass and shipped overnight to Ward Laboratories, Inc. (Kearney, Nebr., USA) where PFLA testing was performed in triplicate.

PLFAs were analyzed according to the method of Clapperton et al. (Res. Newsletter, 2005, 1-2). Total lipids were extracted in test tubes by shaking approximately 2 g (dry weight equivalent) of frozen material in 9.5 ml dichloromethane (DCM):methanol (MeOH):citrate buffer (1:2:0.8 v/v) for 1 hour at 240 revolutions per minute (RPM). Then, 2.5 ml of DCM and 10 ml of a saturated KCl solution were added to each tube and shaken for 5 minutes. Tubes were then centrifuged at 3000 RPM for 10 min. The organic fraction was pipetted into clean vials and then dried under a flow of $N_2$ at 37° C. in the fume hood. Samples were dissolved in 2 ml of DCM and stored at −20° C. for less than two weeks.

Lipid-class separation was conducted in silica gel columns. Samples were loaded onto columns and the vials washed twice with a small amount of DCM using a pipette. Care was taken to keep solvent level above the silica gel at all times. The neutral, glyco- and phospholipids fractions were eluted by sequential leaching with approximately 2 ml of DCM, 2 ml of acetone and 2 ml of methanol, respectively. The glycolipid fraction and neutral fraction were discarded and the phospholipids fraction was collected in a 4 ml vial. This fraction was dried under a flow of $N_2$ at 37° C. in the fume hood, dissolved in a few ml of MeOH and then stored at −20° C.

Fatty acid methyl esters were created through mild acid methanolysis. Phospholipids fractions were dried under a flow of $N_2$ at 37° C. in the fume hood. Half a Pasteur pipette full of MeOH/$H_2SO_4$ (25:1 v/v) was added to the vials, which were placed in an 80° C. oven for 10 minutes, cooled to room temperature before the addition of approximately 2 ml of hexane with a Pasteur pipette. Vials were vortexed during 30 seconds and left to settle for 5 min before the lower fraction was discarded. Vials were vortexed for 30 seconds, left still for 5 min before the aqueous fraction was discarded entirely. Samples were dried under a flow of $N_2$ at 37° C. in the fume hood. Vials were washed with 50 µl of hexane using a glass syringe, the samples transferred into 100 µl tapered glass inserts, placed inside a gas chromatograph (GC) vial.

Samples were analyzed using a Agilent 7890A GC equipped with a 7693 autosampler and a flame ionization detector (FID). Hydrogen was the carrier gas (30 ml min$^{-1}$) and the column was a 50-m Varian Capillary Select FAME #cp7420. Sample (2 µl) injection was in 5:1 split mode. The injector was held at 250° C. and the FID at 300° C. The initial oven temperature, 190° C., was held for 5 minutes, raised to 210° C. at a rate of 2° C. min$^{-1}$, then raised from 210° C. to 250° C. at a rate of 5° C. min$^{-1}$, and held for 12 minutes.

Identification of peaks was based on comparison of retention times to known standards (Supelco Bacterial Acid Methyl Esters #47080-U, plus MJS Biolynx #MT1208 for 16:1ω5). The abundance of individual PLFAs was expressed as pg PLFA g$^{-1}$ material. Amounts were derived from the relative area under specific peaks, as compared to the 19:0 peak value, which was calibrated according to a standard curve made from a range of concentrations of the 19:0 FAME standard dissolved in hexane. Fatty acids were named according to the w-designation described as follows: total number of carbons followed by a colon; the number of double bonds; the symbol w; the position of the first double bond from the methyl end of the molecule. Cis and trans isomers are indicated with c or t, respectively. Methyl (meth) and hydroxy (OH) groups are labelled at the beginning of the name where appropriate. Iso and anteiso forms are indicated by i- and a-, respectively. Table 28 shows the microbial community distribution of the T72 samples produced by the process described herein.

TABLE 28

Microbial community distribution of the T72 samples.

| | Control | | Sample 1 | | Sample 2 | | Sample 3 | |
|---|---|---|---|---|---|---|---|---|
| | Biomass PFLA ng/g | % of Total Biomass | Biomass PFLA ng/g | % of Total Biomass | Biomass PFLA ng/g | % of Total Biomass | Biomass PFLA ng/g | % of Total Biomass |
| Total Bacteria | 21.72 | 19.01 | 1970.48 | 54.62 | 3944.72 | 55.4 | 4796.76 | 59.19 |
| Gram (+) | 0 | 0 | 1670.22 | 46.3 | 3415.11 | 47.65 | 4030.7 | 49.73 |
| Actinomycetes | 0 | 0 | 23.76 | 0.06 | 31.84 | 0.44 | 32.47 | 0.4 |
| Gram (−) | 21.72 | 19.01 | 300.26 | 8.32 | 529.62 | 7.39 | 766.06 | 9.45 |
| Rhizobia | 0 | 0 | 4.14 | 0.11 | 3.28 | 0.05 | 3.14 | 0.04 |
| Total Fungi | 0.01 | 0 | 507.06 | 14.06 | 769.68 | 10.74 | 776.31 | 9.58 |
| Arbuscular | 0 | 0.01 | 46.25 | 1.28 | 5.86 | 0.08 | 0 | 0 |
| Saprophytes | 0 | 0 | 460.81 | 12.77 | 763.83 | 10.66 | 776.31 | 9.58 |
| Protozoa | 0 | 0 | 2.18 | 0.06 | 3.27 | 0.05 | 0 | 0 |
| Undifferentiated | 92.54 | 80.98 | 1127.87 | 31.26 | 2449 | 34.17 | 2531.41 | 31.23 |

Example 10. The Effect of Heat on Microbial Community Composition

To determine the effect of heat on the change in microbial community composition of the liquid product produced by the process described herein, a T72 sample as described in Example 1 (see FIG. 1, sample 5B) was heated/pasteurized for 30 minutes at 95° C. The heated/pasteurized T72 sample was assessed for microbial content as compared to an unheated T72 sample. To assess microbial content, unheated T72 and heated/pasteurized T72 samples were homogenized with sterile ground glass and shipped overnight to Ward Laboratories, Inc. (Kearney, Nebr., USA) where PFLA testing was performed as described in Example 9. The microbial community composition of the unheated T72 and heated/pasteurized T72 samples were compared to a sterile substrate control sample. As shown in Table 29, the microbial community of the T72 sample both prior to and following heat treatment/pasteurization at 95° C. was predominantly comprised of Gram positive bacteria suggesting a link between thermophilic bacteria and Gram positive bacteria in the liquid product produced by the instant process.

TABLE 29

Microbial analysis of T72 samples.

| | T72 Sample 5B | | Pasteurized T72 Sample | | Control Sample | |
|---|---|---|---|---|---|---|
| | Biomass PFLA ng/g | % of Total Biomass | Biomass PFLA ng/g | % of Total Biomass | Biomass PFLA ng/g | % of Total Biomass |
| Total Bacteria | 2928.64 | 68.23 | 3377.97 | 53.46 | 6.25 | 16.85 |
| Gram (+) | 2540.42 | 59.18 | 2930.16 | 46.37 | 0 | 0 |
| Actinomycetes | 4.49 | 0.1 | 0 | 0 | 0 | 0 |
| Gram (−) | 388.21 | 9.04 | 447.81 | 7.09 | 6.25 | 16.85 |
| Rhizobia | 0 | 0 | 0 | 0 | 0 | 0 |
| Total Fungi | 77.68 | 1.81 | 178.41 | 2.82 | 1.66 | 4.46 |
| Arbuscular | 0 | 0 | 0 | 0 | 0 | 0 |
| Saprophytes | 77.68 | 1.81 | 178.41 | 2.82 | 1.66 | 4.46 |
| Protozoa | 0 | 0 | 0 | 0 | 0 | 0 |
| Undifferentiated | 1286.05 | 29.96 | 2762.56 | 43.72 | 29.22 | 78.69 |

Example 11. Product Use

The base product produced from the bioreactor was formulated to grade, filtered and finished as described in Example 1, to produce the two products described below.
1. Product 3-0-3-1S, with a guaranteed analysis by weight: 1.74% water soluble nitrogen, 1.26% water insoluble nitrogen, 3% soluble potash ($K_2O$) and 1% sulfur, 9.6 lbs/gal.
2. Product 1.5-0-1, with a guaranteed analysis by weight: 0.6% water soluble nitrogen, 0.9% water insoluble nitrogen and 1% soluble potash ($K_2O$), 8.6 lbs/gal.

The products were manufactured under conditions enabling OMRI listing for use in organic programs. The products were applied to selected crops, and results were observed.

High Tunnel Produce—Conventional:

A grower of commercial market vegetables applied Product 3-0-3-1S to selected crops grown in soil under high tunnel. The product was applied in drip fertigation in a solution of approximately 50 ppm of N with an injection rate of 1:15. The grower observed greater than 50% increase in growth/yield on high tunnel conventional tomatoes and cucumbers, as well as on field strawberries, as compared with the crops receiving approximately 150-200 ppm of N from synthetic fertilizer (10-10-10).

Winter Wheat—Conventional:

A conventional farmer in Oklahoma applied Product 3-0-3-1S as top dress on hard red winter wheat. The product was applied at 4-5 gallons per acre top dress and compared with another section of crop to which 46-18-18 (3 gal/acre) fertilizer was applied. The farmer averaged 35-45 bushels of high quality (higher protein and other grading factors) wheat, as compared with 70-80 bushels of lesser quality wheat from the alternative fertilizer, for essentially equal return. He also saw a healthier root system with more fine hairs, and improved soil organic matter. Product 3-0-3-1S was also deemed easy to use by the farmer.

Hay—Transitioning to Organic:

A Wisconsin farmer transitioning to organic production applied Product 3-0-3-1S to first year transitional hay. The product was applied at 5 gallons per acre between cuttings, following early season application of a 1-0-3 liquid carbon-based fertilizer derived from sugar cane molasses, and kelp. He visually observed positive color and height differences between Product 3-0-3-1S treated and untreated crop within 2 weeks of application.

Hydroponics:

A hydroponic grower in Michigan used Product 3-0-3-1S to grow organic produce. The product was used in a 1:200 product:water solution daily in initial growth stages, then Product 1.5-0-1 was applied at the same rate in final growth stages. The combination of nutrients, microbes and amino acids in both Product 3-0-3-1S and Product 1.5-0-1 enabled the grower to simplify his process and use one product instead of three, reducing labor and input costs. He also observed improved growth results as compared with crops previously grown. Finally, the grower noted no clogging of the hydroponic injection system and no odor problems, as compared with past usage of a fish emulsion fertilizer.

Spelt—Organic:

An organic farmer in Michigan used Product 3-0-3-1S to grow organic spelt. The product was applied at 7 gallons per acre at the booting stage. He observed positive visible color differences between Product 3-0-3-1S treated crop, as compared with crop treated with liquid fish fertilizer. He also noted ease of use and lack of clogging of foliar application equipment, as compared with past usage of fish fertilizers.

Corn—Organic:

An organic farmer in Pennsylvania used Product 3-0-3-1S to grow organic corn. The product was applied at 8 gallons per acre as an in-furrow starter. The farmer saw superior emergence with robust color—an indicator of nutrient sufficiency and a "strong start" to the organic crop. Untreated corn did not emerge as well and showed the same nutrient deficiency symptoms the farmer had observed in previous years. The farmer also noted excellent handling with "minimal issues of flowability."

The present invention is not limited to the embodiments described and exemplified herein. It is capable of variation and modification within the scope of the appended claims.

We claim:

1. A method of conditioning a selected soil, comprising:
   a) selecting a soil for which conditioning is sought;
   b) treating the soil with a liquid composition comprising an autothermal thermophilic aerobic bioreaction product from a liquid fraction of poultry manure slurry, the poultry manure slurry comprising at least about 80% by weight moisture content and subjected to an autothermal thermophilic aerobic bioreaction for at least about 1 day, wherein the autothermal thermophilic aerobic bioreaction product endogenously comprises at least one living species of plant growth promoting bacteria or fungi;
   c) measuring at least one parameter of conditioning in the treated soil, and
   d) comparing the at least one measured parameter of conditioning in the treated soil with an equivalent measurement in an equivalent soil not treated with the liquid composition, or before treatment with the liquid composition;
   wherein an improvement in the at least one measured parameter in the treated, as compared with the untreated soil, or with the soil prior to treatment, is indicative of conditioning the selected soil.

2. The method of claim 1, wherein the selected soil comprises at least one feature selected from the group consisting of compaction, nutrient deficiency, microbial deficiency, organic matter deficiency, and any combination thereof.

3. The method of claim 1, wherein the selected soil is one in which plants or crops are currently planted, or will be planted.

4. The method of claim 1, wherein the at least one parameter of conditioning the soil is selected from the group consisting of soil organic matter, microbial diversity, nutrient profile, bulk density, porosity, water permeation, and any combination thereof.

5. The method of claim 1, wherein the at least one measured parameter in the treated soil is compared with an equivalent parameter prior to treatment of the same soil.

6. The method of claim 1, wherein the at least one measured parameter in the treated soil is compared with an equivalent parameter in an equivalent untreated soil in substantially the same location or in a different location.

7. The method of claim 1, wherein the autothermal thermophilic aerobic bioreaction product endogenously comprises at least one biostimulant.

8. The method of claim 7, wherein the biostimulant is selected from the group consisting of amino acids, bacteria, fungi and combinations thereof.

9. The method of claim 1, wherein the at least one living species of plant growth promoting bacteria comprises *Bacillus* spp, *Ureibacillus* spp, or both.

10. The method of claim 1, wherein the autothermal thermophilic aerobic bioreaction product endogenously comprises at least one non-living substance that promotes plant growth selected from the group consisting of citramalic acid, salicylic acid, pantothenic acid, indole-3-acetic acid, 5-hydroxy-indole-3-acetic acid, galactinol, and any combination thereof.

11. The method of claim 10, wherein the non-living substance is selected from the group consisting of salicylic acid, 5-hydroxy-indole-3-acetic acid, or both salicylic acid and 5-hydroxy-indole-3-acetic acid.

12. The method of claim 1, wherein the poultry manure is chicken manure.

13. The method of claim 1, wherein the autothermal thermophilic aerobic bioreaction product endogenously comprises less than 0.5 wt % phosphorus.

14. The method of claim 1, wherein the liquid composition comprises at least one additive.

15. The method of claim 14, wherein the additive is selected from the group consisting of a macronutrient, a micronutrient, a biostimulant, a biocontrol agent, and any combination thereof.

16. The method of claim 1, wherein the treating of the selected soil is done as a remediation to damaged or polluted soil.

17. The method of claim 1, wherein the treating of the selected soil is done to improve chemical properties of the treated soil.

18. The method of claim 1, wherein the treating of the selected soil is done to improve biological properties of the treated soil.

19. The method of claim 1, further comprising the step of e) planting plants or crops in the treated soil following treatment.

* * * * *